(12) United States Patent
Brown et al.

(10) Patent No.: US 6,811,176 B2
(45) Date of Patent: *Nov. 2, 2004

(54) DEVICE FOR RECEIVING AND SECURING A BALL

(75) Inventors: David Richard Brown, Brownwood, TX (US); Danny Richard Brown, Brownwood, TX (US); Stacy Ray Brown, Brownwood, TX (US)

(73) Assignee: Pepe Guerra, Trustee, Edinburg, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/253,982

(22) Filed: Sep. 24, 2002

(65) Prior Publication Data

US 2003/0025297 A1 Feb. 6, 2003

Related U.S. Application Data

(60) Division of application No. 09/761,968, filed on Jan. 17, 2001, now Pat. No. 6,505,848, which is a continuation-in-part of application No. 09/593,454, filed on Jun. 14, 2000, now Pat. No. 6,367,834, which is a continuation-in-part of application No. 09/271,015, filed on Mar. 17, 1999, now Pat. No. 6,419,259.
(60) Provisional application No. 60/078,993, filed on Mar. 23, 1998, and provisional application No. 60/116,060, filed on Jan. 15, 1999.

(51) Int. Cl.[7] .............................................. B60D 1/06
(52) U.S. Cl. ......................................................... 280/512
(58) Field of Search ..................................... 280/511, 512

(56) References Cited

U.S. PATENT DOCUMENTS

| | | | | |
|---|---|---|---|---|
| 1,953,365 A | * | 4/1934 | Reetz | 280/513 |
| 2,078,851 A | * | 4/1937 | Hovey | 280/513 |
| 2,090,113 A | * | 8/1937 | Dayton | 280/513 |
| 2,237,166 A | * | 4/1941 | Schoenrock | 280/489 |
| 2,435,024 A | * | 1/1948 | Wagner | 280/512 |
| 2,532,676 A | * | 12/1950 | Schaieb | 280/512 |
| 2,542,643 A | * | 2/1951 | Duncan | 280/513 |
| 3,362,728 A | * | 1/1968 | Wing | 280/512 |
| 3,647,244 A | * | 3/1972 | Hollis, Jr. | 280/512 |
| 3,888,517 A | * | 6/1975 | Ray | 280/512 |
| 3,923,112 A | * | 12/1975 | Goodgame | 180/24.11 |
| 5,147,096 A | * | 9/1992 | Rogers | 280/507 |
| 5,887,885 A | * | 3/1999 | Byers et al. | 280/512 |

* cited by examiner

Primary Examiner—Kevin Hurley
(74) Attorney, Agent, or Firm—George S. Gray

(57) ABSTRACT

A coupling device is provided for receiving and securing a ball, the ball being attached to the structure to be coupled, including a tow vehicle in the case of a trailer hitch application. Various embodiments of the device for both tongue and "goose neck" trailer hitch applications are included, which provide for simple and effective latching and unlatching, including operation from the perimeter of the vehicle. Hands free latching is provided for all coupling embodiments. A pivoting ball support with one or more recessed faces is rotated and displaced as the ball enters the device, and is returned to a position whereby the ball is prevented from exiting the device. Various provisions are made for retaining the pivoting ball support in this position after such latching has occurred. Provisions for unlatching include various handles and hand pushed structure. Vertical adaptations are provided for use on gates and the like.

53 Claims, 54 Drawing Sheets

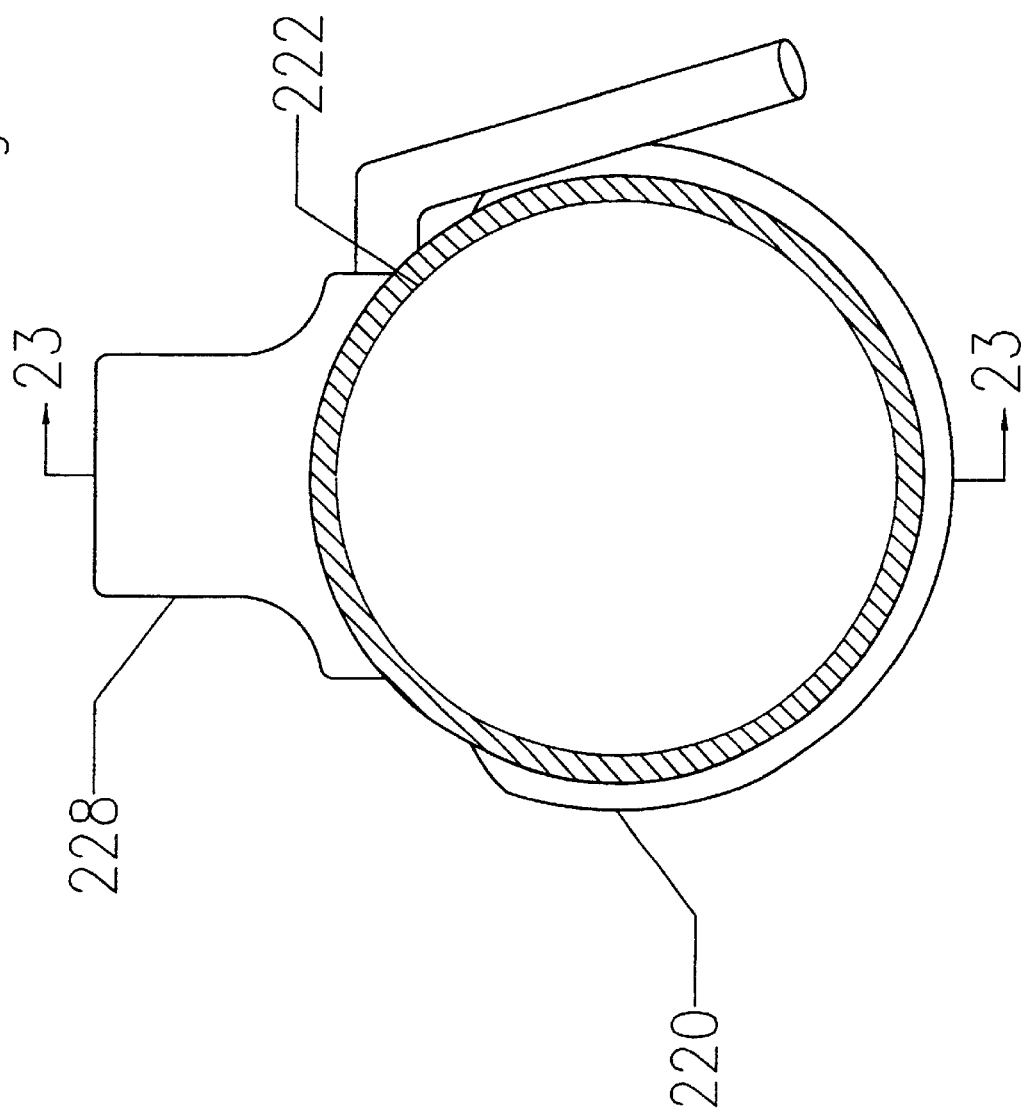

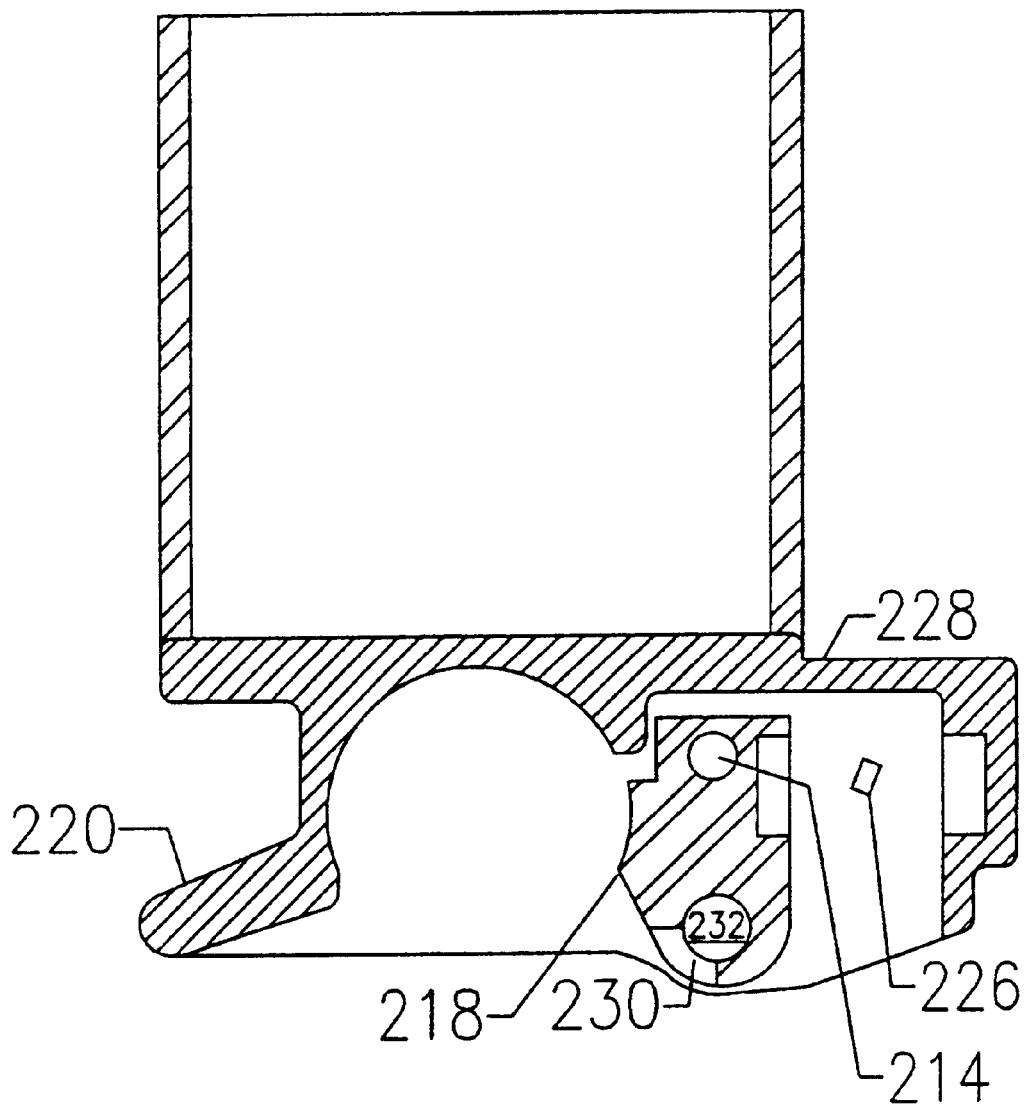

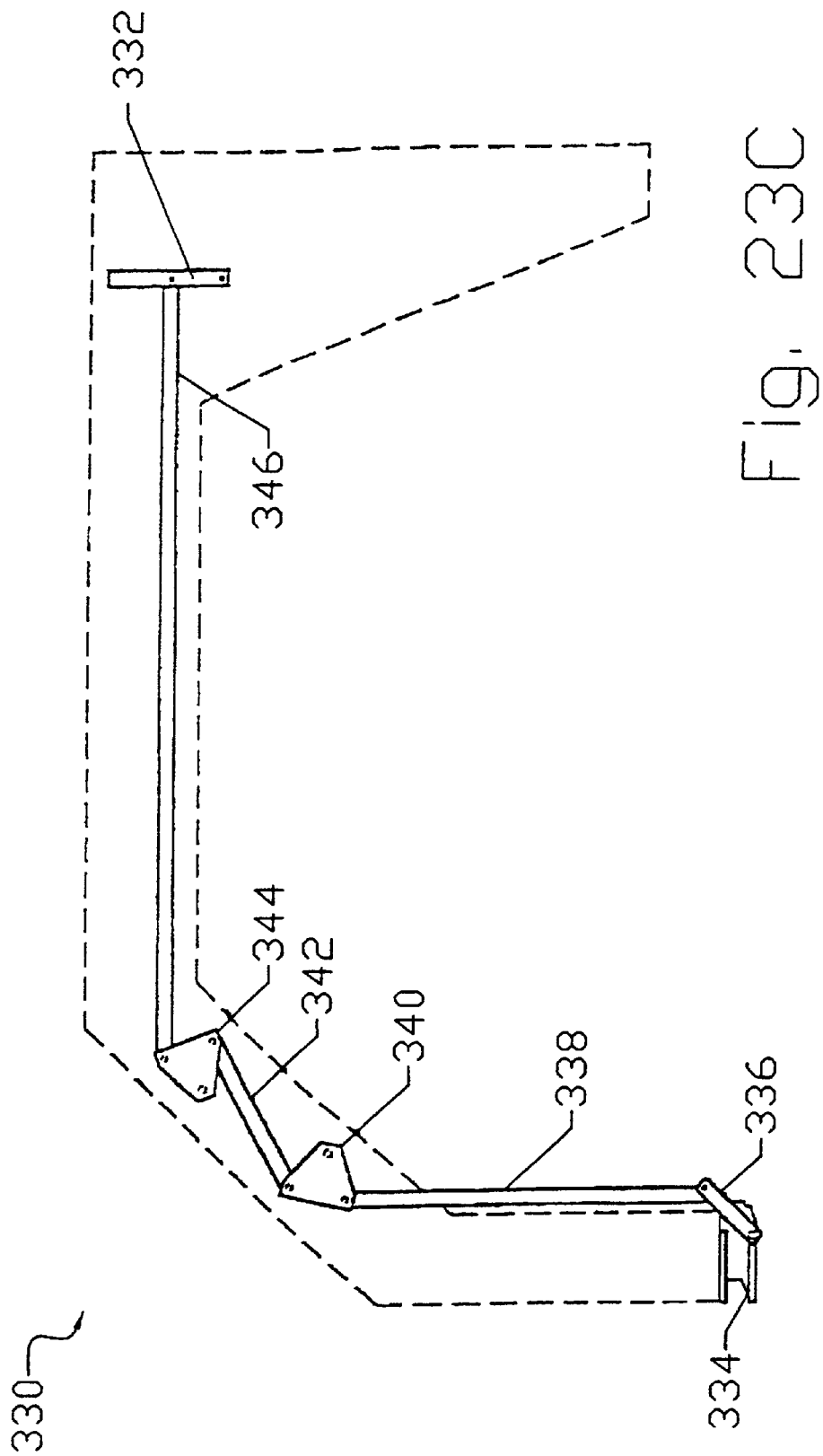

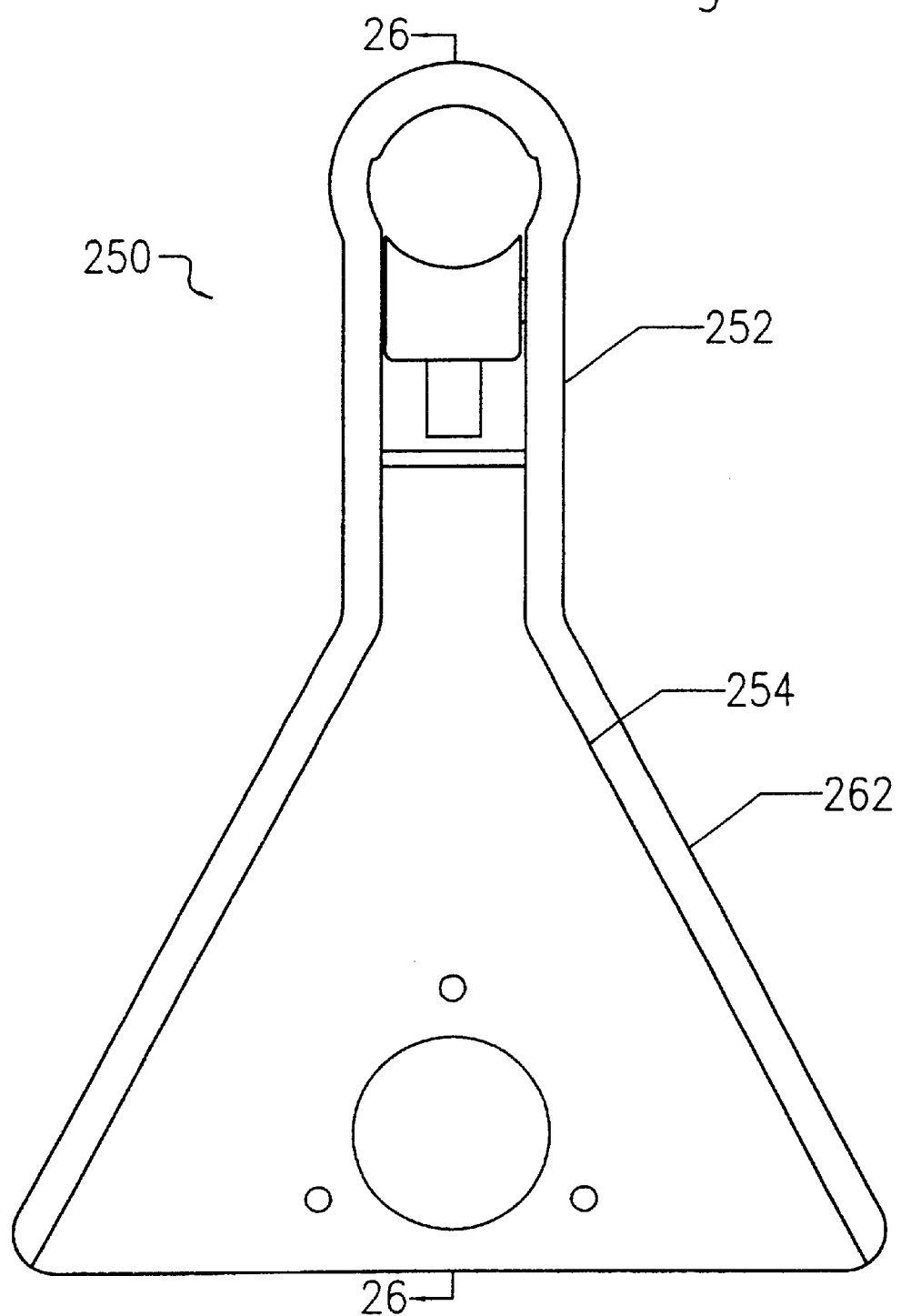

US 6,811,176 B2

DEVICE FOR RECEIVING AND SECURING A BALL

REFERENCE TO PRIOR APPLICATIONS

The present application is a divisional application from the parent application having Ser. No. 09/761,968, filed Jan. 17, 2001, now U.S. Pat. No. 6,505,848, said parent being a continuation-in-part to a first continuation-in-part application filed Jun. 14, 2000 now U.S. Pat. No. 6,367,834, Ser. No. 09/593,454, entitled "Device for Receiving and Securing A Ball," having the same inventors. The first continuation-in-part application is a continuation-in-part of a nonprovisional application filed Mar. 17, 1999, Ser. No. 09/271,015, now U.S. Pat. No. 6,419,259 entitled "Device for Receiving and Securing A Ball," also having the same inventors. The nonprovisional application was a conversion of a first provisional application to a nonprovisional application. The provisional application number is 60/078,993 filed Mar. 23, 1998. The title of the application is "Device For Receiving and Securing A Hitch Ball."

The application filed Mar. 17, 1999, also converted a second provisional patent application to a nonprovisional application. This second provisional application is application number 60/116,060, having a filing date of Jan. 15, 1999. The title of the application is "Device For Receiving and Securing A Hitch Ball." This second provisional application incorporated and supplemented the first provisional application.

Applicants claim the benefit, to the full extent available, of the effective filing date of the application filed Mar. 17, 1999.

BACKGROUND OF THE INVENTION

This invention relates to a simple and convenient, tongue mounted receiving end of a "ball" coupler, of the type commonly used for trailers, recreational vehicles, and boats. The device is also adaptable to general coupling applications, e.g., gate and door fasteners, shelving, and other applications wherein it is desirable to couple two objects together simply and quickly.

With regard to couplers in particular, many coupler devices are currently available which connect to the typical hitch ball. However, most of these include unduly large and complicated mechanisms, with many having a multiplicity of parts. Furthermore, most require manual manipulation of the device during the attachment process. In some, manual input is required to move the device from the open to the closed position.

It is a principal object of this invention to provide a compactly configured and easy-to-use hitch ball receiving mechanism, having an uncomplicated locking mechanism and a minimum of moving parts.

Another object is to provide a mechanism which requires no manual manipulation during the process in which the hitch ball is secured.

SUMMARY OF THE INVENTION

Our invention is an easy to use coupling device having an uncomplicated latching mechanism and a minimum of moving parts. It is particularly suited for receiving a typical trailer hitch ball. Our device is compactly configured and requires no manual manipulation of the latching mechanism during the attachment of the device to a typical hitch ball.

An apparatus for receiving and securing a ball is provided, comprising: a frame, the frame having an interior, the frame interior having a front section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

In another embodiment, the pivoting ball support further has a hollow, the hollow being sized to receive the spring first end, and the frame further has a hollow, the hollow being sized to receive the spring second end.

In another embodiment, the frame further has a rear interior portion, the rear interior portion defining a rear cavity, the frame hollow being positioned in the frame rear interior portion.

In another embodiment, the frame further has a rear interior wall portion, the frame hollow being positioned in the rear interior wall portion.

In another embodiment, the spring length is less than the ball diameter when the pivoting ball support is in the first position.

In another embodiment, the degree of pivot between the pivoting ball support first position and second position is not more than 21 degrees.

In another embodiment, the ratio of the pivoting ball support width to the frame width at the pivot point is not less than 0.70.

In another embodiment, the ratio of the pivoting ball support width at the pivot point to the ball diameter is not less than 0.70.

In another embodiment, the frame further has a slot and the rotation member comprises an extension member extending from the pivoting ball support through the frame slot.

In another embodiment, the pivoting ball support extension member has an end portion, the end portion being shaped to form an acute angle with respect to the frame.

In another embodiment, the ratio of the ball diameter to the maximum frame width at the pivot point is not less than 0.95.

In another embodiment, the frame further has a top and at least two non-intersecting ridges on the frame top.

In another embodiment, the frame further has a slot and a pair of top extensions, the frame top extensions each having a hole, and the pivoting ball support further has a top extension, the pivoting ball support top extension having a hole, the pivoting ball support top extension being configured such that the pivoting ball support top extension extends through the frame slot, the frame top extensions being positioned on the frame such that the pivoting ball support top extension hole coincides with the frame top extension holes, when the pivoting ball support is in the first position, such that a pin may be simultaneously positioned within the pivoting ball support top extension hole and the frame top extension holes, the frame top extensions each having a downwardly tapered front portion, each front portion joining one of the frame top ridges.

In another embodiment, the frame further has a slot and a top extension, and the pivoting ball support further has a top extension, the pivoting ball support top extension having a hole, the pivoting ball support top extension being configured such that the pivoting ball support top extension extends through the frame slot, the frame top extension being positioned on the frame such that a pin within the pivoting ball support top extension is adjacent the frame top extension when the pivoting ball support is in the first position, the frame top extension preventing the movement of the pivoting ball support from the first position.

In another embodiment, the frame has a slot, and the pivoting ball support further has a top extension, the pivoting ball support top extension having a hole, the pivoting ball support top extension being configured such that the pivoting ball support top extension extends through the frame slot, and the apparatus further comprises a pin, the pin having at least two portions having different diameters, and a pin retaining member having a first end attached to the pin first portion, and a second end having a loop, the loop having a substantially straight lower side, the second end being biased to encompass another of the pin portions when the pin is inserted into the pivoting ball support hole, the second end encompassing the other pin portion such that the loop lower side is closely received between the other pin portion and the frame, the loop lower side preventing the movement of the pivoting ball support from the first position.

In another embodiment, the frame further has a top extension, the frame top extension being positioned on the frame such that the inserted pin's first portion is adjacent the frame top extension when the pivoting ball support is in the first position, the frame top extension preventing the movement of the pivoting ball support from the first position.

In another embodiment, the number of pin portions is three, the middle portion being closely received by the pivoting ball support extension hole.

In another embodiment, the frame further has a rear interior portion, the rear interior portion defining a rear cavity, the spring second end being positioned against the frame rear interior portion.

In another embodiment, the frame further has a rear interior wall portion, the spring second end being positioned against the rear interior wall portion.

In another embodiment, the frame further has an exterior lip, the frame exterior lip being attached to the frame proximate the frame opening, the frame exterior lip further extending radially from the frame opening, the frame exterior lip being tapered downwardly as it extends.

In another embodiment, the frame further has an interior lip, the frame interior lip being shaped and positioned to extend beneath a portion of the ball positioned in the frame front interior section.

In another embodiment, the apparatus further comprises means for preventing pivoting ball support movement, such that movement of the pivoting ball support from the first position to the second position is prevented.

In another embodiment, the pivoting ball support rotates with respect to the pivoting ball support pivot point, the pivoting ball support pivot point being fixed with respect to the frame.

In another embodiment, the pivoting ball support rotates with the pivoting ball support pivot point, the pivoting ball support pivot point rotating with respect to the frame.

In another embodiment, the apparatus for receiving and securing a ball, comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; means for resisting pivoting ball support movement, such that movement of the pivoting ball support first face from the first position to the second position is resisted.

In another embodiment, the frame has a slot, and the pivoting ball support further has a top extension, the pivoting ball support top extension having a hole, the pivoting ball support top extension being configured such that the pivoting ball support top extension extends through the frame slot, and the apparatus further comprises a pin, the pin having at least two portions having different diameters, and a pin retaining member having a first end attached to the pin first portion, and a second end having a loop, the loop having a substantially straight lower side, the second end being biased to encompass another of the pin portions when the pin is inserted into the pivoting ball support hole, the second end encompassing the other pin portion such that the loop lower side is closely received between the other pin portion and the frame, the loop lower side preventing the movement of the pivoting ball support from the first position.

In another embodiment, the frame further has a top extension, the frame top extension being positioned on the frame such that the inserted pin's first portion is adjacent the frame top extension when the pivoting ball support is in the first position, the frame top extension preventing the movement of the pivoting ball support from the first position.

In another embodiment, the number of pin portions is three, the middle portion being closely received by the pivoting ball support extension hole.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; a spring, the spring having a first and second end, the pivoting ball support further having a hollow, the hollow being sized to receive the spring first end, and the frame further having a hollow, the hollow being sized to receive the spring second end, such that movement of the pivoting ball support from the first position to the second position is resisted; and a rotation member, the rotation member being attached to the pivoting ball support such that movement of the rotation member causes rotation of the pivoting ball support.

In another embodiment, the frame further has a rear interior portion, the rear interior portion defining a rear cavity, the frame hollow being positioned in the frame rear interior portion.

In another embodiment, the frame further has a rear interior wall portion, the frame hollow being positioned in the rear interior wall portion.

An apparatus for receiving and securing a ball is provided comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame, such that movement of the pivoting ball support from the first position to the second position is resisted, the spring length being less than the ball width when the pivoting ball support is in the first position; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the degree of pivot between the pivoting ball support first position and second position being not more than twenty-one degrees, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the ratio of the pivoting ball support width to the frame width at the pivot point being not less than 0.70, and further, the pivoting ball support being movable from a first position to a second position, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the ratio of the pivoting ball support width, at the pivot point, to the ball diameter being not less than 0.70, and further, the pivoting ball support being movable from a first position to a second position, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening when the pivoting ball support is in the first position; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support, the frame further having a slot and the rotation member further having an extension member extending from the pivoting ball support through the frame slot, the pivoting ball support extension member having an end portion, the end portion being shaped to form an acute angle with respect to the frame.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening when the pivoting ball support is in the first position, the ratio of the ball diameter to the maximum frame width at the pivot point being not less than 0.95; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a top and at least two non-intersecting ridges on the frame top; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

In another embodiment, the frame further has a slot and a pair of top extensions, the frame top extensions each having a hole, and the pivoting ball support further has a top extension, the pivoting ball support top extension having a hole, the pivoting ball support top extension being configured such that the pivoting ball support top extension extends through the frame slot, the frame top extensions being positioned on the frame such that the pivoting ball support top extension hole coincides with the frame top extension holes, when the pivoting ball support is in the first position, such that a pin may be simultaneously positioned within the pivoting ball support top extension hole and the frame top extension holes, the frame top extensions each having a downwardly tapered front portion, each front portion joining one of the frame top ridges.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening when the pivoting ball support is in the first position, the frame further having a slot and a top extension, and the pivoting ball support further having a top extension, the pivoting ball support top extension having a hole, the pivoting ball support top extension being configured such that the pivoting ball support top extension extends through the frame slot, the frame top extension being positioned on the frame such that a pin within the pivoting ball support top extension is adjacent the frame top extension when the pivoting ball support is in the first position, the frame top extension preventing the movement of the pivoting ball support from the first position; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having an exterior lip, the frame exterior lip being attached to the frame proximate the frame opening, the frame exterior lip further extending radially from the frame opening, the frame exterior lip being tapered downwardly as it extends; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having an interior lip, the frame interior lip being shaped and positioned to extend beneath a portion of the ball positioned in the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; a spring, the spring having a first and second end, the spring's first end being positioned against the pivoting ball support, the spring's second end being positioned against the frame, such that movement of the pivoting ball support from the first position to the second position is resisted; a rotation member, the rotation member being attached to the pivoting ball support such that movement of the rotation member causes rotation of the pivoting ball support; and means for preventing pivoting ball support movement, such that movement of the pivoting ball support first face from the first position to the second position is prevented.

An apparatus for receiving and securing a ball is provided, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame front interior section being sized and shaped such that the pivoting ball support face prevents the ball from passing through the frame opening when the pivoting ball support is in the first position; means for resisting pivoting ball support movement, such that movement of the pivoting ball support from the first position to the second position is resisted, the means for resisting pivoting ball support movement further comprising a spring, the spring length being less than the ball diameter; and a rotation member, the rotation member being attached to the pivoting ball support such that movement of the rotation member causes rotation of the pivoting ball support.

In another embodiment, the means for resisting pivoting ball support movement comprises a spring, the spring having a first and second end, the pivoting ball support further having a hollow, the hollow being sized to receive the spring first end, and the frame further having a hollow, the hollow being sized to receive the spring second end.

In another embodiment, the frame further has a rear interior portion, the rear interior portion defining a rear cavity, the frame hollow being positioned in the frame rear interior portion.

In another embodiment, the frame further has a rear interior wall portion, the frame hollow being positioned in the rear interior wall portion.

In another embodiment, the means for resisting pivoting ball support movement comprises a spring, the spring length being less than the ball diameter.

In another embodiment, the degree of pivot between the pivoting ball support first position and second position is not more than twenty-one degrees.

In another embodiment, the ratio of the pivoting ball support width to the frame width at the pivot point is not less than 0.70.

In another embodiment, the ratio of the pivoting ball support width, at the pivot point, to the ball diameter is not less than 0.70.

In another embodiment, the frame further has a slot and the rotation member further has an extension member extending from the pivoting ball support through the frame slot, the pivoting ball support extension member having an end portion, the end portion being shaped to form an acute angle with respect to the frame.

In another embodiment, the ratio of the ball diameter to the maximum frame width at the pivot point is not less than 0.95.

In another embodiment, the frame further has a top and at least two non-intersecting ridges on the frame top.

In another embodiment, the frame further has a slot and a pair of top extensions, the frame top extensions each having a hole, and the pivoting ball support further has a top extension, the pivoting ball support top extension having a hole, the pivoting ball support top extension being configured such that the pivoting ball support top extension extends through the frame slot, the frame top extensions being positioned on the frame such that the pivoting ball support top extension hole coincides with the frame top extension holes, when the pivoting ball support is in the first position, such that a pin may be simultaneously positioned within the pivoting ball support top extension hole and the frame top extension holes, the frame top extensions each having a downwardly tapered front portion, each front portion joining one of the frame top ridges.

In another embodiment, the frame further has a slot and a top extension, and the pivoting ball support further has a top extension, the pivoting ball support top extension having a hole, the pivoting ball support top extension being configured such that the pivoting ball support top extension extends through the frame slot, the frame top extension being positioned on the frame such that a pin within the pivoting ball support top extension is adjacent the frame top extension when the pivoting ball support is in the first position, the frame top extension preventing the movement of the pivoting ball support from the first position.

In another embodiment, the frame has a slot, and further the pivoting ball support further has a top extension, the pivoting ball support top extension having a hole, the pivoting ball support top extension being configured such that the pivoting ball support top extension extends through the frame slot, and the apparatus further comprises a pin, the pin having at least two portions having different diameters, and a pin retaining member having a first end attached to the pin first portion, and a second end having a loop, the loop having a substantially straight lower side, the second end being biased to encompass another of the pin portions when the pin is inserted into the pivoting ball support hole, the second end encompassing the other pin portion such that the loop lower side is closely received between the other pin portion and the frame, the loop lower side preventing the movement of the pivoting ball support from the first position.

In another embodiment, the frame further has a top extension, the frame top extension being positioned on the frame such that the inserted pin's first portion is adjacent the frame top extension when the pivoting ball support is in the first position, the frame top extension preventing the movement of the pivoting ball support from the first position.

In another embodiment, the number of pin portions is three, the middle portion being closely received by the pivoting ball support extension hole.

In another embodiment, the apparatus, further comprises means for preventing pivoting ball support movement, such that movement of the pivoting ball support first face from the first position to the second position is prevented.

In another embodiment, the frame further has an interior lip, the frame interior lip being shaped and positioned to extend beneath a portion of the ball positioned in the frame front interior section.

An apparatus for receiving and securing a hitch ball is provided, comprising: a frame, the frame having an interior, the frame interior having a front section and a rear section, the frame front interior section being shaped and sized for closely receiving portions of a generally round hitch ball, the frame further having an opening, the frame opening being shaped and positioned to allow bitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having: a first face, the pivoting ball support first face having a recess, the pivoting ball support first face being at least partially beneath a portion of the ball when the pivoting ball support is in the first position, the frame front interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position; a second face, the pivoting ball support second face having a recess, the second face recess being positioned for encounter with the ball as the ball is inserted into the frame opening; means for resisting pivoting ball support movement, such that movement of the pivoting ball support first face from the first position to the second position is resisted; means for preventing pivoting ball support movement, such that movement of the pivoting ball support first face from the first position to the second position is resisted; and pivoting ball support forced rotation means, such that the pivoting ball support first face can be manually moved from the first to the second position.

DESCRIPTION OF THE DRAWINGS

FIG. 22 is a top view of the embodiment of the device shown in FIG. 17, including a cut away view of the added top structure.

FIG. 23 is a side view of the embodiment of the device shown in FIG. 22, cut along cutting plane 23—23.

FIG. 23C is a side view of an additional remote access handle embodiment shown in its attached position on the gooseneck trailer structure.

FIG. 24 is a bottom view of an embodiment of the device.

DESCRIPTION OF THE INVENTION

Figure 1:
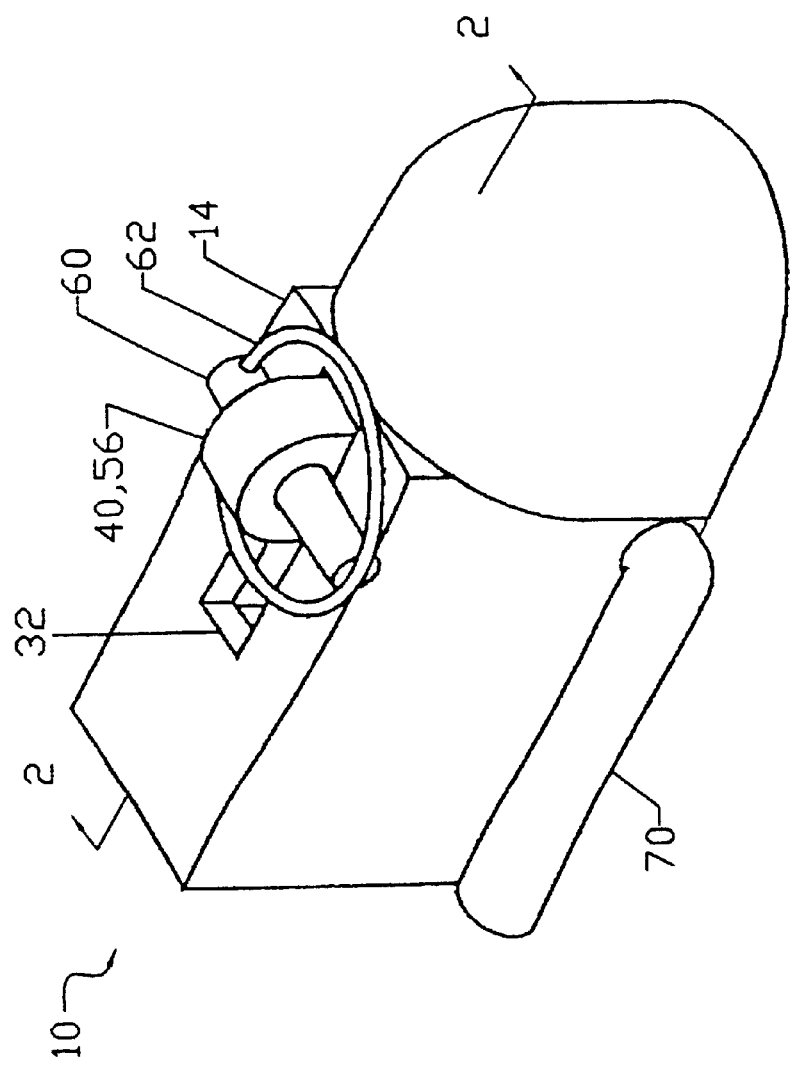
FIG. 1 is an oblique view of an embodiment of the device.
Figure 2:
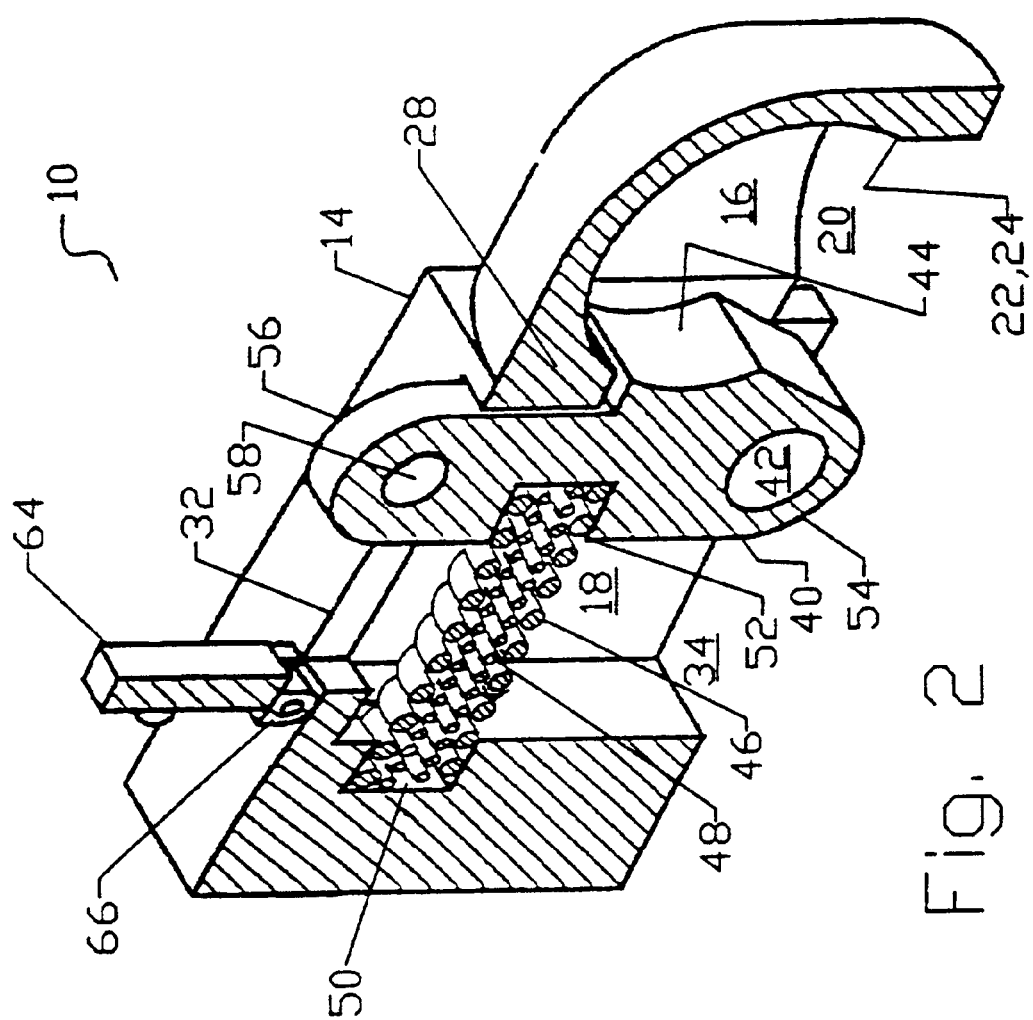
FIG. 2 is an oblique view of an embodiment of the device, cut along cutting plane 2—2.
Figure 3:
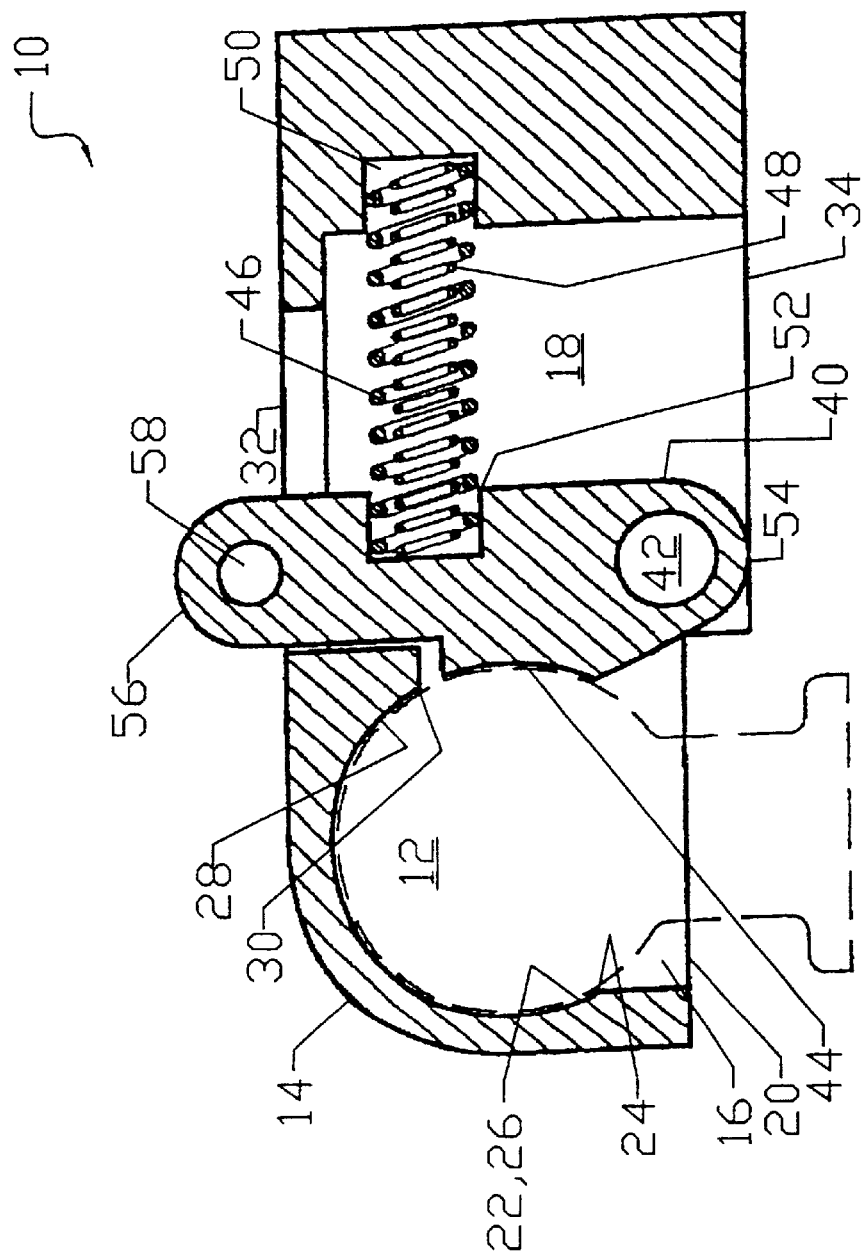
FIG. 3 is a side view of an embodiment of the device, cut along cutting plane 2—2, depicting the latching mechanism in the closed position.
Figure 4:
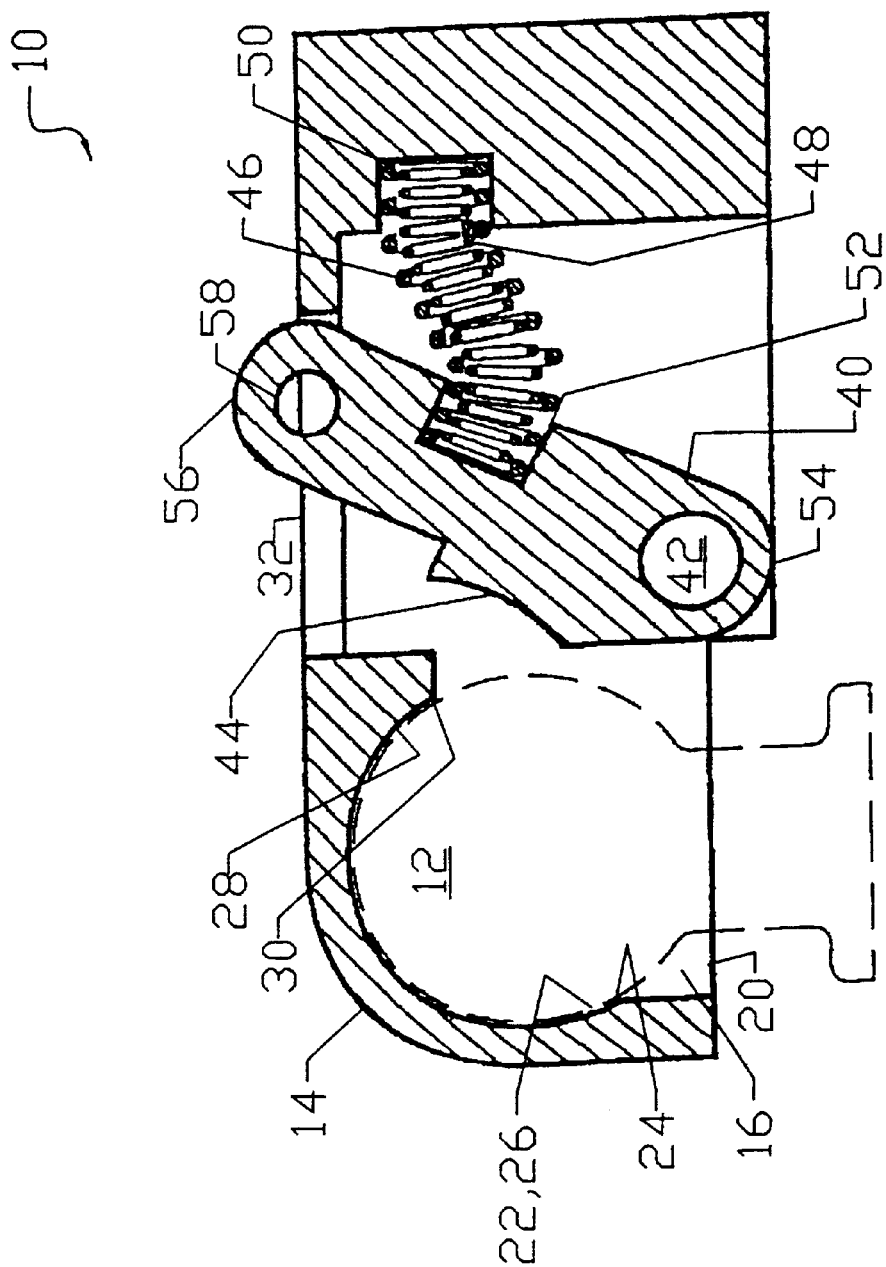
FIG. 4 is a side view of an embodiment of the device cut along cutting plane 2—2, depicting the latching mechanism in the open position.

FIGS. 1–4 depict an embodiment of the device 10, with FIGS. 3–4 showing a typical hitch ball 12. FIGS. 2–4 show the configuration of the frame 14, the frame front section interior 16, the frame rear section interior 18, and the frame opening 20. The frame 14 can be made of a number of materials, including, but not limited to, cast steel, stainless steel, weldable steel, pressed steel, and mild steel. In the embodiment depicted in FIGS. 1–17 and 22–30, cast steel has been chosen for the frame 14. The embodiment depicted in FIGS. 24–27 utilizes pressed steel.

FIGS. 2–4 depict additional frame features such as the frame lip 22, the frame lip rearmost edge 24, the frame lip face 26, the frame front interior section interior surface rear part 28, the frame front interior section interior surface rearmost edge 30, the frame slot 32, and the frame opening rear section 34. The frame lip 22 extends radially around the front portion of the frame front section interior 16, and is generally a continuation of the "dome" which forms the top of the frame front section interior 16. The frame lip face 26 is somewhat concave, allowing a generally flush fit against a fully inserted hitch ball 12. In the embodiment depicted, the frame front interior section interior surface rear part 28, extends approximately 62 degrees from vertical, and generally follows the circumference of the hitch ball 12, as shown in FIGS. 3–4. In the embodiment depicted therein, a line drawn from the frame lip rearmost edge 24 to the frame front interior section interior surface rearmost edge 30 will pass beneath the center of a fully inserted hitch ball 12.

FIG. 1 depicts the position of the frame slot 32 with respect to the pivoting ball support 40. The pivoting ball support 40 rotates with the pivoting ball support pivot point 42 from a first position, in which the pivoting ball support face 44 is in close proximity to the hitch ball 12, to the second position, in which the pivoting ball support face 44 is dislocated, allowing the hitch ball 12 to be removed from the frame front section interior 16 through frame opening 20. The pivoting ball support face 44 first position and second position are depicted in FIG. 3 and FIG. 4, respectively.

In the embodiment shown in FIGS. 1–4, the movement of the pivoting ball support 40 is resisted by a first spring 46 and a second spring 48. The second spring 48 provides a backup means for resisting movement of the pivoting ball support 40 from its first position to its second position. FIGS. 2–4 depict an embodiment in which the ends of both springs are held in place by the first hollow 50 and a second hollow 52 cut into the frame rear section interior 18 and the pivoting ball support face 44. Other embodiments could easily include springs 46,48 being attached to the frame rear section interior 18 and the pivoting ball support 40, by normal attachment means, including screws, bolts, hooks, or welding. Embodiments are also anticipated that will use only one spring 46, and one or more springs having a rod within the spring 46, with an accompanying hole, for rod movement extending rearwardly into the frame 14 from the frame rear section interior 18.

Although springs 46,48 are substantially horizontal with respect to the frame 14, in the embodiment depicted in FIGS. 2–4, other embodiments are anticipated which would place one or more such springs 46,48 in a non-horizontal position, including embodiments in which the springs 46,48 would have a bend provided, when the pivoting ball support face 44 is in its first position.

FIGS. 2–4 also depict the pivoting ball support bottom end 54, the pivoting ball support top extension 56, and the pivoting ball support top extension hole 58. In the embodiment depicted in FIGS. 1–4, a pin 60, connectable to the frame by a pin cable (not shown), will be against the frame 14 when inserted into pivoting ball support top extension hole 58. Attached to the pin is a pin ring 62 that is sized to fit snugly against the unattached pin 60 end, as shown in FIG. 1.

It is anticipated that the pivoting ball support 40 will also be made of cast steel, although other materials will suffice as described earlier.

In the embodiment depicted in FIGS. 1–4, a handle 70 is provided which provides the means by which the pivoting ball support face 44 is rotated from its first position to its second position, to allow the hitch ball 12 to be removed from the device 10. The handle 70 connects to the pivoting ball support pivot point 42. It is anticipated in other embodiments that several types of handles will be utilized. One or more handles connected to both ends of the pivoting ball support pivot point 42, one or more handles connected to the pivoting ball support top extension 56, handles directed in a forward direction along the frame 14, handles having a "T" shaped cross piece for improved gripping, other grip devices attached to handles, and handles having one or more bends for routing the handle to various desirable locations.

Another anticipated embodiment includes a handle that is elevated from approximately 15 to 50 degrees from the horizontal when the pivoting ball support 40 is in its first position. This embodiment contemplates a sufficient angle from the horizontal to allow the handle to be gripped when the frame 14 is substantially flush to a horizontal object, which would otherwise prevent the handle from being gripped.

It is also anticipated that a handle hook (not shown) will be provided which will receive and secure the end of the handle, as well as other anticipated handles. Handle hooks can be anticipated to include a number of structures including semi-circular extensions from the frame that are positioned where the handle can be moved to rest within the semi-circle, thus having its movement restricted, squeeze clamps in which the handle shaft can be forced between the squeezing edges of such a clamp, a notch in the frame having an elevation at the entry which would prevent lateral movement of the handle without a preceding vertical movement, and other readily available means for securing a shaft in a fixed position.

Figure 5:
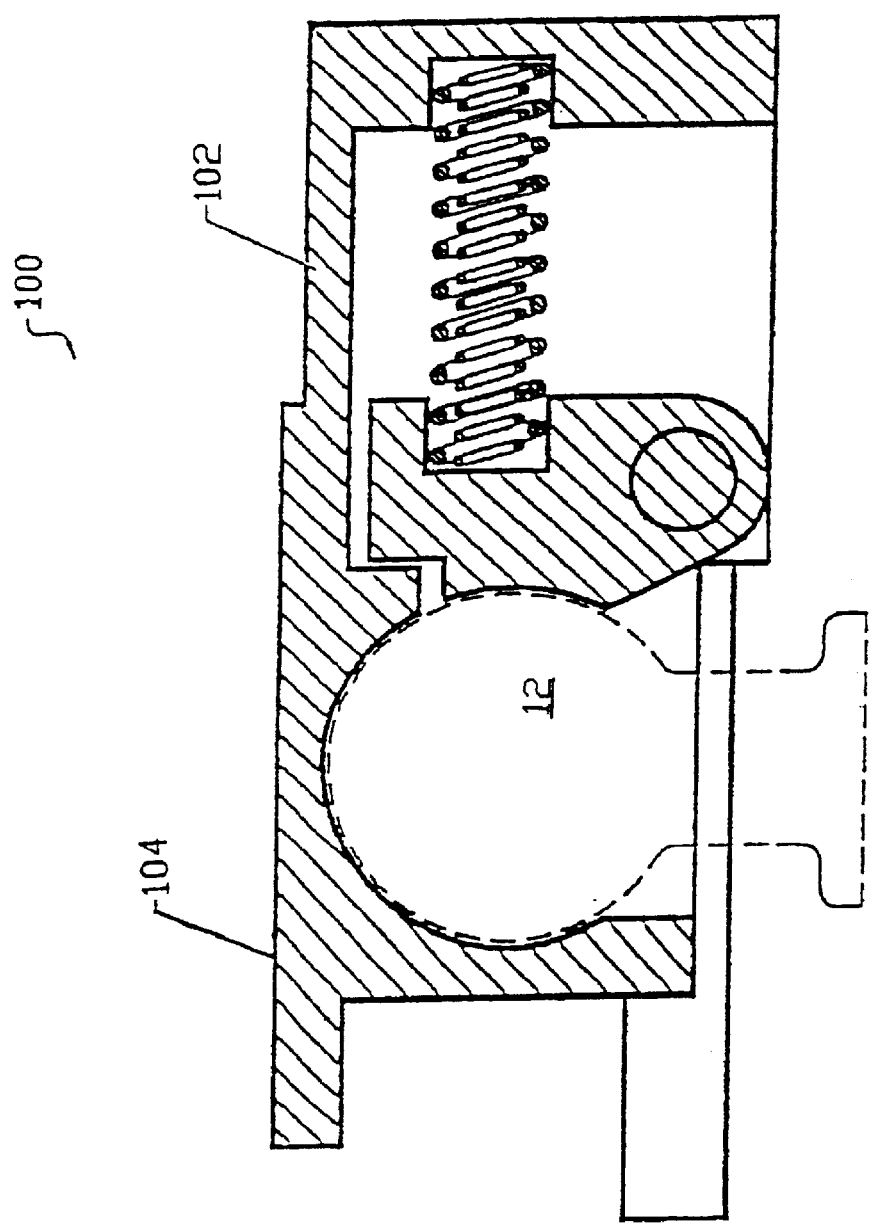
FIG. 5 is a cutaway side view of an embodiment of the device showing a gooseneck adaptation.

FIG. 5 shows a "gooseneck" adaptation 100. In this embodiment the frame 102 has a top 104 connectable to a pipe or square tubing typically used in gooseneck installations, where the upwardly extending pipe or square tubing from the device 100 would telescope into another pipe, both pipes having appropriately spaced holes for adjustment of the height of the installed device. The pipe or square tubing is representative of typical installations, but are not exclusive.

Figure 6:
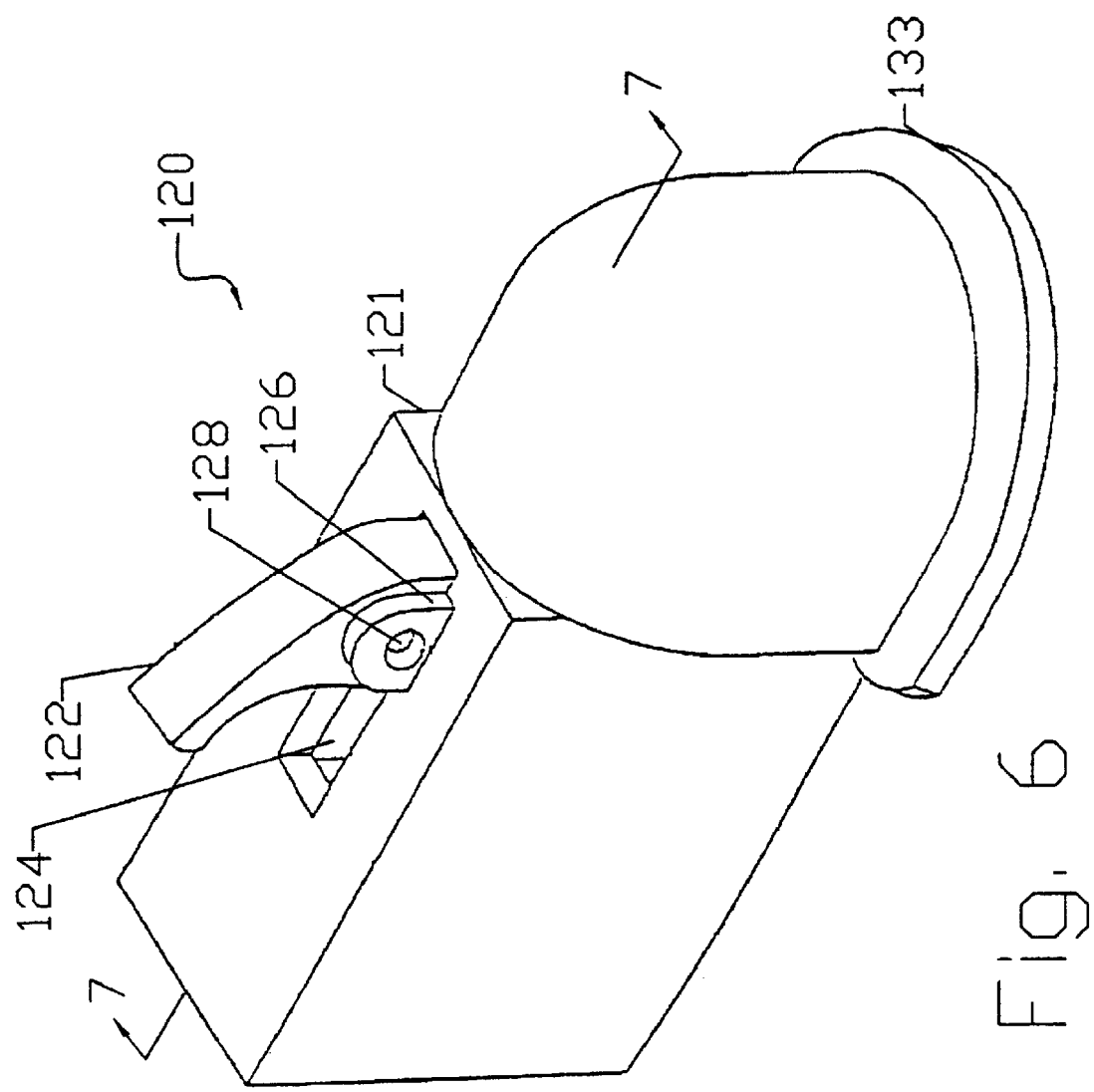
FIG. 6 is an oblique view of an embodiment of the device.
Figure 7:
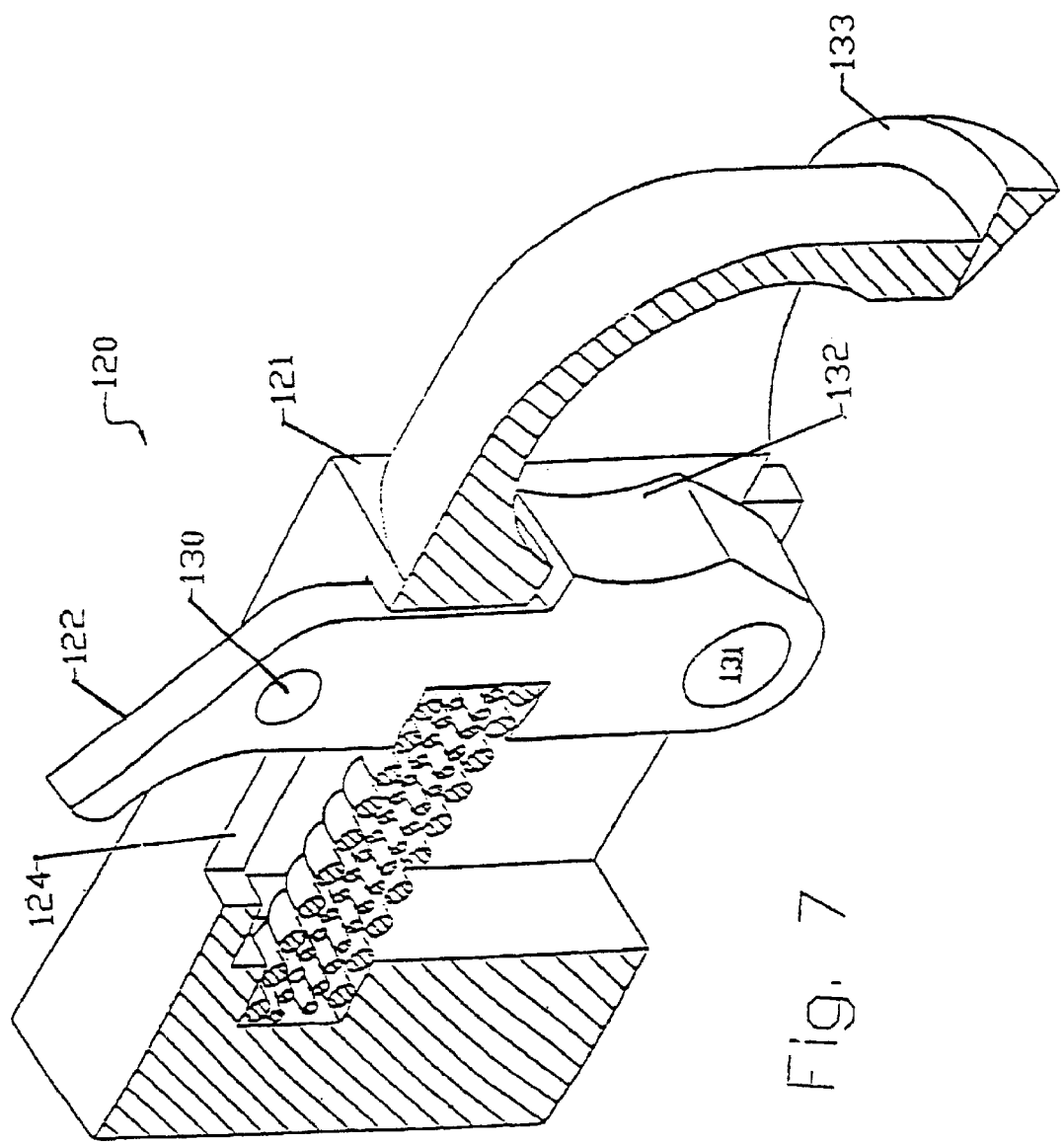
FIG. 7 is an oblique view of an embodiment of the device, cut along cutting plane 7—7.
Figure 8:
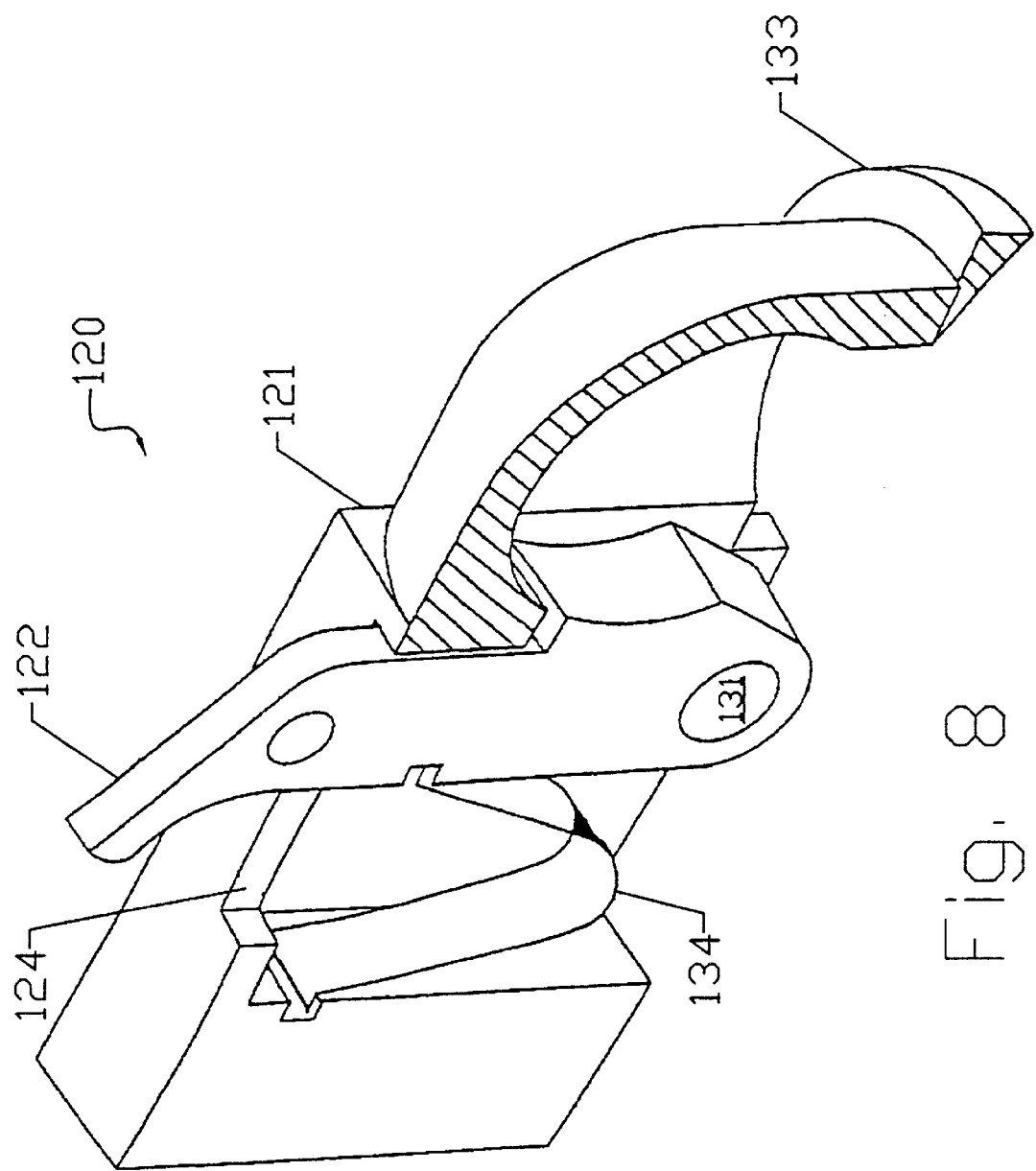
FIG. 8 is an oblique view of an embodiment of the device, cut along cutting plane 7—7.

FIGS. 6–8 depict an additional embodiment 120 of the invention wherein the pivoting ball support 122 extends upwardly through a frame slot 124 such that the pivoting ball support 122 can be pushed by hand to move the pivoting ball support 122 from its first position to its second position. In this embodiment no handle is needed and the pivoting ball support 122 need not rotate with the pivoting ball support pivot point 131. For this reason, the pivoting ball support pivot point 131 may be welded or otherwise affixed to the frame 121.

FIG. 6 also depicts a frame top extension 126 having a hole 128 positioned adjacent the pivoting ball support top extension hole 130, such that a pin or lock can be inserted simultaneously through both holes 128,130, thus locking the pivoting ball support face 132 into its first position. An exterior frame lip 133 provides structural rigidity and assists in guiding the hitch ball during the hookup process.

Figure 9:
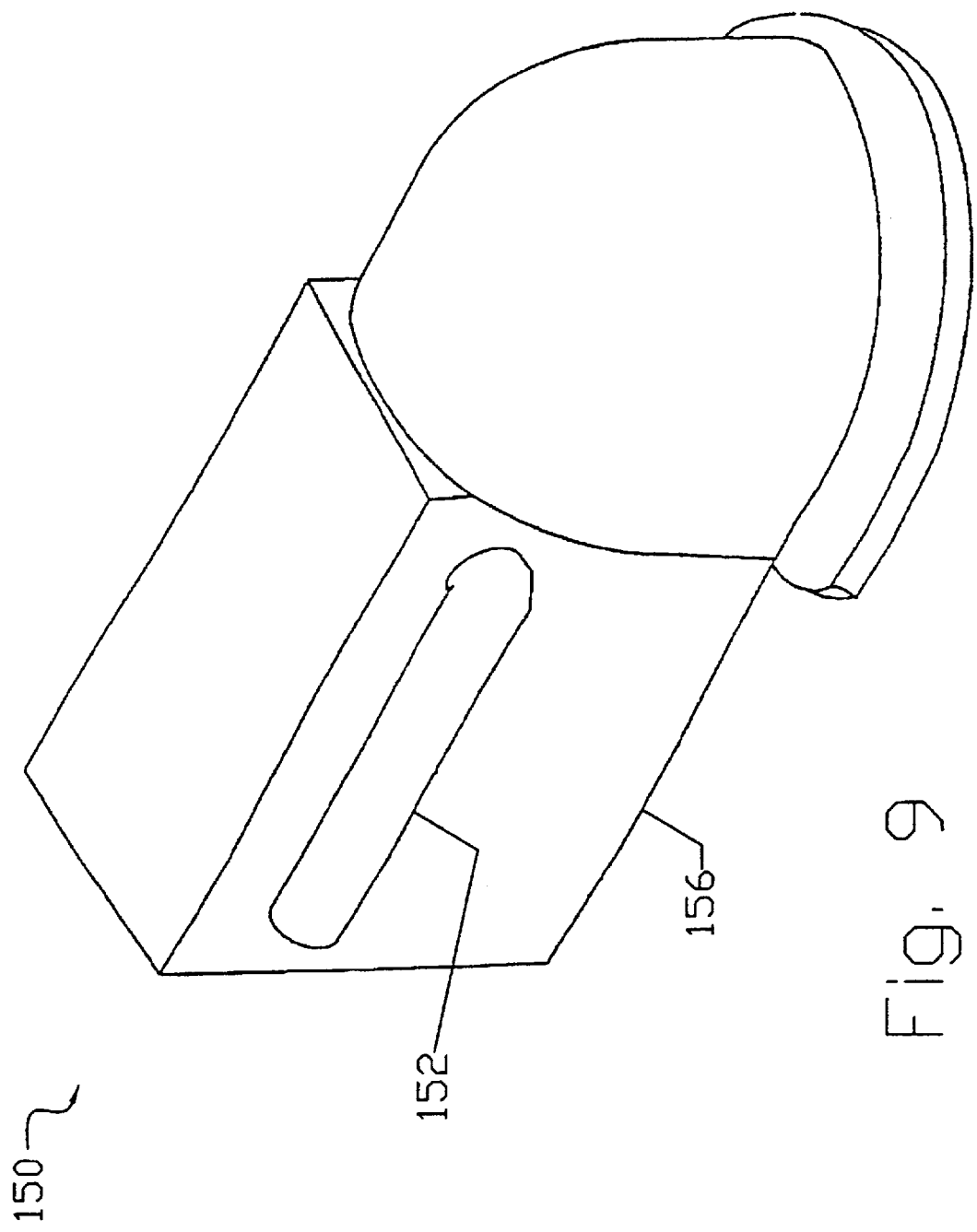
FIG. 9 is an oblique view of an embodiment of the device.
Figure 10:
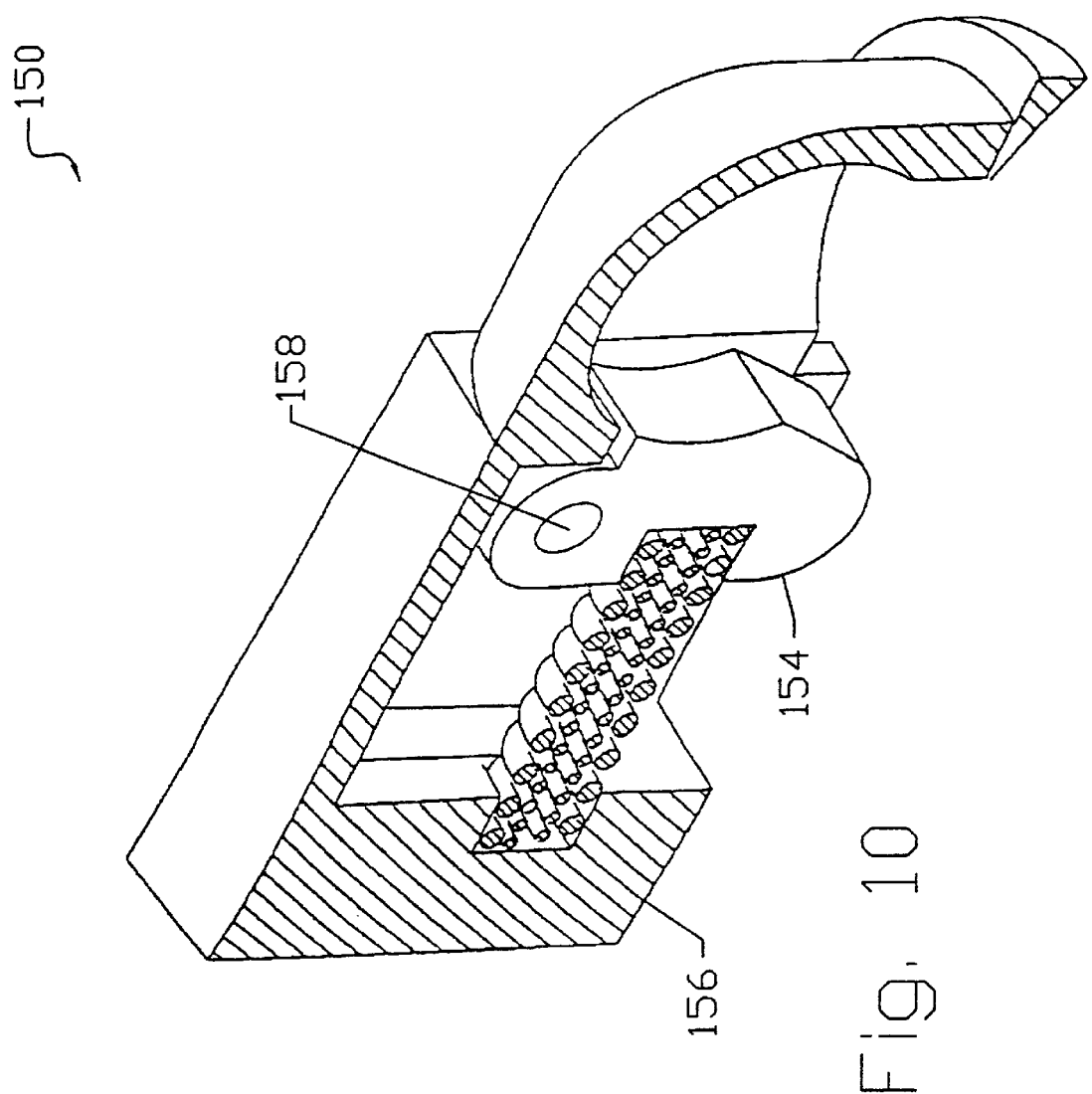
FIG. 10 is an oblique view of an embodiment of the device, cut along cutting plane 10—10.

FIG. 8 depicts a U-spring 134, which may be adapted to all embodiments of the invention. FIGS. 9–10 depict an embodiment 150 of the invention wherein the handle 152 is attached to the pivoting ball support 154 in such a manner that it is moved in an upward, clockwise direction in order to move the pivoting ball support 154 from its first position to its second position.

Figure 11:
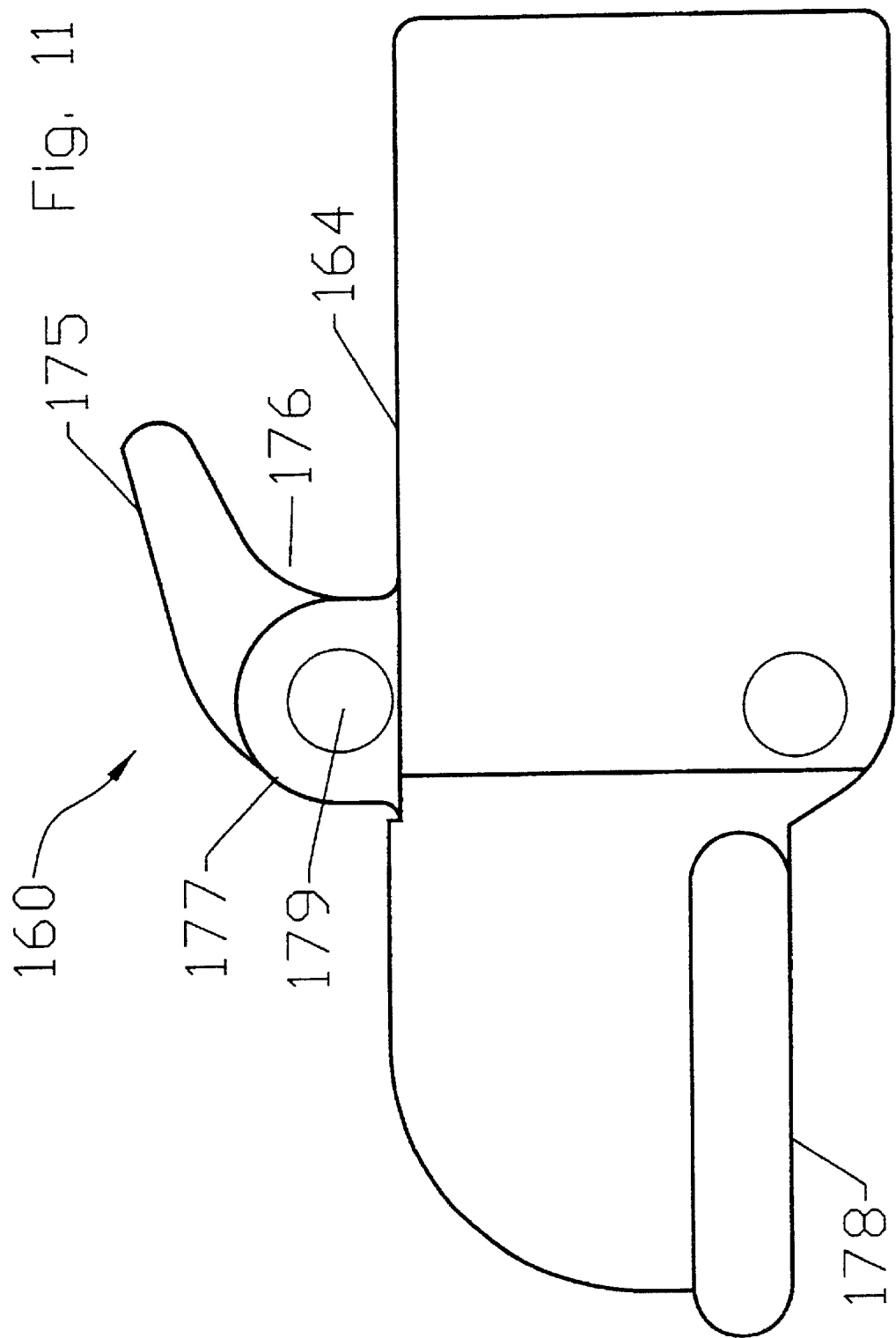
FIG. 11 is a side view of an embodiment of the device.
Figure 12:
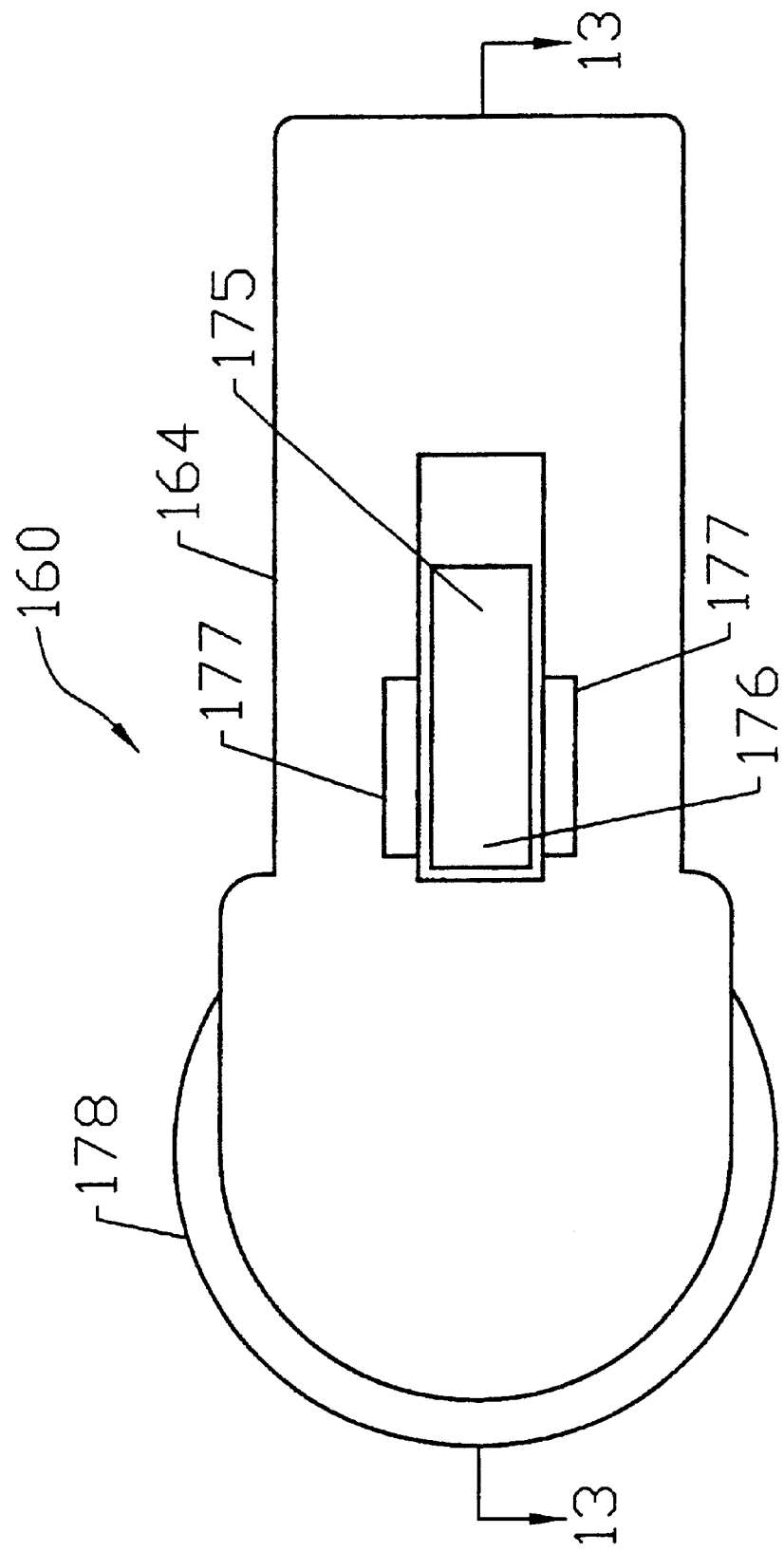
FIG. 12 is a top view of the embodiment shown in FIG. 11.
Figure 13:
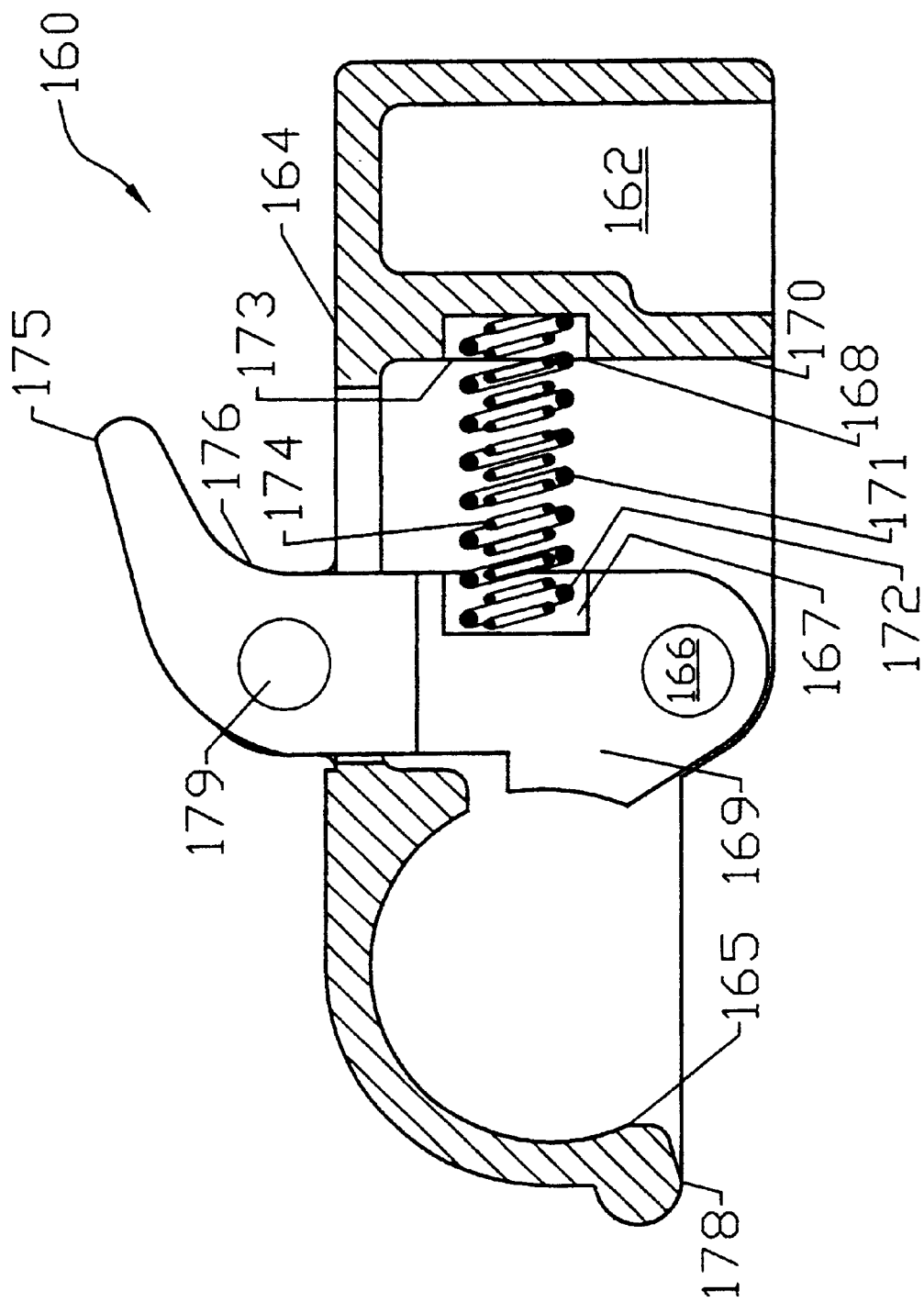
FIG. 13 is a side view of an embodiment of the device shown in FIG. 12, cut along cutting plane 13—13 depicting the latching mechanism in the closed position.

FIGS. 11–13 depict an additional embodiment of the hitch 160, which has been re-configured in some respects, from the embodiments of FIGS. 1–10. Furthermore, a cavity 162 is present in the frame 164, which reduces the weight. Hollows 167 and 168 are formed in the pivoting ball support 169 and the frame rear interior section interior surface 170, respectively. The hollows 167, 168 receive the spring 171 first end 172 and second end 173. An optional backup spring 174 is likewise secured. A pivoting ball support end portion 175 extends from the pivoting ball support top extension 176, forming an acute angle with the frame 164. Frame top extensions 177, frame exterior lip 178, frame interior lip 165, and pivoting ball support top extension hole 179, are also shown.

Figure 14:
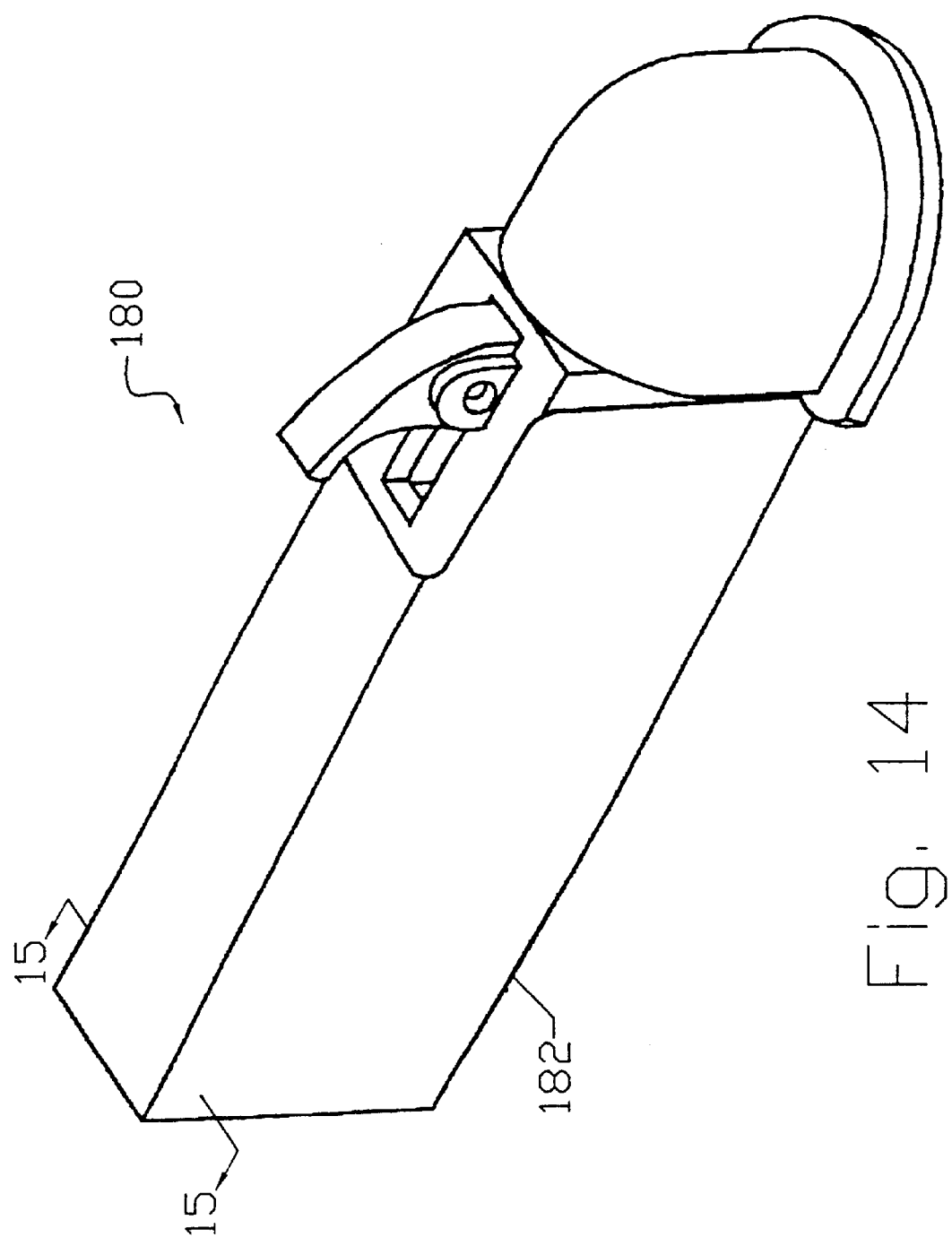
FIG. 14 is an oblique view of an embodiment of the device.
Figure 15:
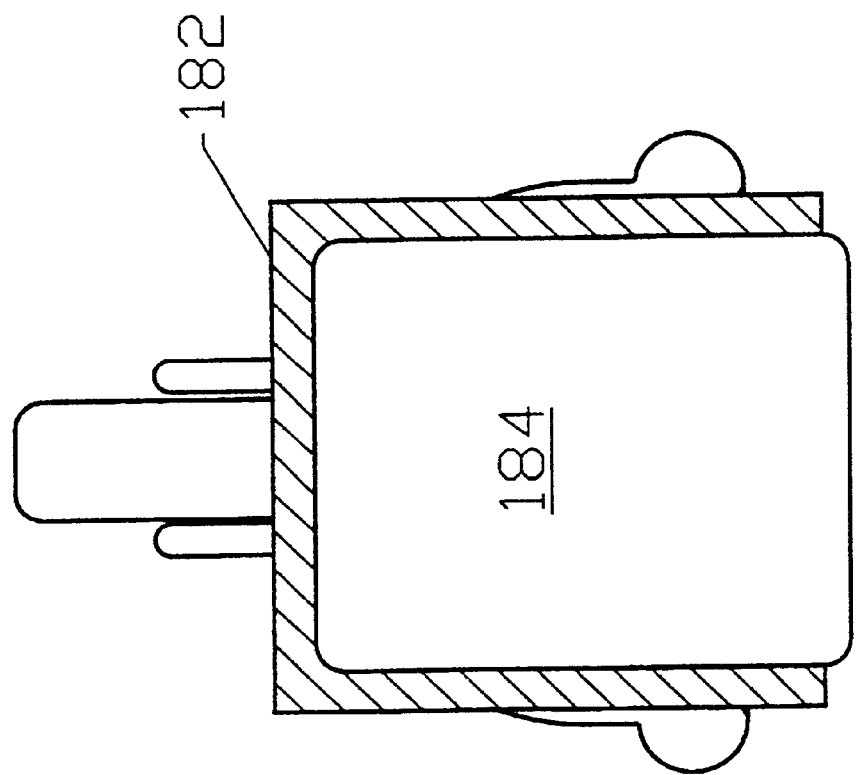
FIG. 15 is a rear view of the embodiment shown in FIG. 14, cut along cutting plane 15—15.

FIG. 14 depicts an embodiment 180 that includes the addition of channel structure 182. The channel structure 182 attaches, or is adaptable for attachment, to the frame 14,121, 156,164 of the embodiments shown in FIGS. 1–4 and 6–13. The channel structure 182 extends rearwardly, and as shown in FIG. 15, has a rearwardly facing channel-shaped opening 184 sized to closely receive rectangular structure, e.g., square tubing (not shown) extending from the trailer. The square tubing or other rectangular structure may be welded or otherwise attached to the channel structure 182. The channel structure 182 can be positioned with respect to the frame 14,121,156,164 such that the pivoting ball support pivot point 42,131,158,166 can be secured within the frame 14,121,156,164 in those embodiments wherein the pivoting ball support pivot point 42,131,158,160 extends, or can be extended, through the frame 14,121,156,164 such as those embodiments in FIGS. 1–4 and 6–13.

Figure 16:
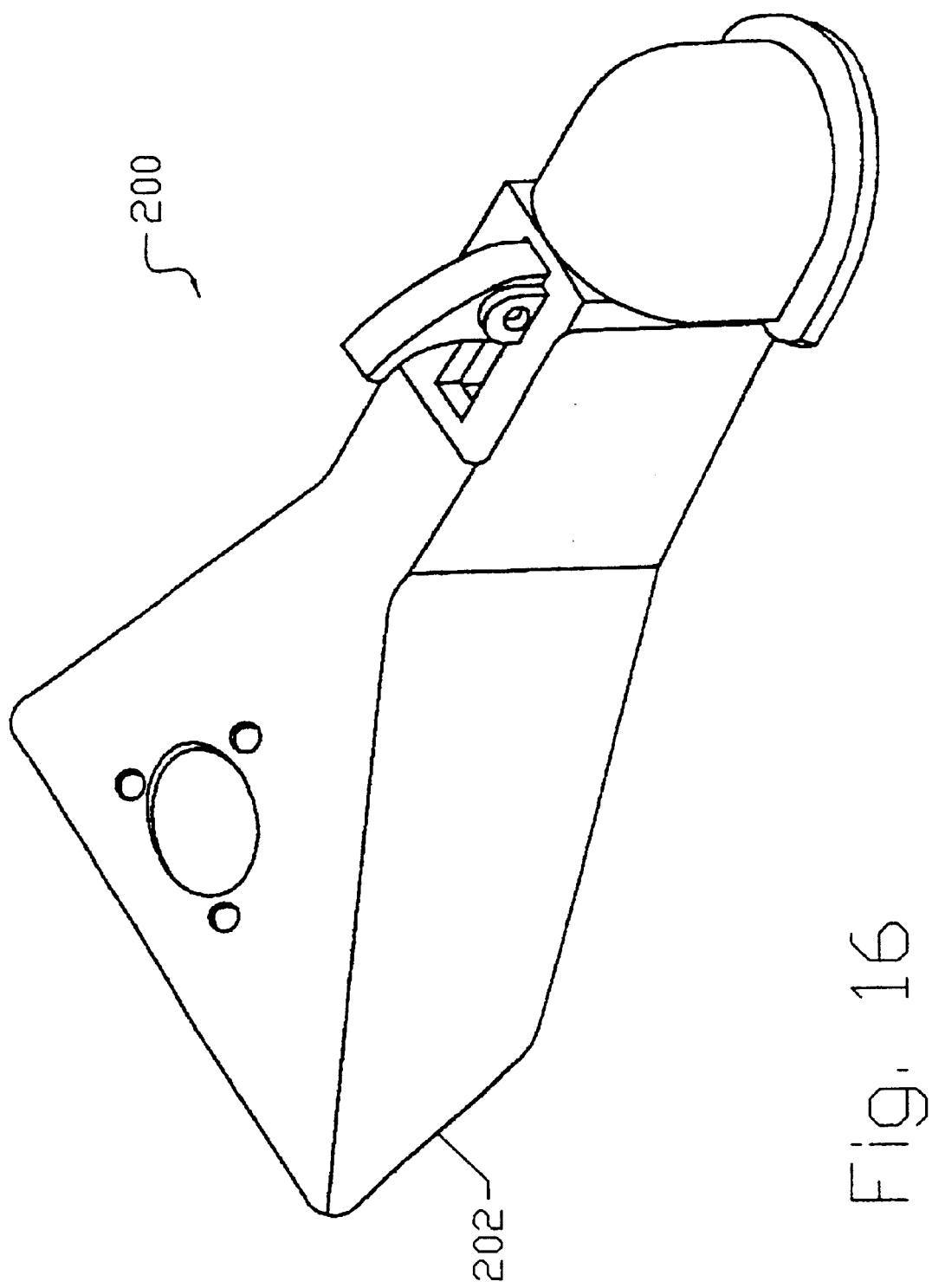
FIG. 16 is an oblique view of an embodiment of the device.
Figure 17:
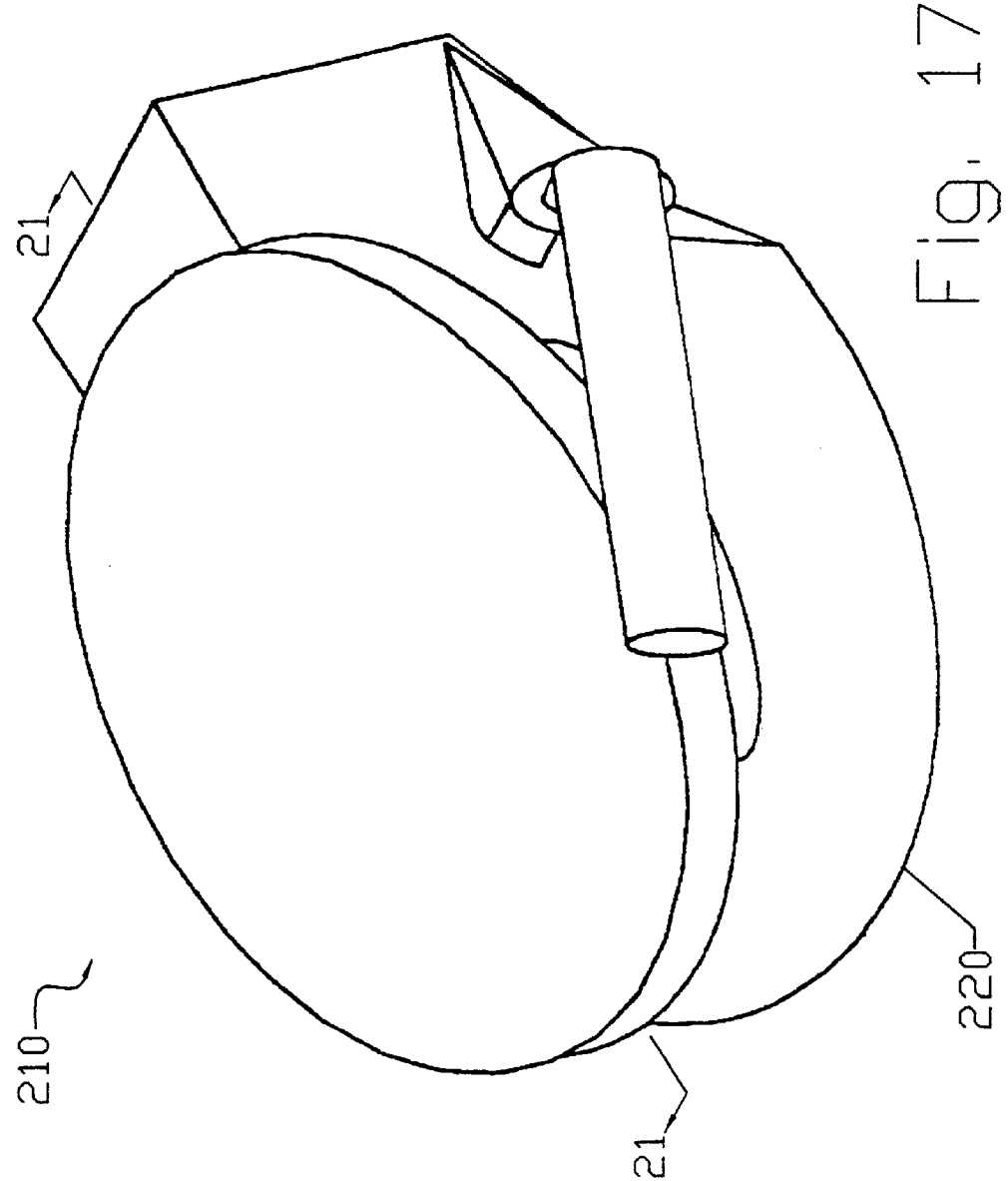
FIG. 17 is an oblique view of an embodiment of the device showing a gooseneck adaptation.
Figure 18:
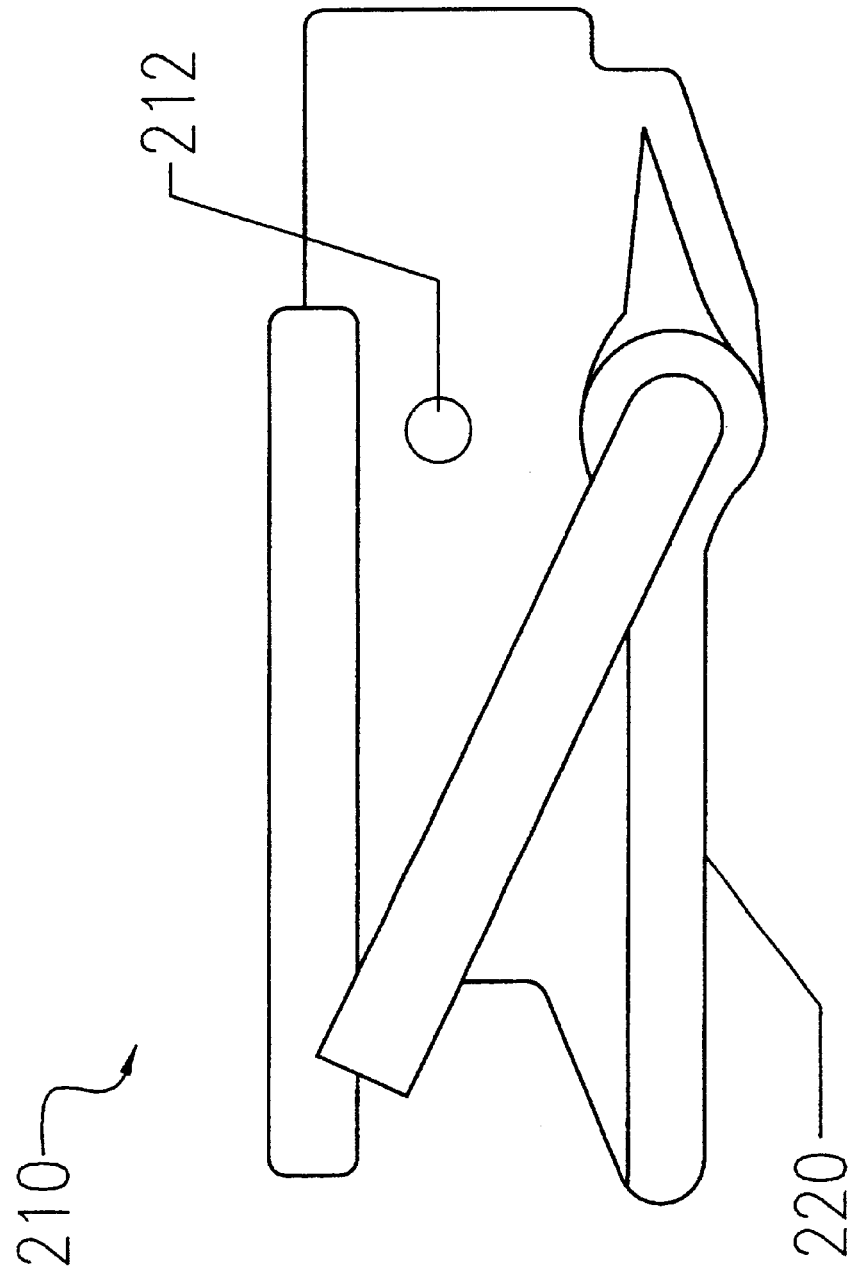
FIG. 18 is a side view of the embodiment shown in FIG. 18.
Figure 19:
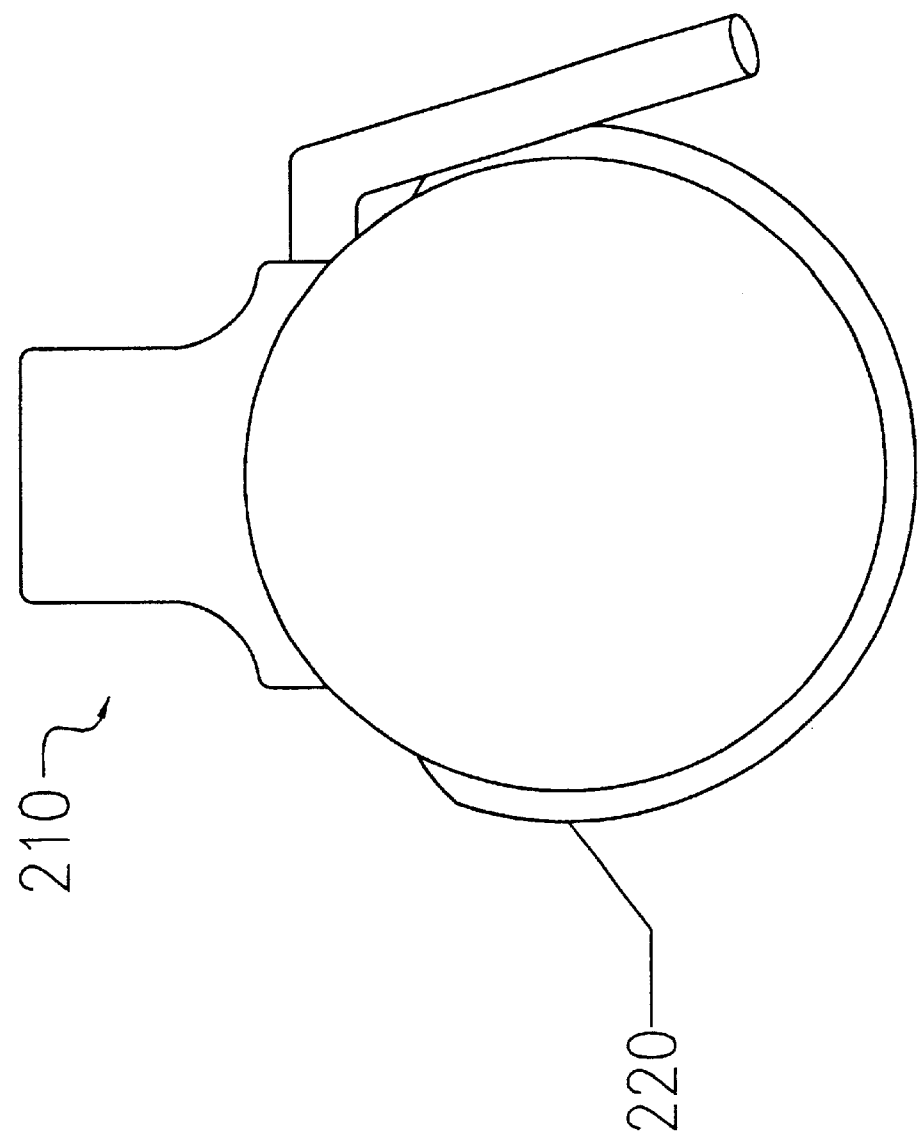
FIG. 19 is a top view of the embodiment shown in FIG. 17.
Figure 20:
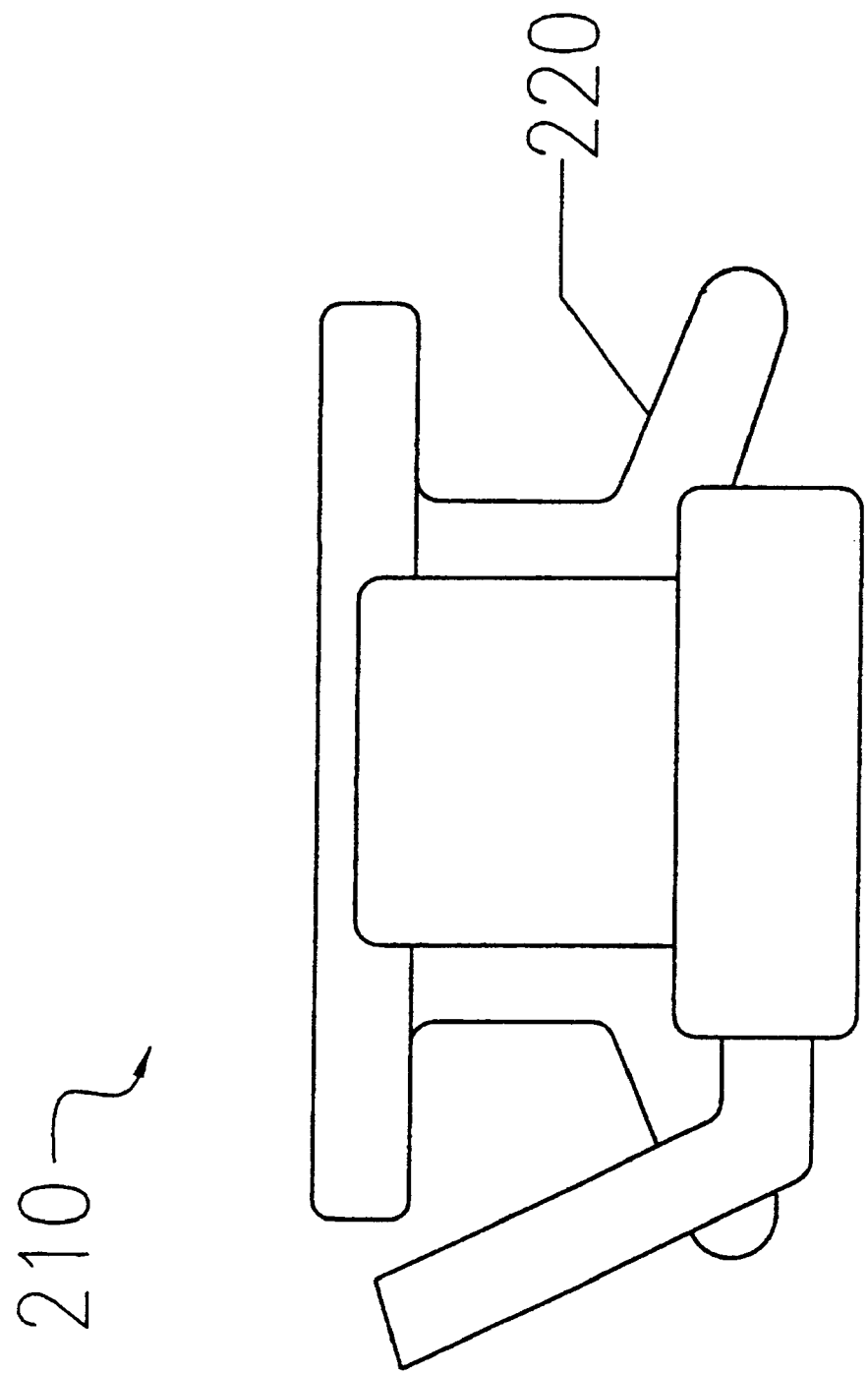
FIG. 20 is a rear view of the embodiment shown in FIG. 17.

Similarly, FIG. 16, depicts an embodiment 200 which includes an A-frame structure 202. The A-frame structure 202 attaches, or is adaptable for attachment, to the frame 42,131,158,160 and extends rearwardly to closely receive trailer tongue structure (not shown). Other structures for joining our device to particular trailer structures will occur to those of skill in the art upon review of this disclosure.

Figure 21:
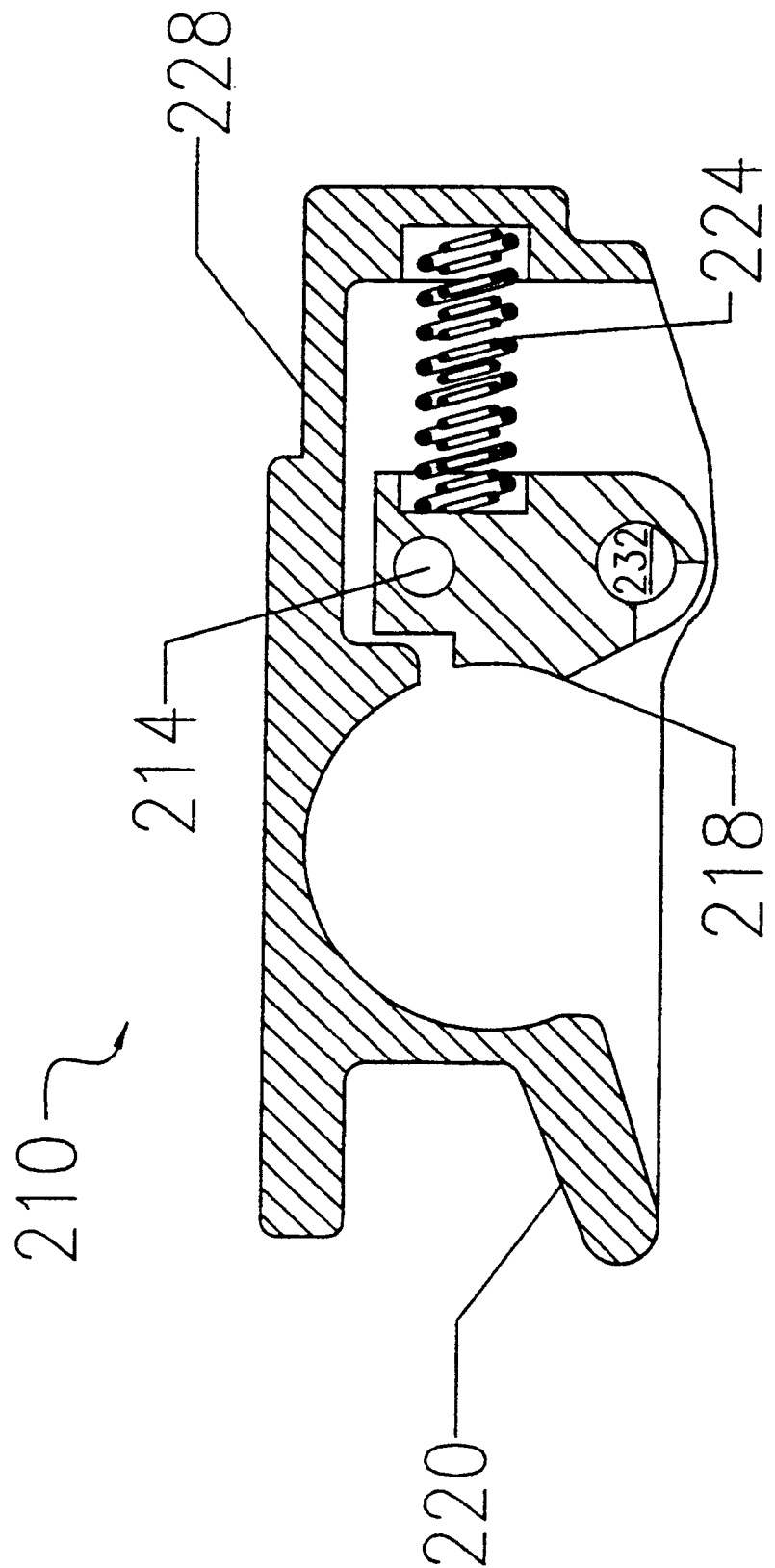
FIG. 21 is a side view of the embodiment of the device shown in FIG. 17, cut along cutting plane 21—21.

FIGS. 17–23 depict additional "gooseneck" embodiments 210 and 240. Although similar to FIG. 5, these embodiments include holes 212,214 in the frame 216 and pivoting ball support 218 which are aligned and sized for closely receiving a pin (not shown). An exterior frame lip 220, is also included. FIGS. 22–23 also depict vertical pipe or square tubing structure 222, which is included for the purposes described with regard to FIG. 5, above. The springs 224 shown in FIG. 21 are excluded from FIG. 23 such that a pivoting ball support stop 226 is revealed, which extends from one or both sides of the frame 228. The extension is such that the pivoting ball support 218 rotation is halted by contact between the pivoting ball support 218 and one or more of the pivoting ball support stops 226. A weld access opening 230 is originally present in the pivoting ball support 218 to allow the pivoting ball support 218 to be welded to the pivoting ball support pivot point 232. It is anticipated that all, or substantially all of such welding access hole 230 will be filled by weld material.

Figure 23A:
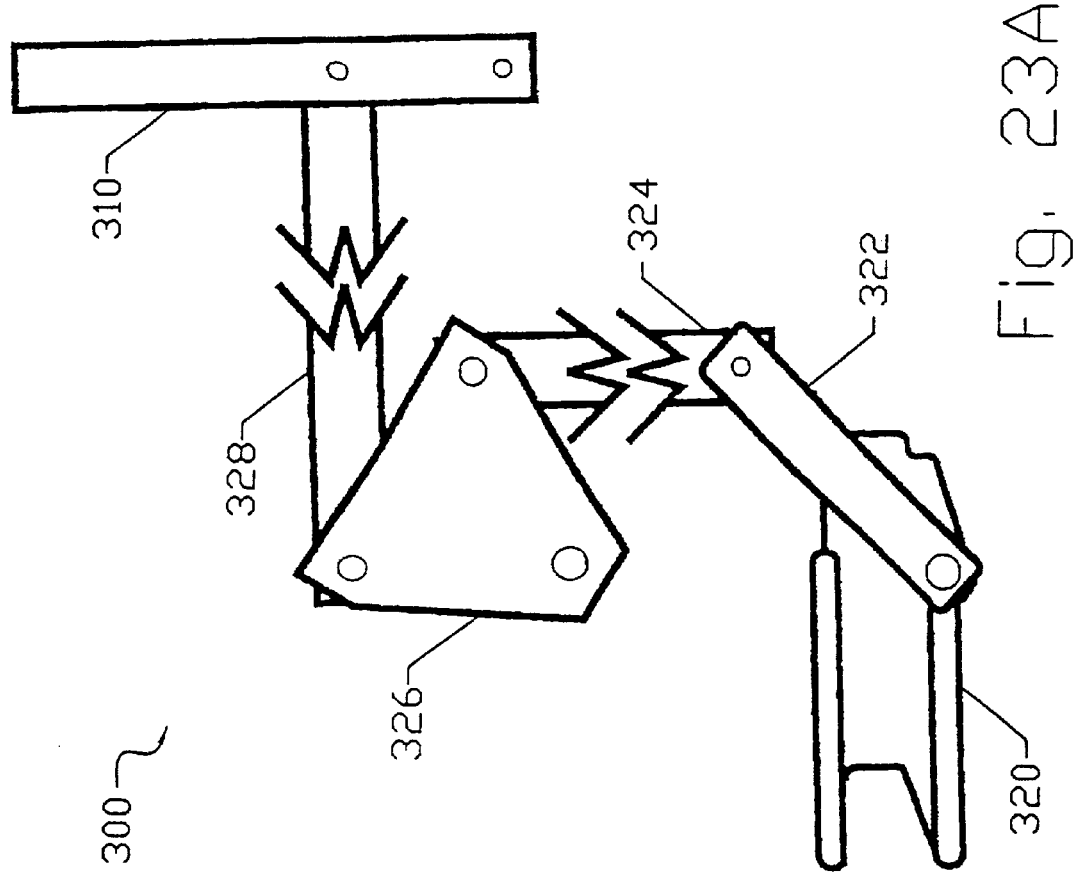
FIG. 23A is a side view of the remote access handle embodiment, with the longer members shown in cutaway form.
Figure 23B:
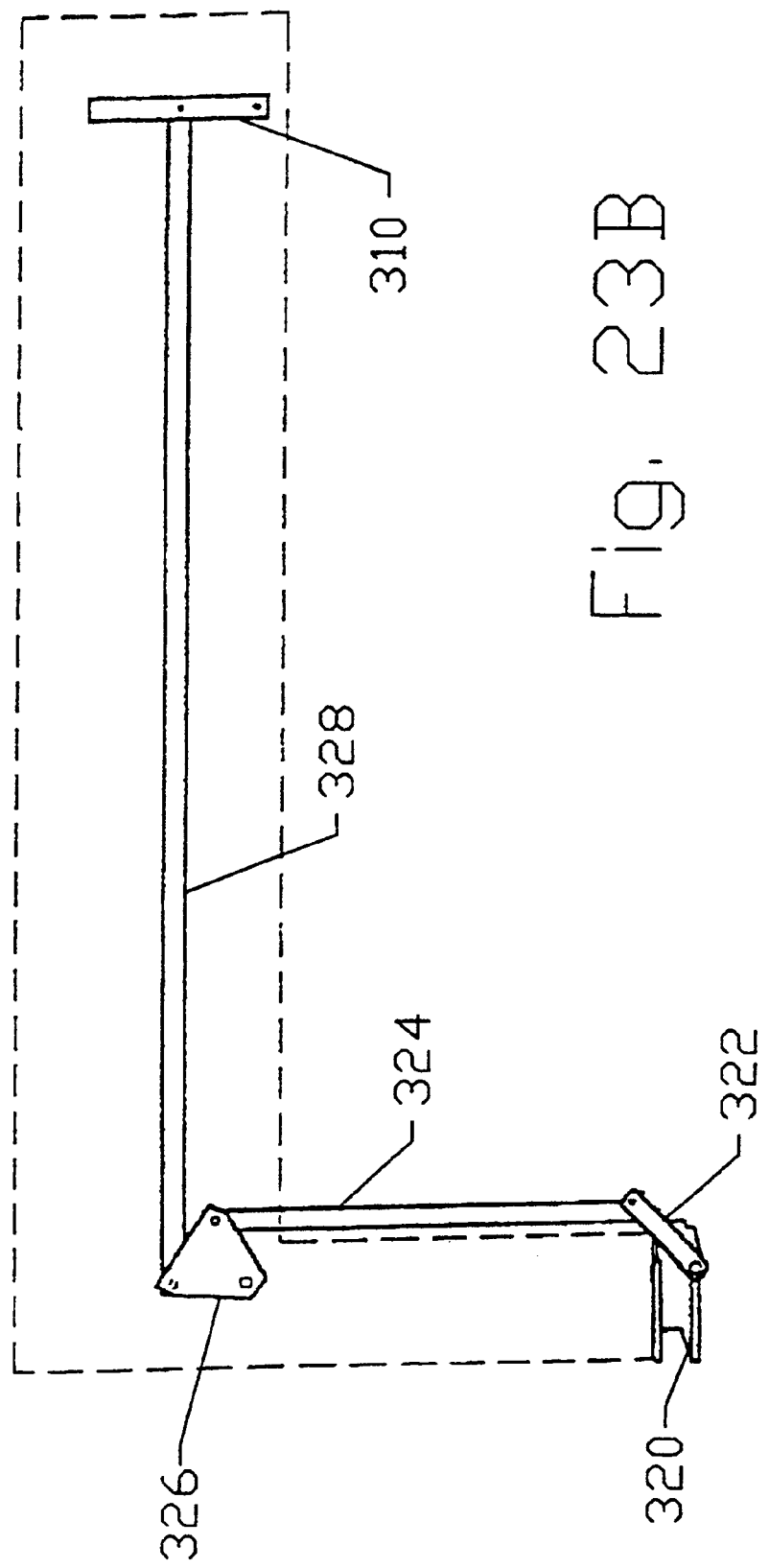
FIG. 23B is a side view of the remote access handle embodiment shown in its attached position on the gooseneck trailer structure.
Figure 25:
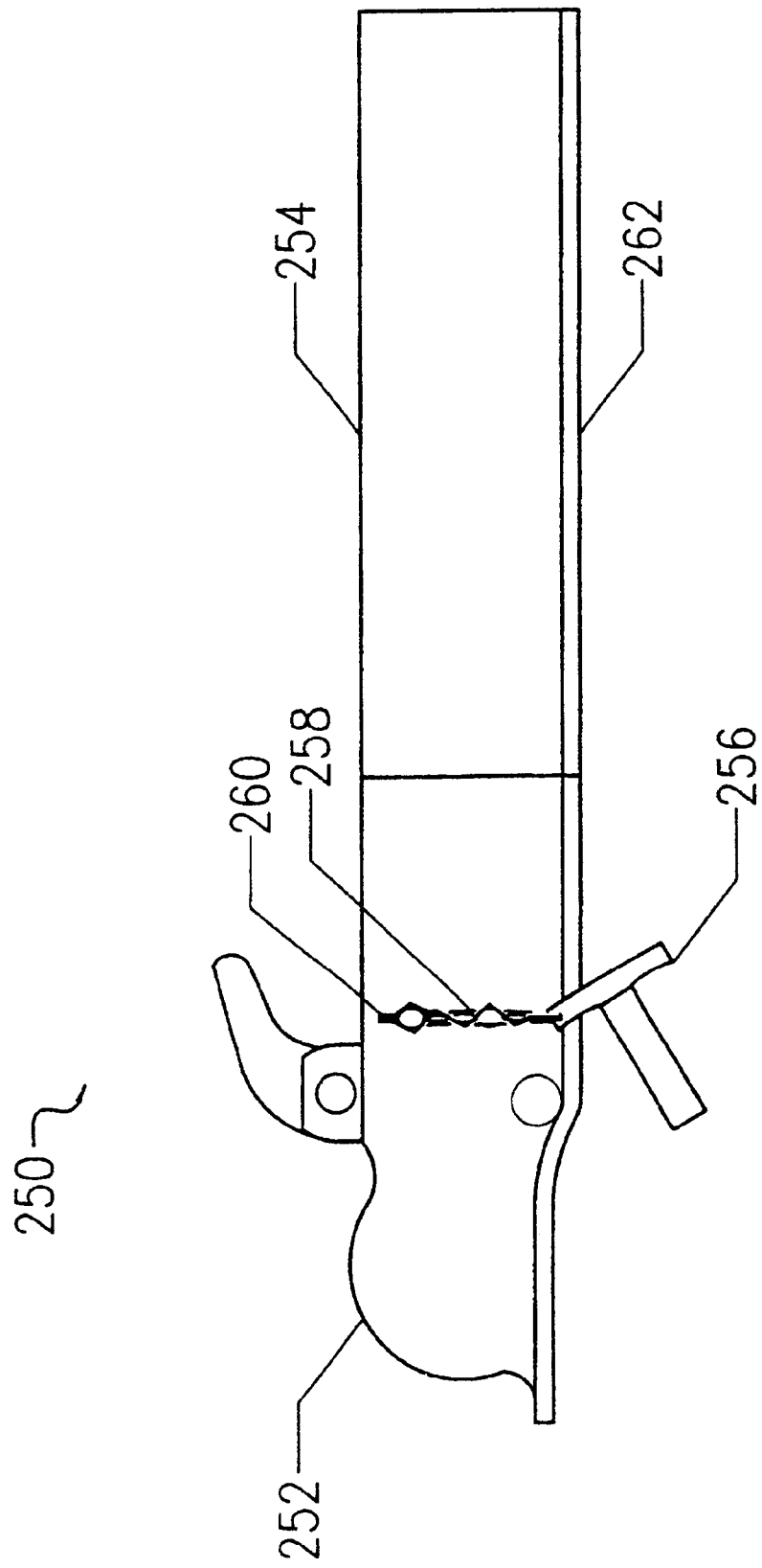
FIG. 25 is a side view of the device shown in FIG. 24.
Figure 26:
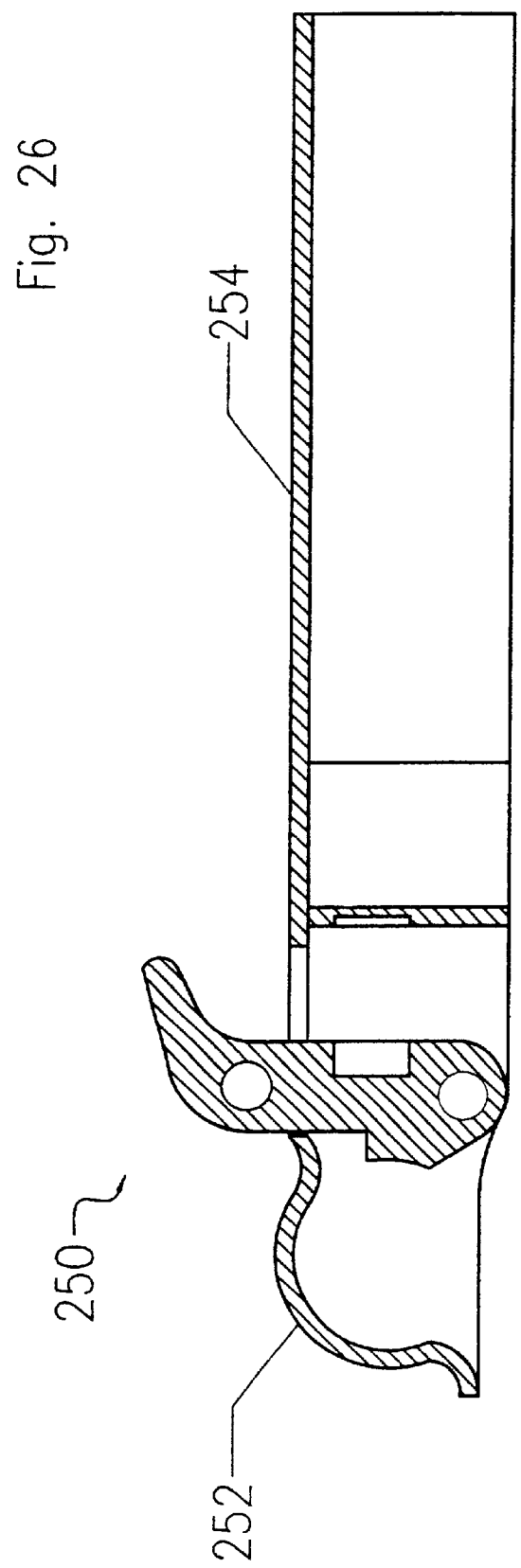
FIG. 26 is a side view of the embodiment shown in FIG. 24, cut along cutting plane 26—26, depicting the latching mechanism in the closed position.
Figure 27:
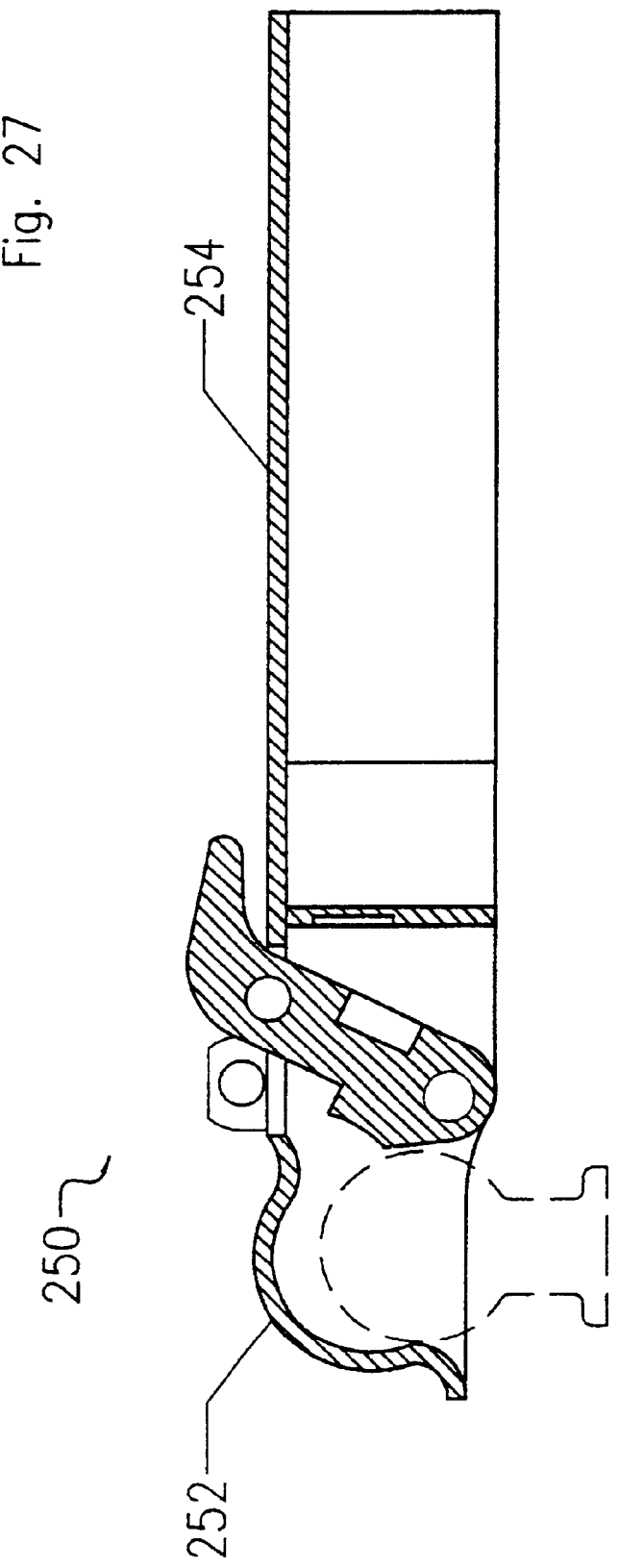
FIG. 27 is a side view of the embodiment shown in FIG. 24, cut along cutting plane 26—26, depicting the latching mechanism in the open position.

FIGS. 23A and 23B depict an additional embodiment 300 in which a handle 310 is made accessible at a distance from the hitch 320 through the hinged connection of a first member 322, a second member 324, a third member 326, and a fourth member 328. The third member 326 is hinged to the gooseneck trailer structure, and the handle 310 can, if desired, be hinged to the gooseneck structure as well. The handle 310 and four members 322,324,326,328 are constructed from flat mild steel, although other grades and shapes of steel may be utilized, as well as, one or more plastics. Flat, round, and hollow members 322,324,326,328 may also be utilized.

FIG. 23C depicts an additional embodiment 330 in which a handle 332 is made accessible at a distance from the hitch 334 through the hinged connection of a first member 336, a second member 338, a third member 340, a fourth member 342, a fifth member 344, and a sixth member 346. The third member 340 and the fifth member 344 are hinged to the gooseneck trailer structure, and the handle 332 can, if desired, be hinged to the gooseneck structure as well.

FIGS. 24–27 depict an additional embodiment 250 in which the frame 252 and the A-frame structure 254 are fashioned from pressed or stamped steel in a one-piece configuration. This configuration and manufacturing method will allow a simpler attachment of structures such as the A-frame structure 254 shown, and other structures for special trailer attachment requirements, such as the channel structure 182 shown in FIGS. 14–15. Such other structures, and the re-configurations of the hitch necessary to support this manufacturing method will occur to those skilled in the art upon review of this disclosure and as various trailer structures are presented for attachment. A pin 256, pin chain 258, and pin chain attachment point 260 are depicted on FIG. 25. This configuration and manufacturing method also includes a structural lip 262 extending along the frame 252 and A-frame structure 254. For clarity the spring(s) are not shown in FIGS. 24, 26–27.

Figure 28:
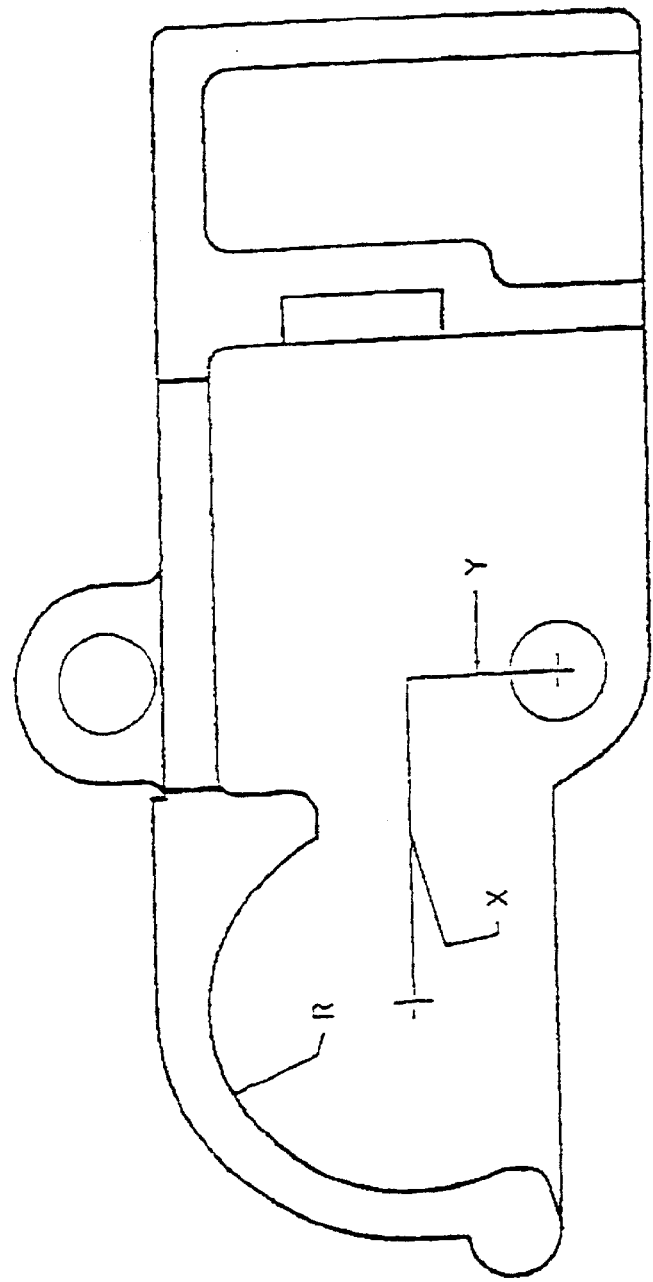
FIG. 28 is a side view cutaway depicting a typical embodiment which further illustrates the relationship between R, X, and Y which is believed to provide functionally satisfactory results for all embodiments of our invention, including embodiments utilized to secure balls of varying sizes. R is the radius of the ball housing, i.e., that portion of the frame front interior section that most closely receives the ball. The distances Y and X identify the position for the center of rotation of the pivoting ball support pivot point. These relationships are not exclusive.

FIG. 28 depicts a typical embodiment 270 and further illustrates the relationship between R, X, and Y which is believed to provide functionally satisfactory results for all embodiments of our invention, including embodiments utilized to secure balls of varying sizes. R is the radius of the ball housing, i.e., that portion of the frame front interior section 272 which most closely receives the ball. The distances Y and X identify the position for the center of rotation of the pivoting ball support pivot point 274. These relationships are not exclusive and as our invention is utilized in various embodiments, the identification of permissible tolerances in the relationship between R, X, and Y will occur to those of skill in the art after review of this disclosure.

Figure 29:
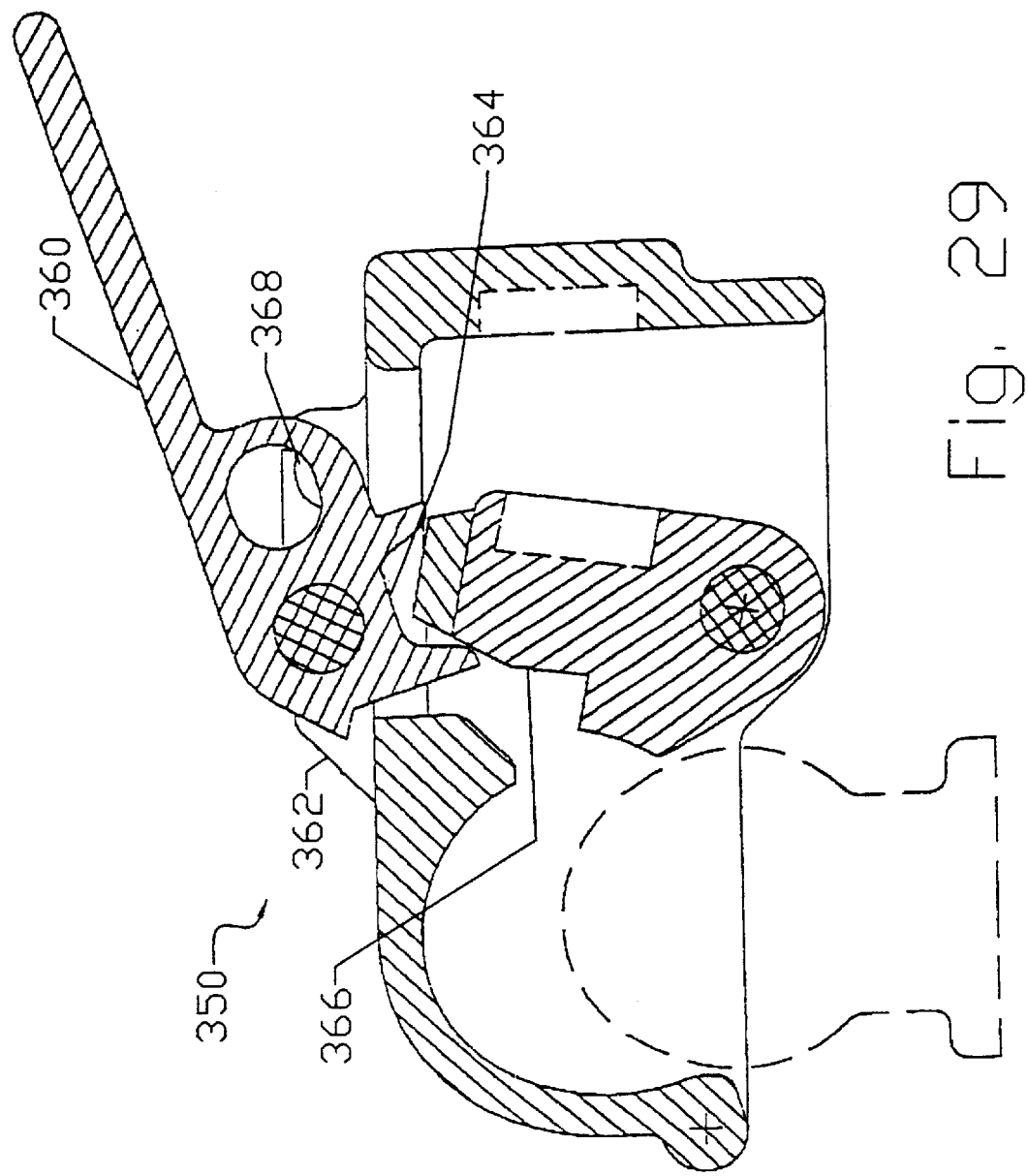
FIG. 29 is a cutaway side view of an embodiment depicting a handle, which is attached to the frame, with the handle raised, and the coupler in its open position.
Figure 30:
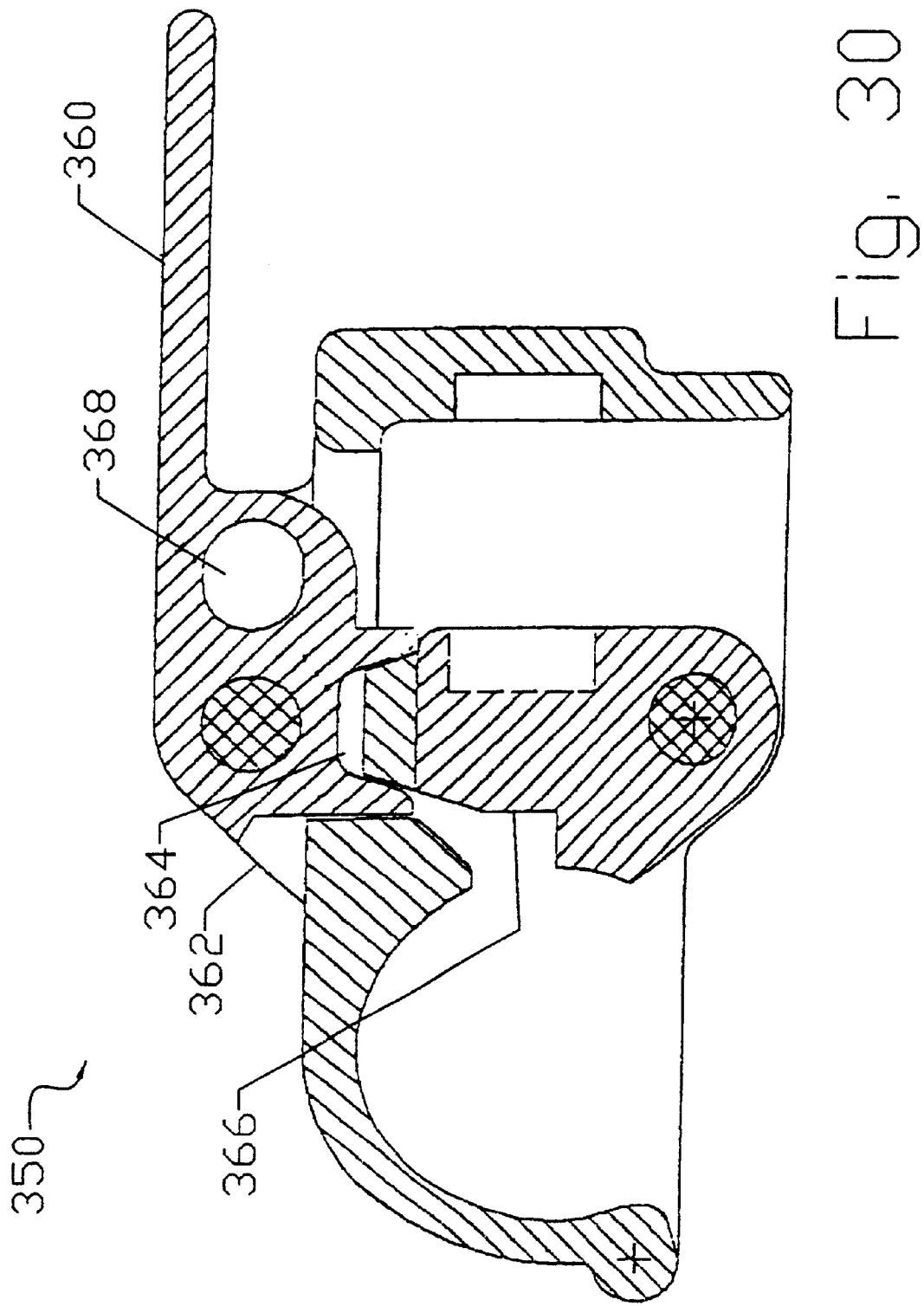
FIG. 30 is a cutaway side view of the embodiment shown in FIG. 29, the coupler being in its closed position.

FIGS. 29 and 30 depict an additional embodiment 350 which has a handle 360 hinged to the frame 362 which has a recess 364 which closely receives the top of the pivoting ball support 366 when the pivoting ball support 366 is in its first position. The rotation of the handle 360 moves the pivoting ball support 366 to its second position, as shown in FIG. 30. A hole 368 in the handle 360 is also provided for purposes of inserting a pin (not shown) or a lock (not shown).

Figure 31:
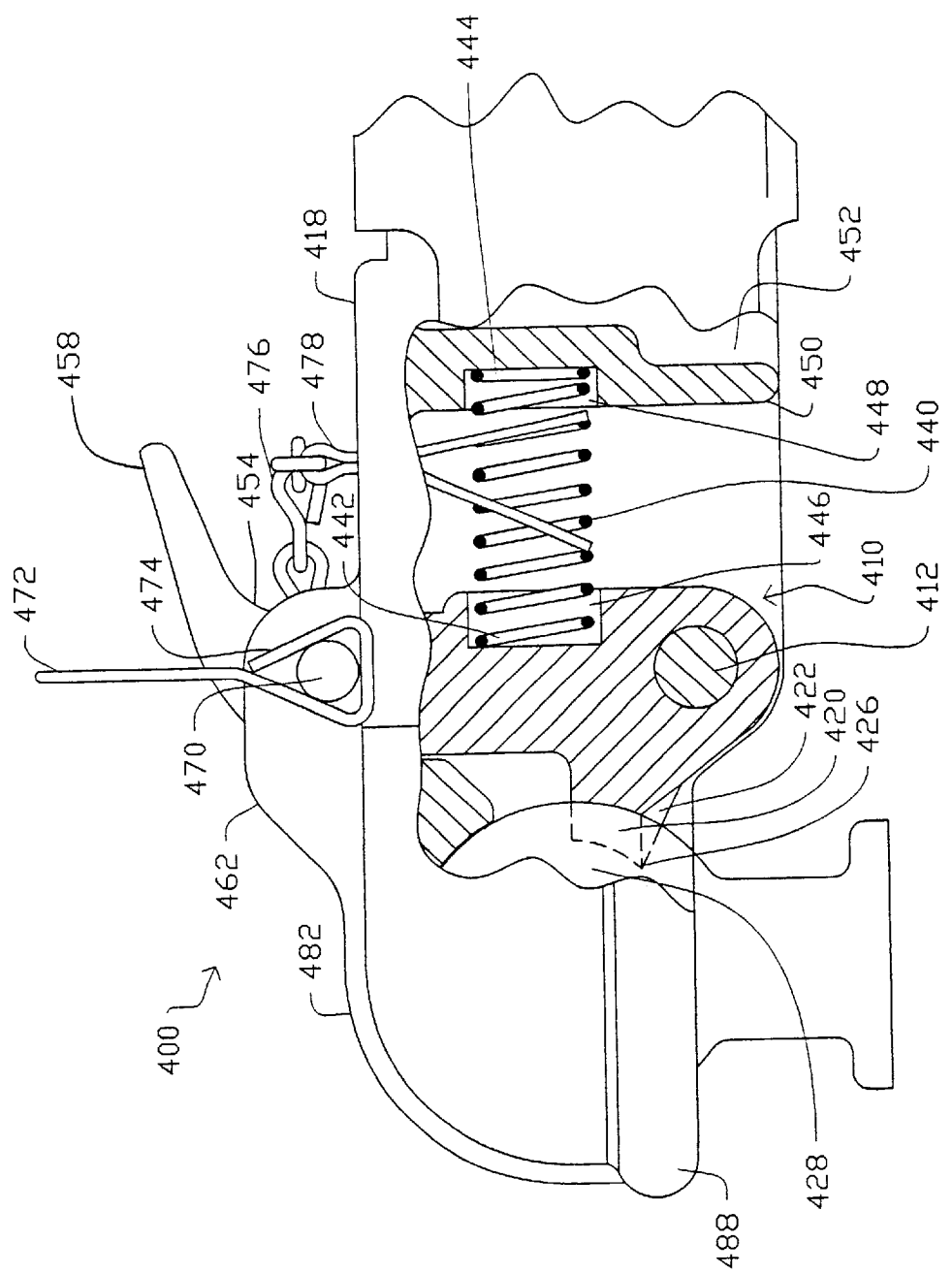
FIG. 31 is a side view of an embodiment of the device, with a portion cutaway to expose a partial sectional view.
Figure 32:
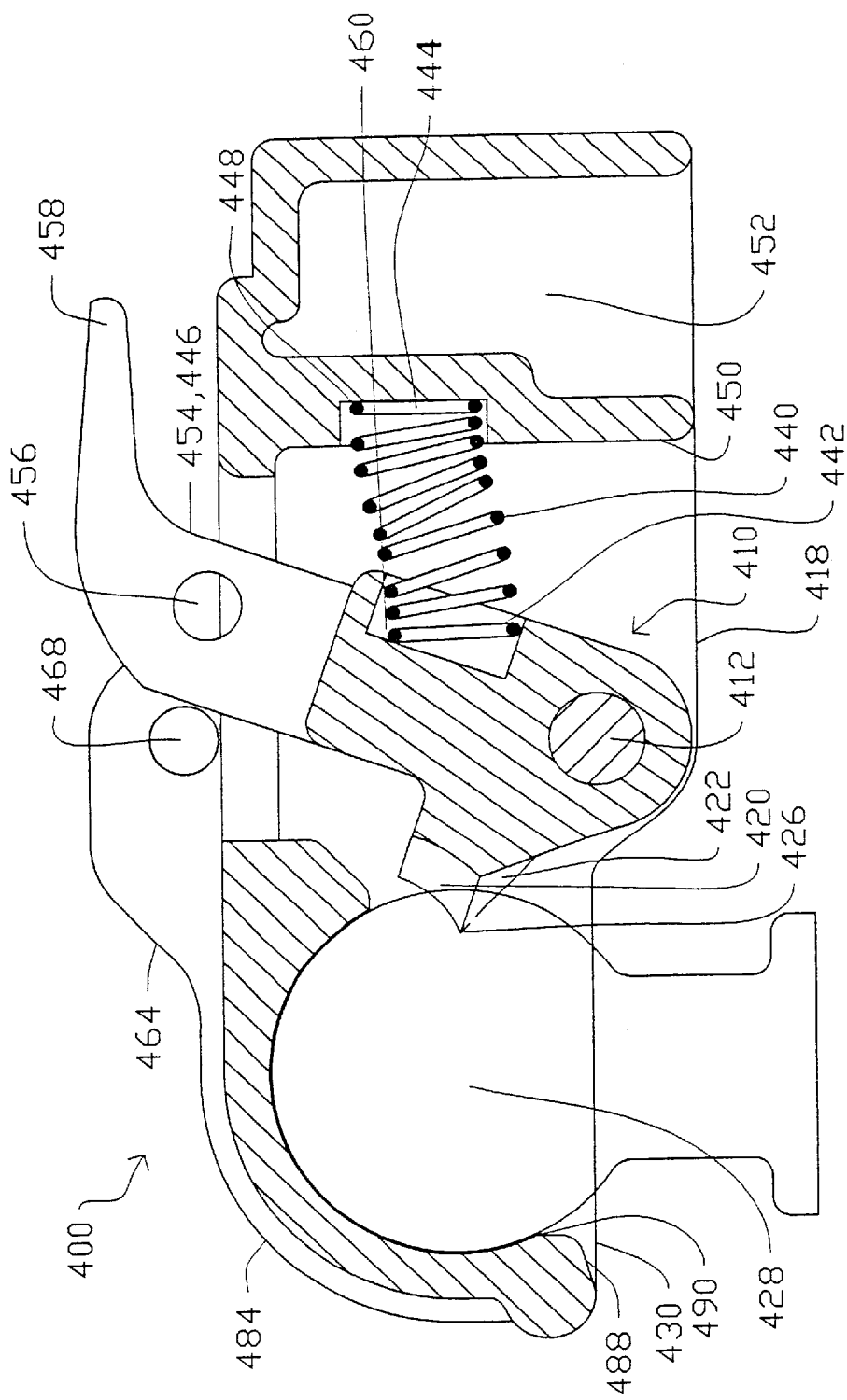
FIG. 32 is a sectional view of the device of FIG. 31 cut along the longitudinal axis of the device, the coupler being in the open position.
Figure 33:
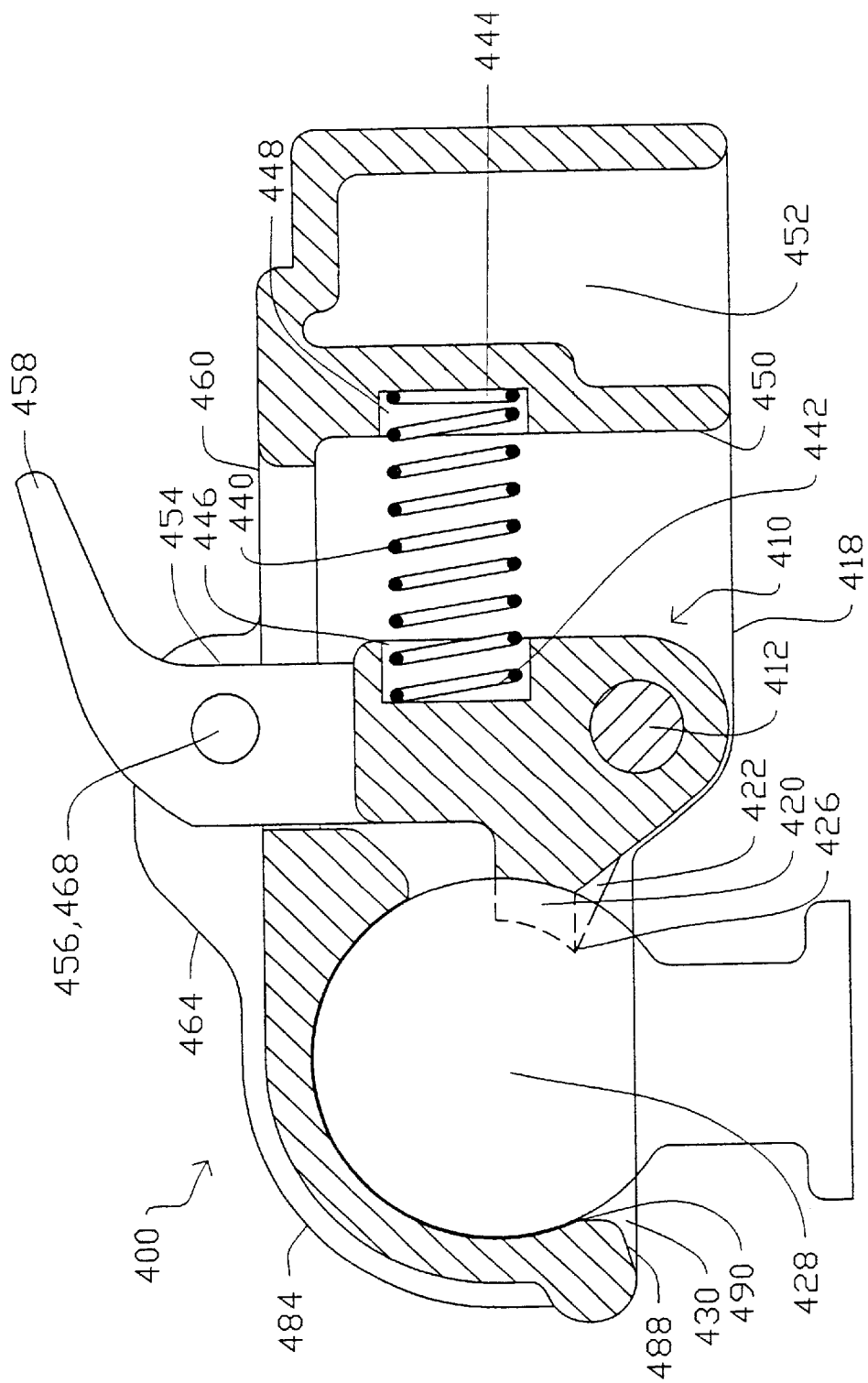
FIG. 33 is a sectional view of the device of FIG. 31 cut along the longitudinal axis of the device, the hitch being in the closed position.

FIGS. 31–38 depict an additional embodiment 400 that is made from cast steel. This embodiment 400 includes a specially modified pivoting ball support 410 that pivots around a pivot point, in this instance a fixed shaft 412, the fixed shaft having ends 414, 416 attached to the frame 418. FIGS. 32–33 depict the pivoting ball support 410 in the second and first positions, respectively.

Figure 34:
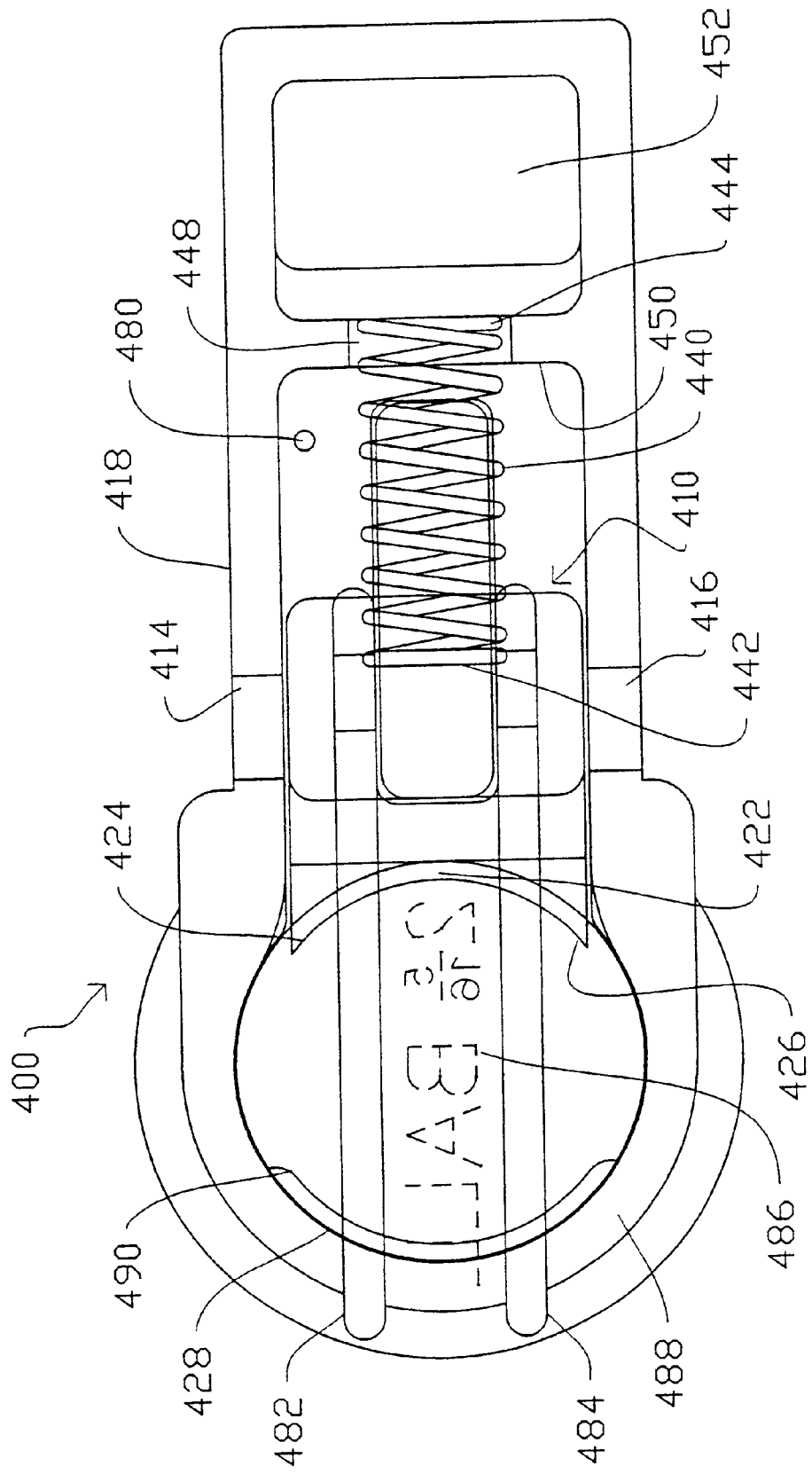
FIG. 34 is a bottom view of the device of FIG. 31 with the inserted ball shown in phantom line along with portions of the top structure.
Figure 35:
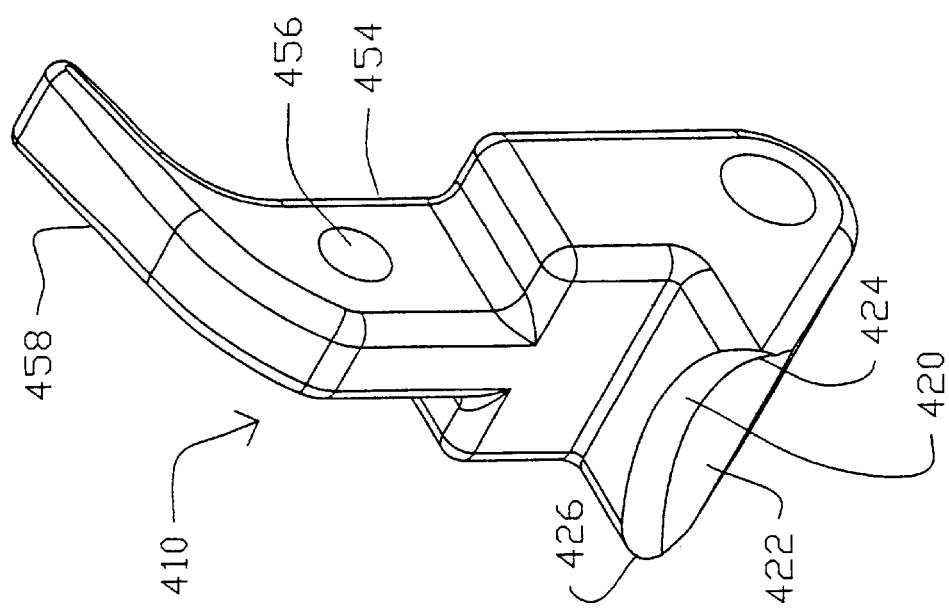
FIG. 35 is an oblique front and side view of the pivoting ball support used in the device of FIG. 31.
Figure 36:
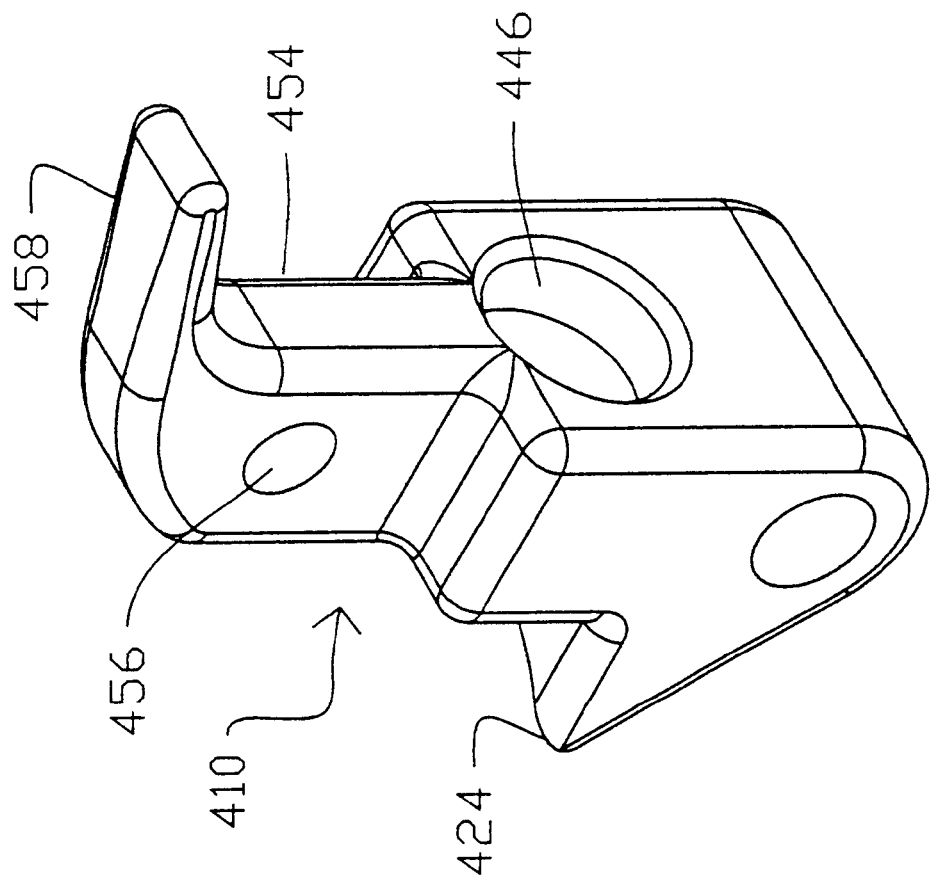
FIG. 36 is an oblique rear and side view of the pivoting ball support used in the device of FIG. 31.
Figure 37:
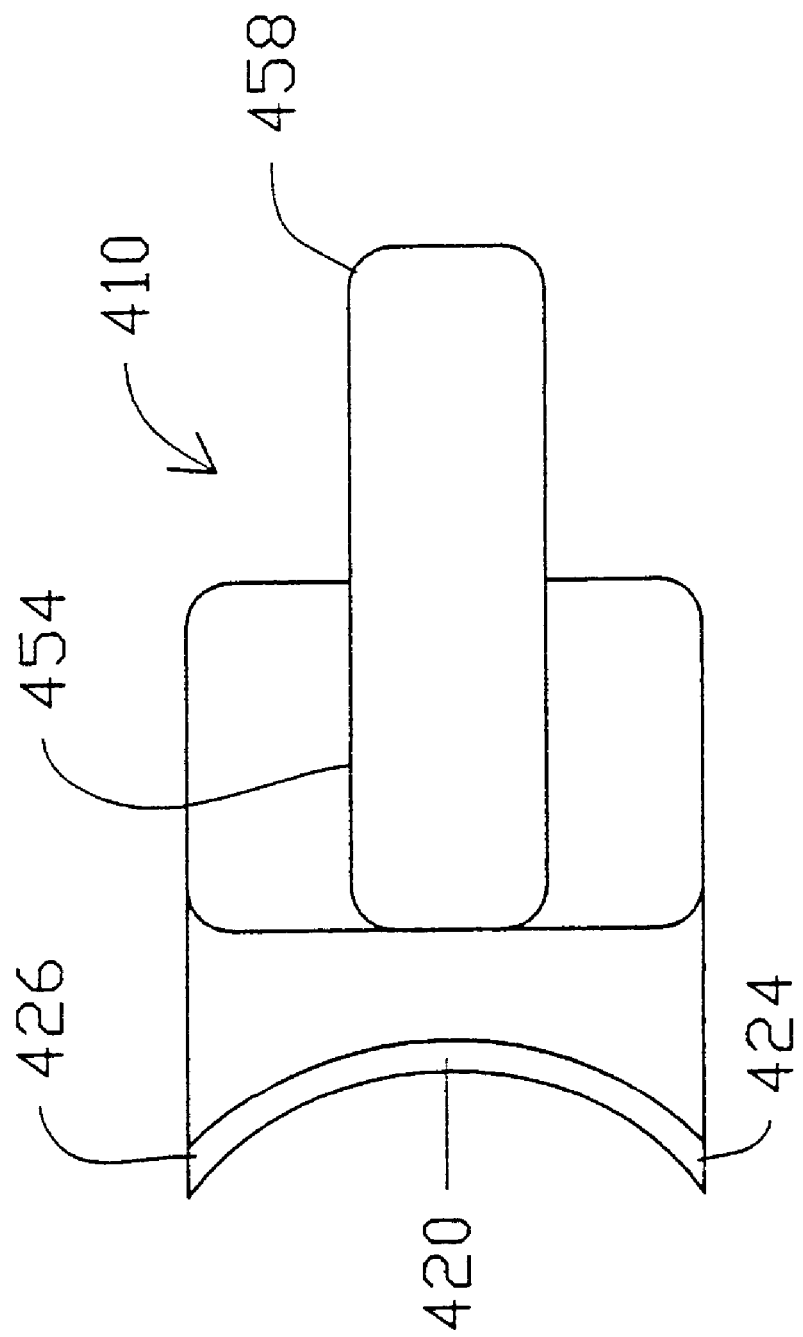
FIG. 37 is a top view of the pivoting ball support used in the device of FIG. 31.
Figure 38:
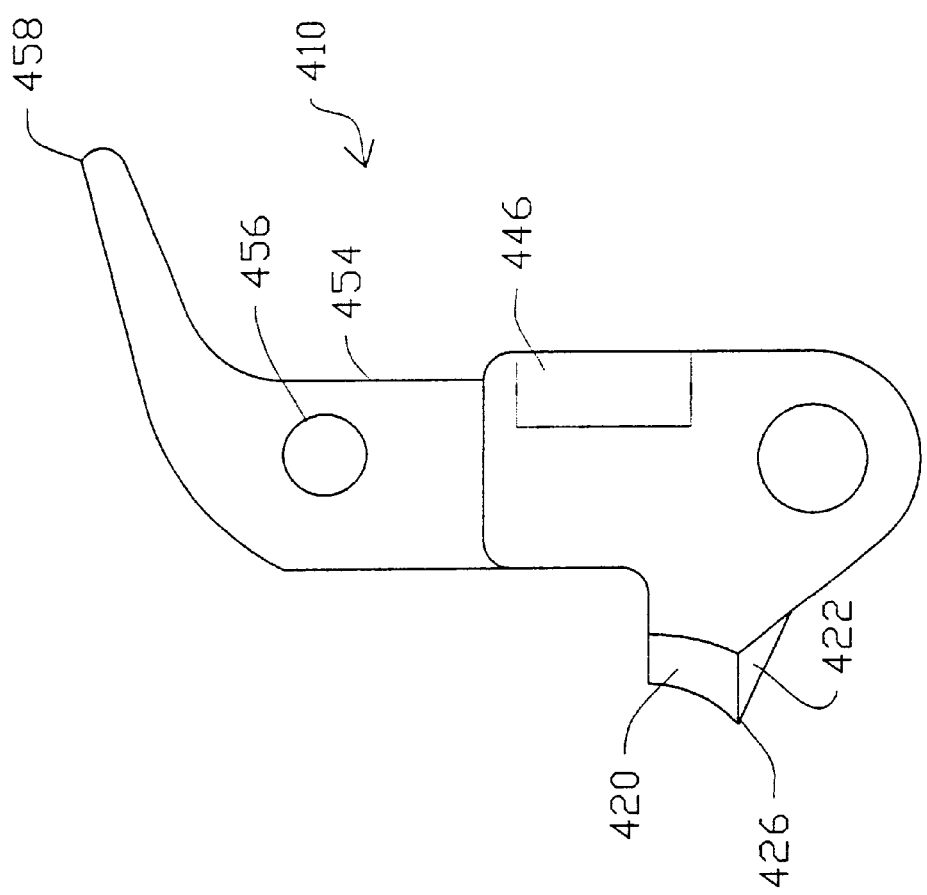
FIG. 38 is a sectional view of the pivoting ball support used in the device of FIG. 31, cut along the longitudinal axis.

As shown particularly in FIG. 35, this pivoting ball support 410 has a first and second face 420,422, both being recessed. The two faces 420,422 are sized and shaped to provide extensions 424,426 that partially surround the ball 428. FIG. 34 depicts the forward extent of such extensions 424,426 while the pivoting ball support 410 is in the first position.

The pivoting ball support first face 420 recess and the extensions 424,426 are generally shaped to the contours of the ball 428, while the second face 422 is recessed to the extent necessary to allow the ball 428 to completely enter the frame opening 430 while the pivoting ball support 410 is in the second position. The second face 422 recess enables the extensions 424,426 to extend farther forward, allowing a more complete and secure encounter with the ball 428.

A spring 440 is provided to bias the pivoting ball support 410 into the first position. As shown in FIGS. 32–33, the spring first and second ends 442,444 are received and secured by hollows 446,448. The first hollow 446 is formed in the pivoting ball support 410, while the second hollow 448 is formed in the frame rear interior portion 450. The frame rear interior portion 450 defines a cavity 452 that is formed to reduce the overall weight of the hitch 400. The hollows 446,448 are right-angled, circular intrusions, although other shapes with sufficient depth and cross-sectional area would also secure the spring 440.

In this embodiment 400, the pivoting ball support 410 has an extension 454 that, in turn, has a hole 456 and an end portion 458, the extension 454 protruding through a slot 460 in the frame 418. The frame 418 also has top extensions 462,464 with each having a hole 466,468. As shown in FIG. 31, the protruding portion of the pivoting ball support extension 454 includes the hole 456, the hole 456 aligning with the frame top extension holes 466,468, such that a pin 470 is closely received. The pin 470 is held in place by a retaining member 472 that is attached to one end of the pin 470 and movable into a position to clasp the pin 470 with a triangular portion 474. The retaining member is attached to a chain 476 with an attached cotter pin 478 that is squeezable for insertion and close reception by a cotter pin hole 480 in the frame 418. A typical lock can be used in lieu of the pin 470, particularly when security is an issue.

The ability to closely receive the pin 470, that is provided by the frame top extensions 462,464, the pivoting ball support extension 454, and holes 456,466,468 provide the means for preventing the movement of the pivoting ball support 410 from the first position to the second position.

When the pin 470 is not in place, the pivoting ball support 410 can be rotated from the first position to the second position by pushing downwardly on the pivoting ball support extension end portion 458. The acute angle that the end portion 458 makes with the frame 418 enables this more convenient and safe hand motion, as opposed to positioning the hand much closer to the hitch's moving parts to align the hand for a rearward push.

Ridges 482,484 are positioned from the front and along the length of the frame 418 until the ridges 482,484 join the frame top extensions 462,464. The frame top extensions 462,464 are downwardly swept, and of sufficient height that an intruding object that has previously struck the ridges 482,484 is encouraged to slide along the ridges 482,484 and be displaced from the frame top extensions 462,464 along a path that is above the pivoting ball support extension end portion 458. This reduces the likelihood of the end portion 458 being struck, thereby loading the pin 470 and creating a possible pin shear event.

The ridges 482,484 also protect raised lettering 486 that is nestled between the ridges 482, 484. Such lettering can provide important information to the user, such as an indicator of the proper ball size to be used with the particular hitch 410. The protection provided by the ridges 482,484 prevents wear and tear on such lettering 486.

As shown in FIGS. 31–34, a frame exterior lip 488 extends from the frame 418 and provides structural rigidity and assists in guiding the ball 428 into the frame opening 430 during the hookup process. This feature is present in the embodiments shown in FIGS. 6–23 and FIGS. 28–30, as well.

As further shown in FIGS. 32–34, a frame interior lip 490 extends into the frame opening 430 and is positioned to extend beneath a portion of the ball 430 that is fully positioned in the frame 418. FIG. 34 provides additional detail for this feature, the feature also being present in the embodiments shown in FIGS. 1–23 and FIGS. 28–30.

The compact configuration of the components in this embodiment 400 has enabled particularly favorable dimensional relationships between such components.

For example, it is desirable for the spring 440 to be as short as possible in order to reduce the tendency to bind and to reduce the section of the spring 440 that is exposed to the accumulation of mud, debris, etc. The spring length in those hitches having a corresponding spring function, cannot be arbitrarily reduced, however, and it is the unique manner in which the involved components of this embodiment 400 are shaped and positioned, that enables the use of a shorter spring 440 length than is provided in any known prior art. Unlike any known prior art, the spring 440 length in this embodiment 400 is less than the ball 428 diameter when the pivoting ball support 410 is in the first position. This is also true of the embodiments shown in FIGS. 11–13.

When compared with other known prior art hitches having a latch mechanism, where the latch pivots rearwardly to release the ball, the embodiment 400 appears optimized with respect to several other indicators of an optimal component configuration.

For example, a dimensional relationship between components that is a direct indicator of the structural integrity of this embodiment 400 is the ratio of the width of the pivoting ball support 410 to the width of the frame 418, when the widths are measured at the shaft 412. A high ratio indicates that the shear load placed on the shaft 412 by the load-bearing pivoting ball support 410 will be distributed along the entire length of the shaft 412, or concentrated near the shaft ends 414,416, both events avoiding shear loads being applied disproportionately toward the center of the shaft 412. In this regard, this embodiment 400 has a ratio of more than 0.70, unlike any of the above-described prior art hitches, all of which fall below 0.70.

For the same reasons, a relatively higher ratio of the width of the pivoting ball support 410 to the ball 428 diameter is also indicative of an optimized structure. This embodiment 400 has a ratio of above 0.70, while the above-described prior art hitches have ratios falling below 0.70.

Another indicator of an optimized structure is the ratio of the ball 428 diameter to the maximum width of the frame 410 at the shaft 412. Generally, a hitch using a pivoting latch will be structurally enhanced if the frame structure behind the frame portion including the ball is concentrated such that the ball width exceeds the frame width and such frame structure is approximately at or within the ball's outside edges when viewed from above. This embodiment 400 has a ratio of approximately 1.0 while none of the above-described prior art hitches exceed 0.95

Another advantage of the optimal configuration provided by this embodiment 400 is the relatively small degree of pivoting ball support pivoting required to release the ball 428. The degree of pivot is approximately 19 degrees. This is lower than all the known prior art hitches described above, and no such prior art hitch is known that has a degree of required pivot less than 21 degrees when the latch releases in a rearward motion.

The features of this embodiment 400 can also be provided using a pivoting ball support attached to a pivoting shaft.

This embodiment 400 appears to have the optimum configuration for a cast hitch, based on our current experience, although other adjustments to such configurations may occur to those of skill in the art after review of this disclosure.

Figure 39:
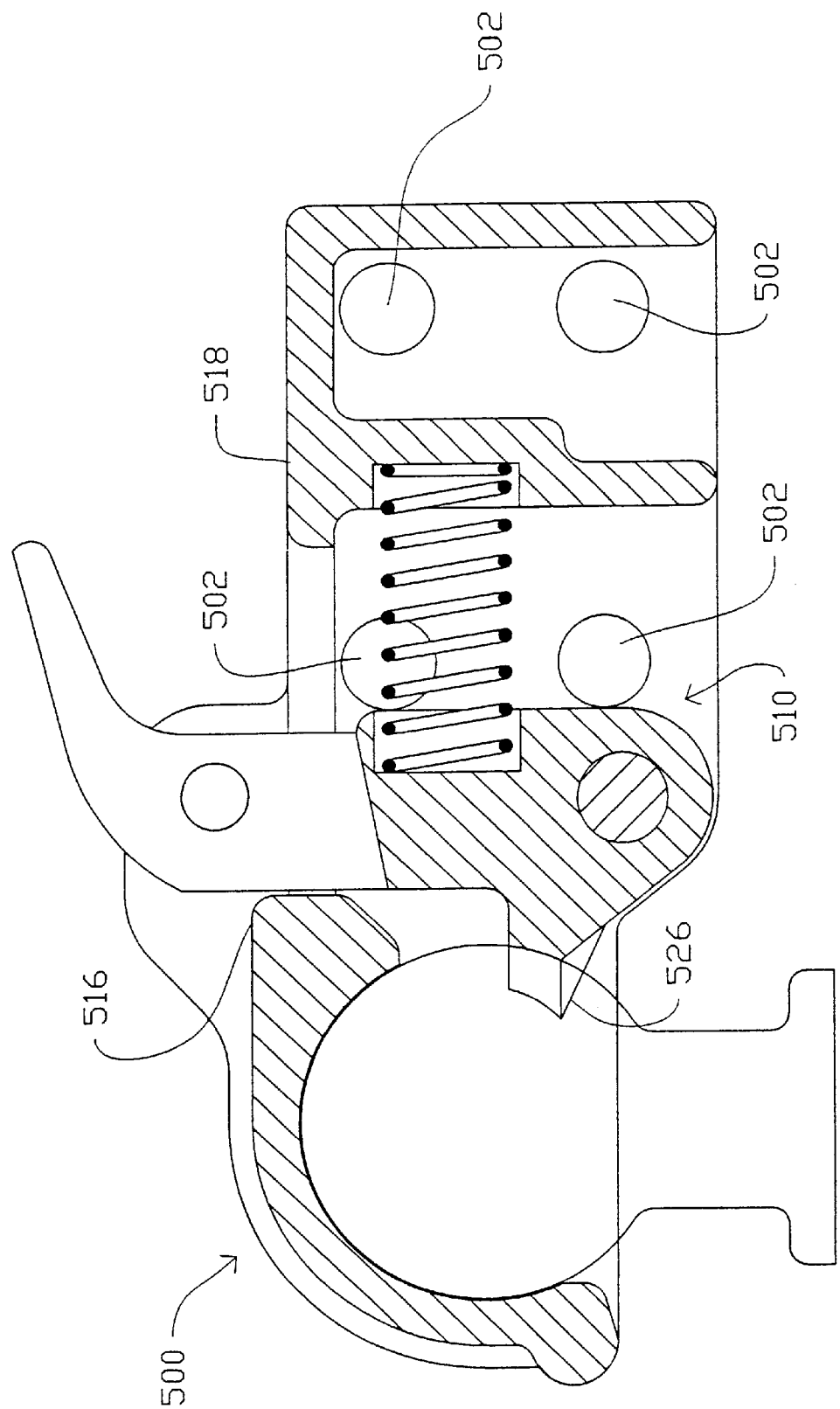
FIG. 39 is a sectional view of an embodiment of the device cut along the longitudinal axis of the device, the hitch being in the open position.
Figure 40:
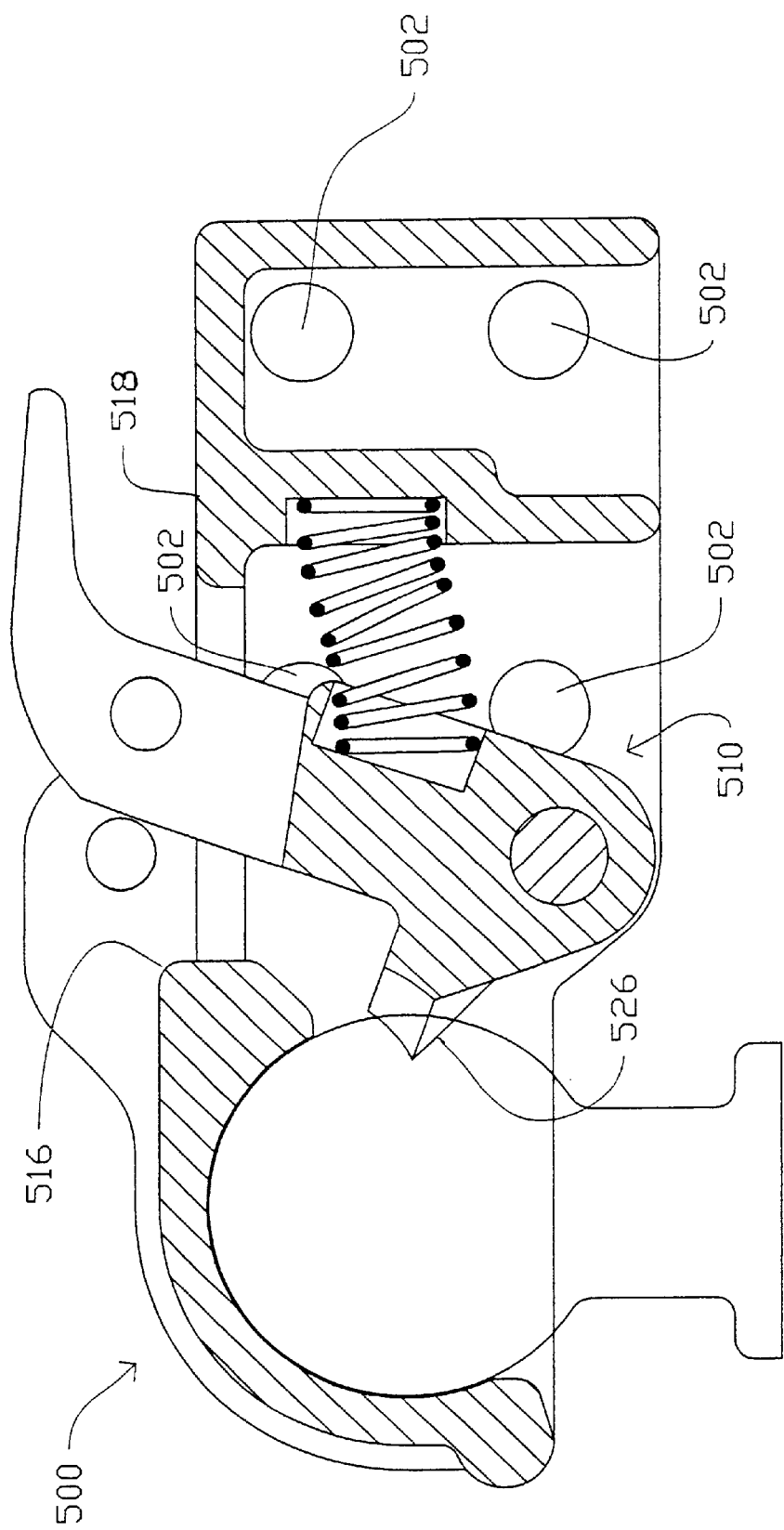
FIG. 40 is a sectional view of the device of FIG. 39 cut along the longitudinal axis of the device, the hitch being in the closed position.
Figure 41:
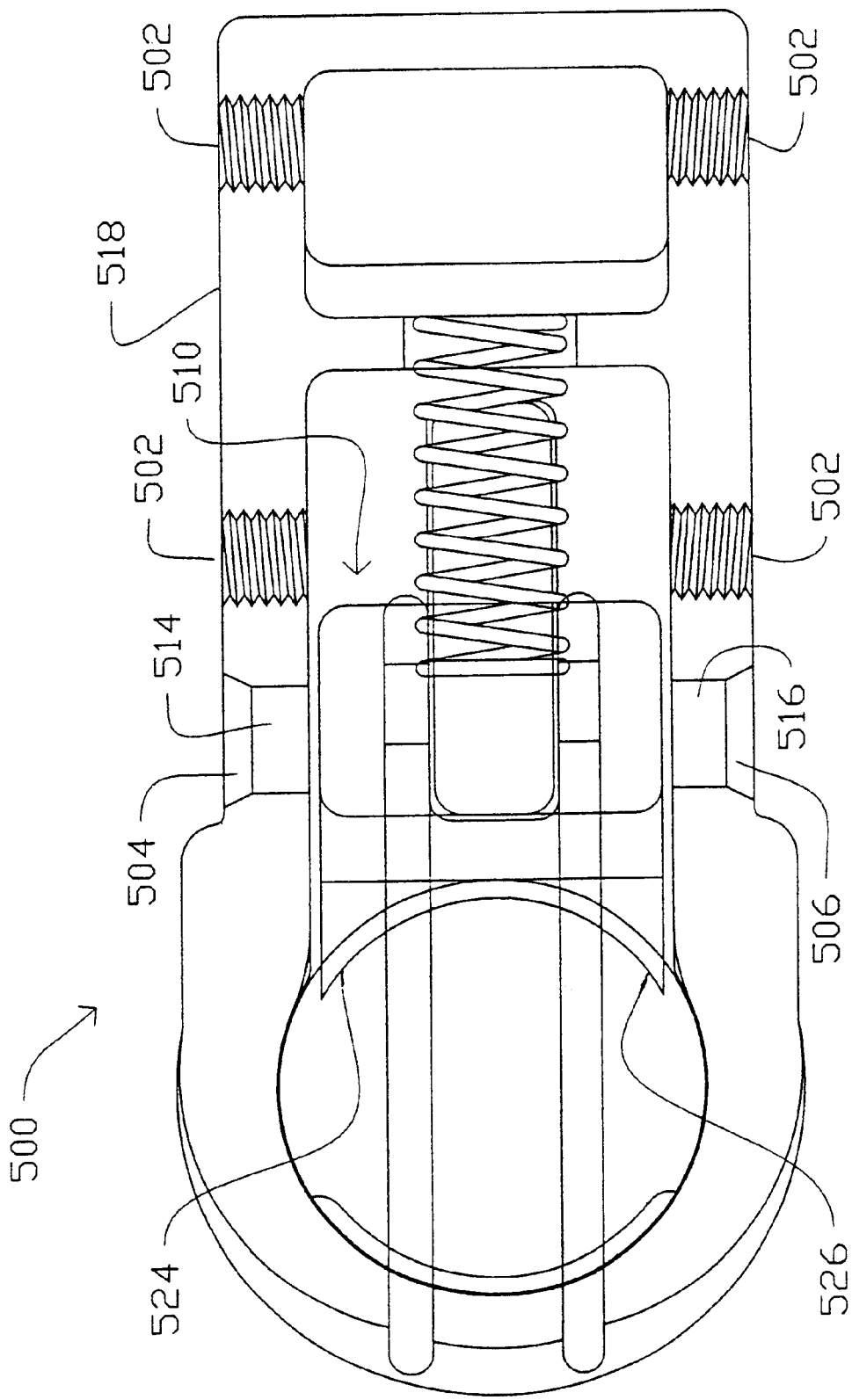
FIG. 41 is a bottom view of the device of FIG. 39 with the inserted ball shown in phantom line along with portions of the top structure.

An embodiment 500 is shown in FIGS. 39–41 that is very similar to the foregoing embodiment 400. The pivoting ball support 510 and frame 518 have been modified to provide a lower vertical profile, thus allowing rear attachment structure to be bolted on using bolt holes 502, in such a manner that such structure will be generally flush with the frame top 516. As shown in FIG. 41, additional frame width is provided proximate the bolt holes 514, the additional width providing a chamfered recess 504,506 at the pivoting ball support shaft ends 514,516. A wider pivoting ball support 510 is also provided in this embodiment, with the pivoting ball support extensions 524,526 being increased in length as well. The wider pivoting ball support 510 reduces the ratio of the ball diameter to pivoting ball support width at the pivot point to approximately 0.88.

Figure 42:
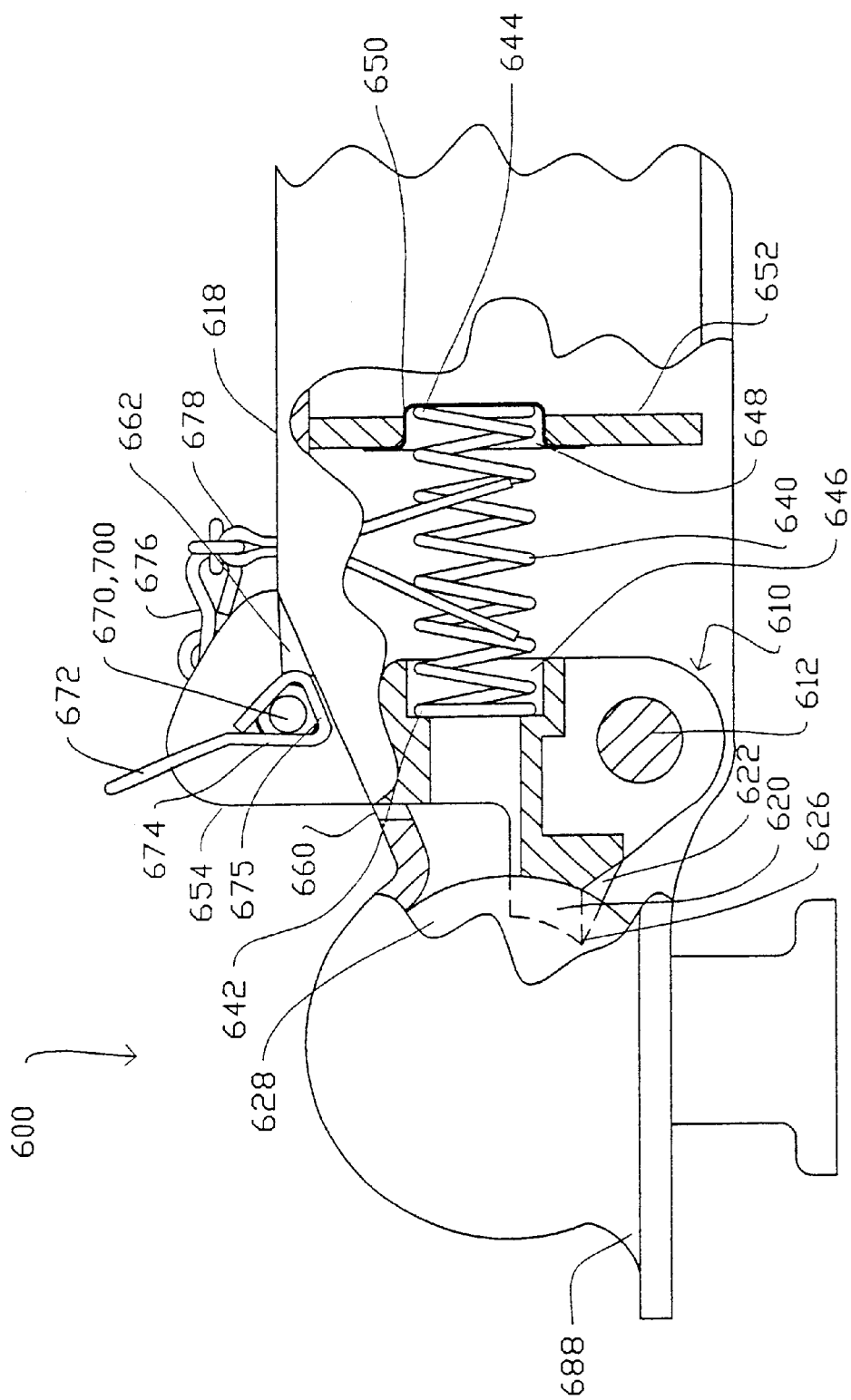
FIG. 42 is a side view of an embodiment of the device, with a portion cutaway to expose a partial sectional view.
Figure 43:
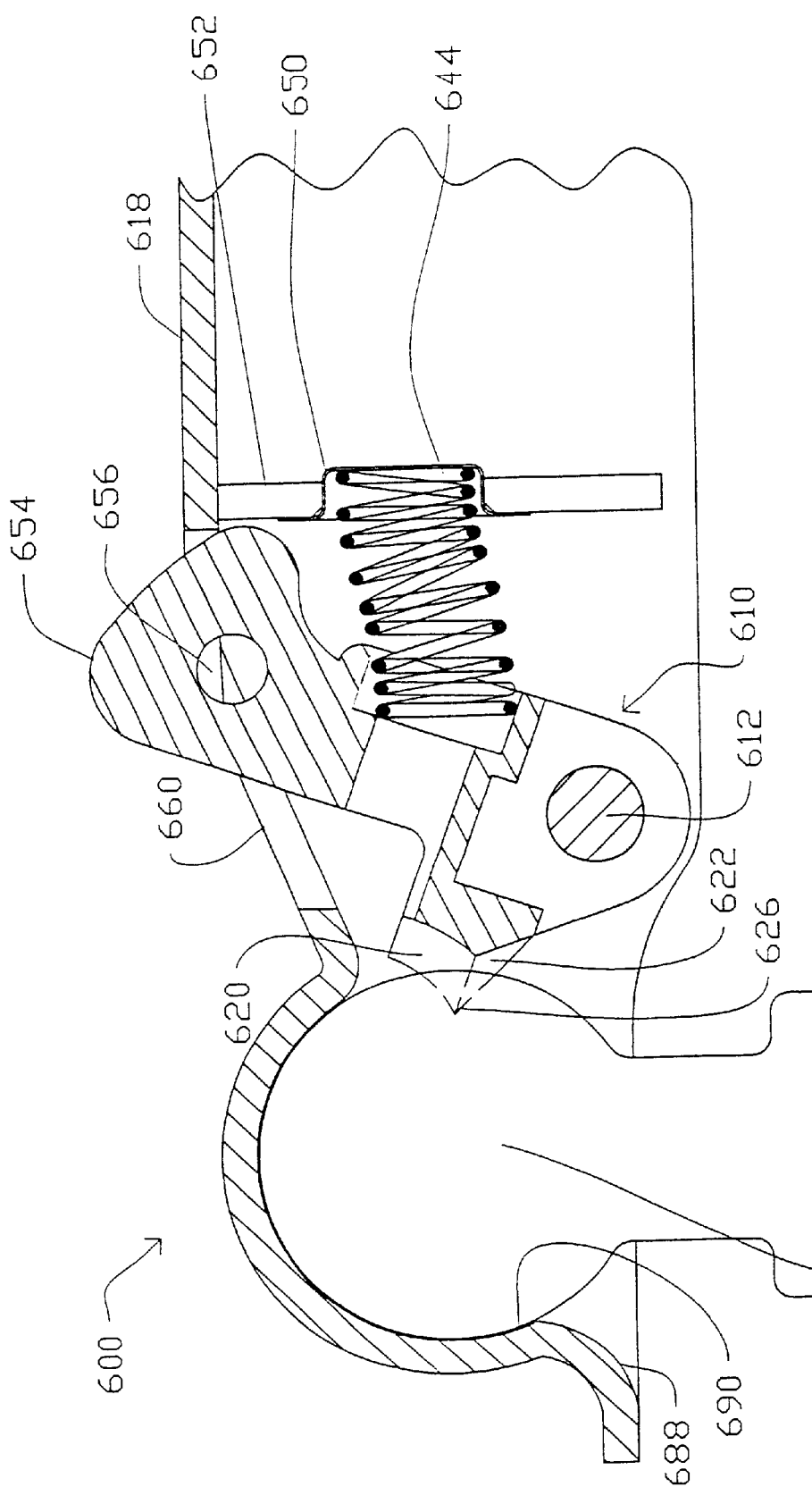
FIG. 43 is a sectional view of the device of FIG. 42 cut along the longitudinal axis of the device, the hitch being in the open position.
Figure 44:
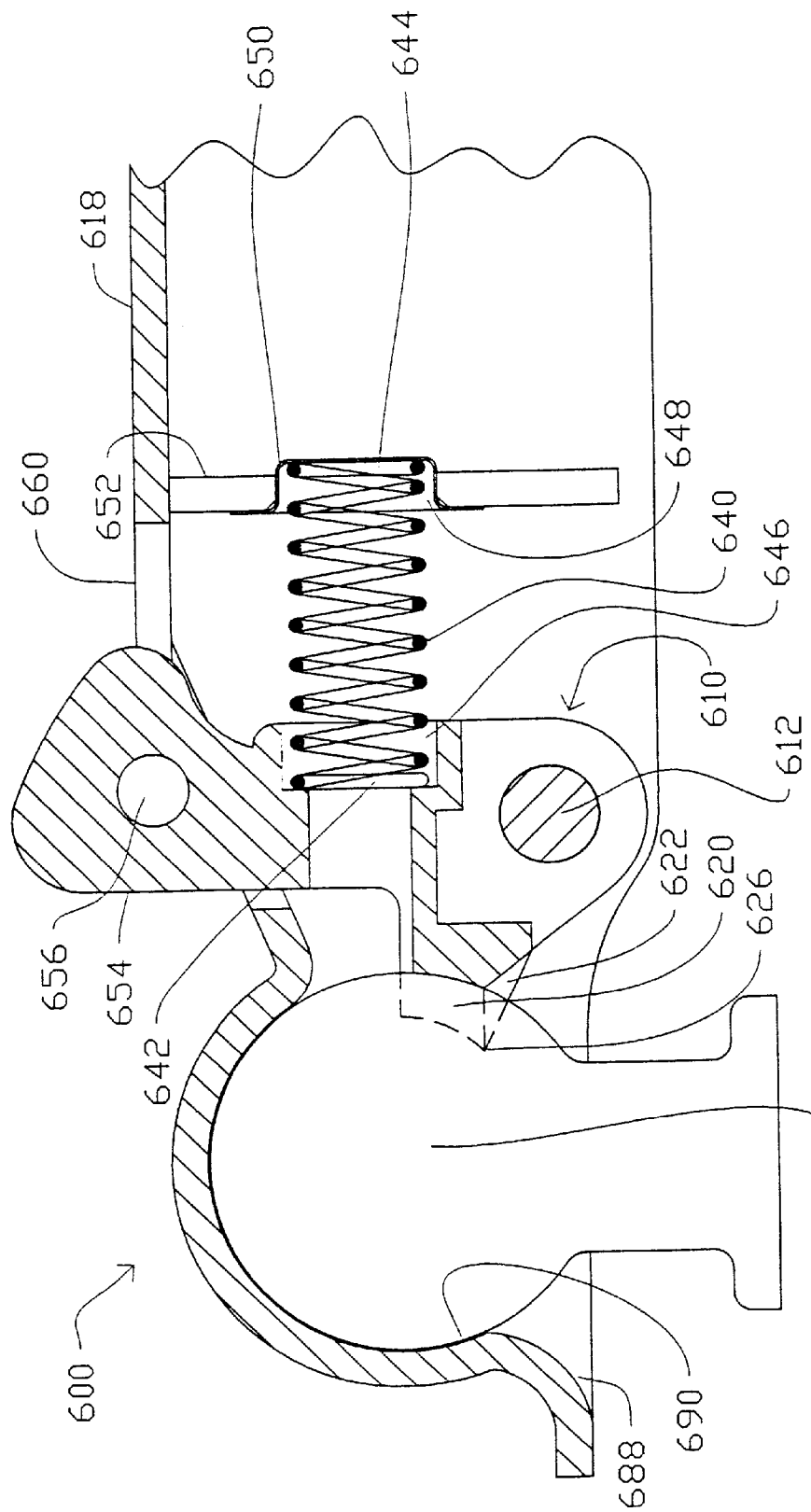
FIG. 44 is a sectional view of the device of FIG. 42 cut along the longitudinal axis of the device, the hitch being in the closed position.

Another embodiment 600 is provided that is constructed from pressed steel. FIGS. 42–50 depict this additional embodiment 600 that also includes a specially modified pivoting ball support 610 that pivots around a pivot point, in this instance a fixed shaft 612, the fixed shaft having ends 614, 616 attached to the frame 618. FIGS. 43–44 depict the pivoting ball support 610 in the second and first positions, respectively.

Figure 45:
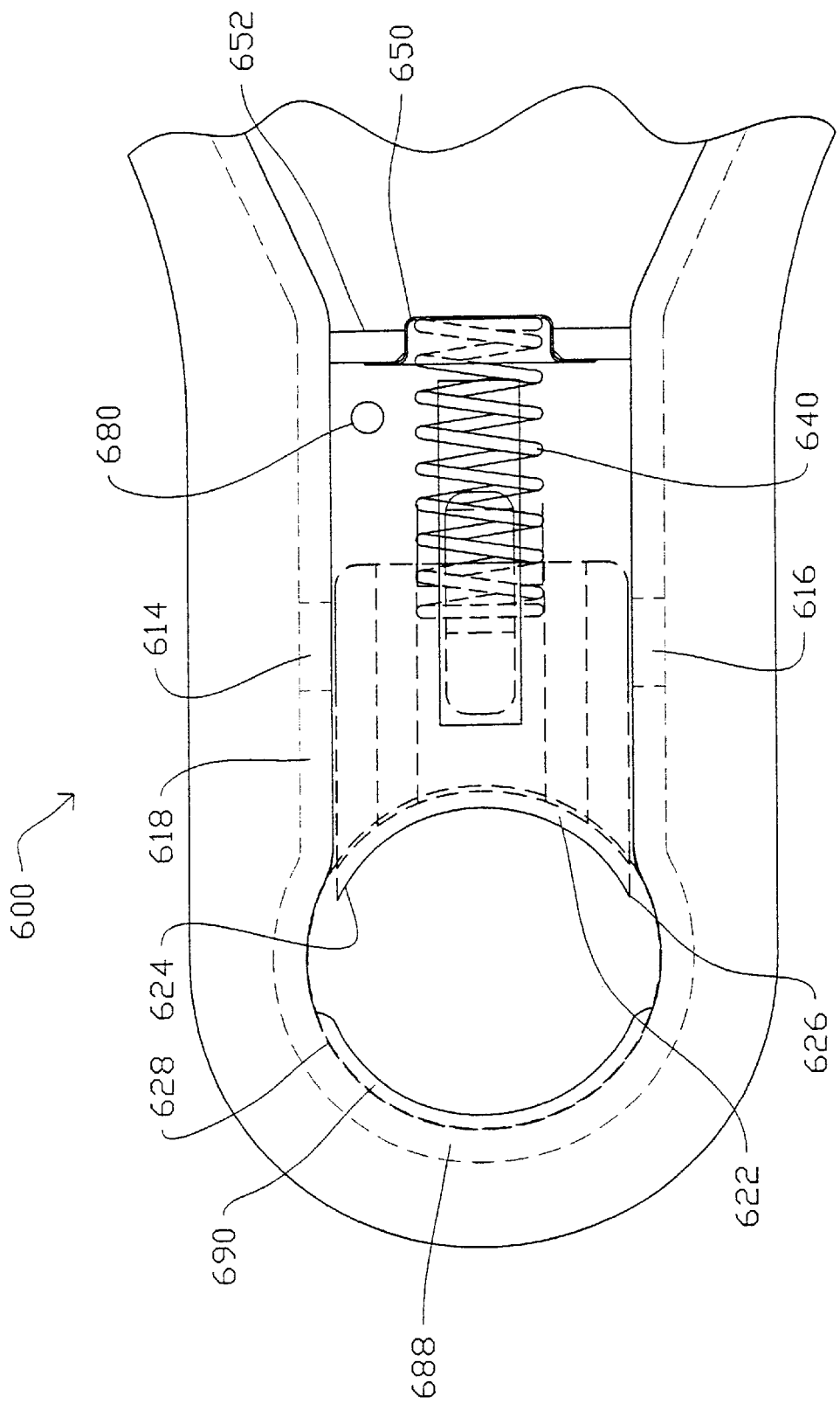
FIG. 45 is a bottom view of the device of FIG. 42 with the inserted ball shown in phantom line along with portions of the top structure.
Figure 46:
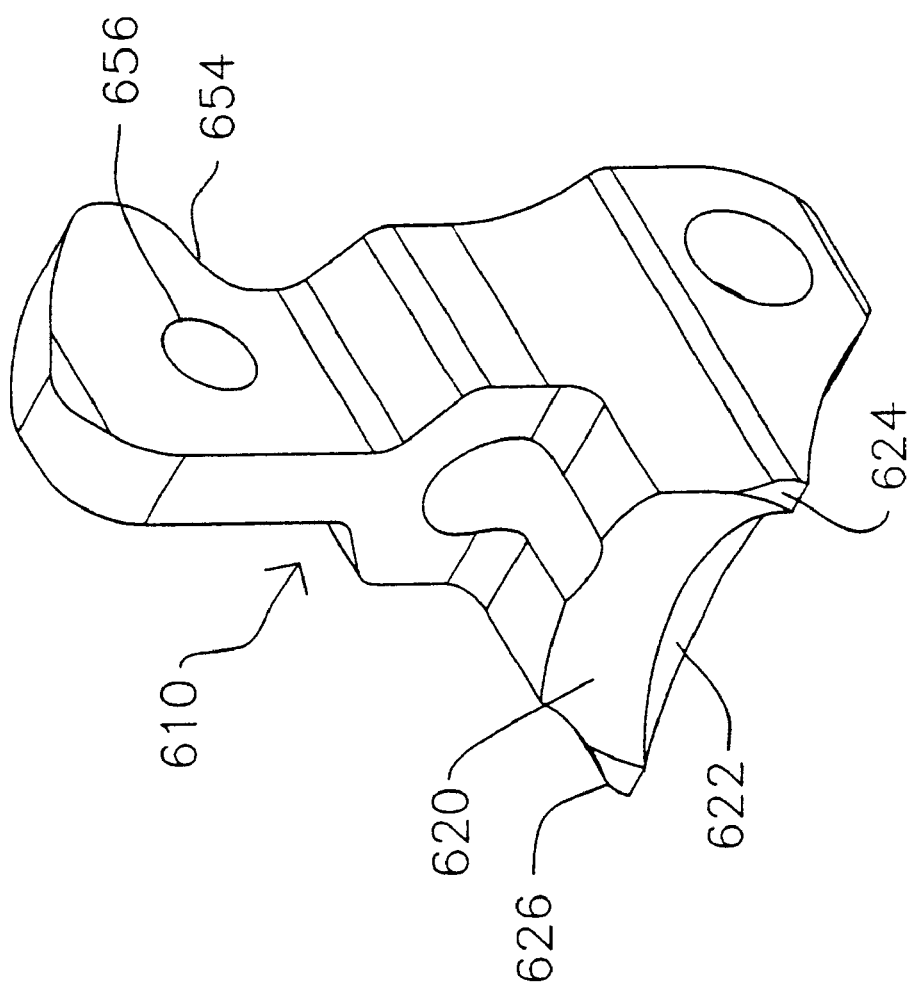
FIG. 46 is an oblique front and side view of the pivoting ball support used in the device of FIG. 42.
Figure 47:
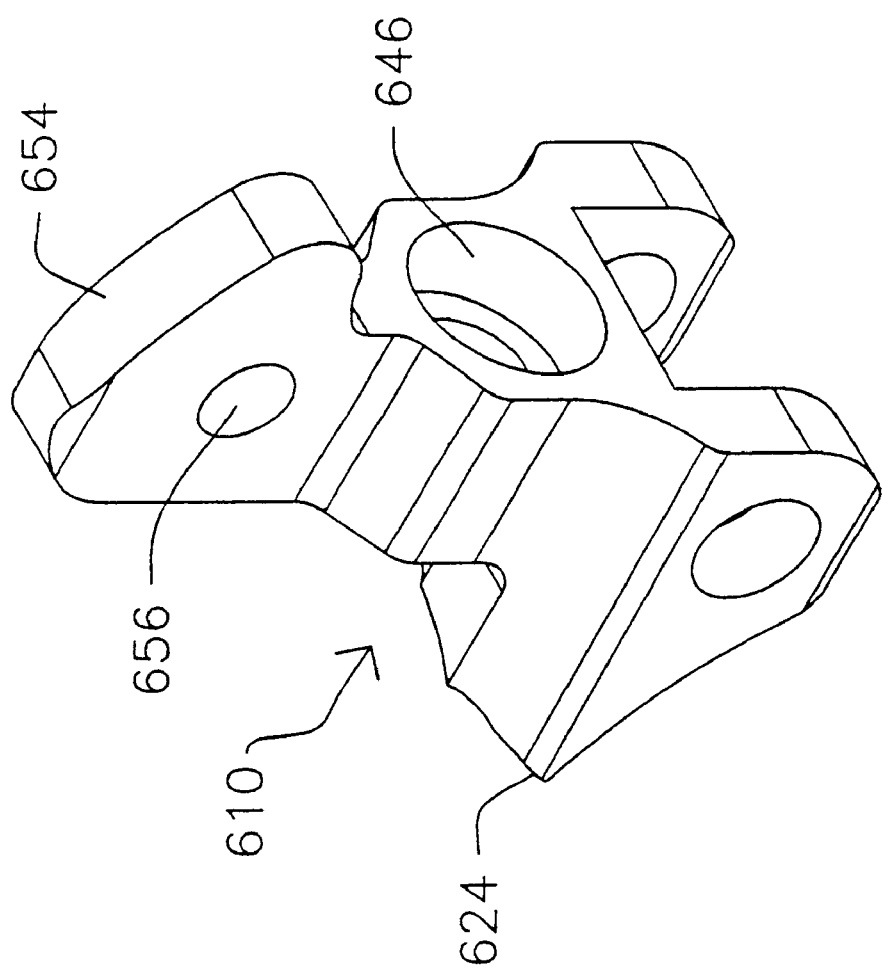
FIG. 47 is an oblique rear and side view of the pivoting ball support used in the device of FIG. 42.
Figure 48:
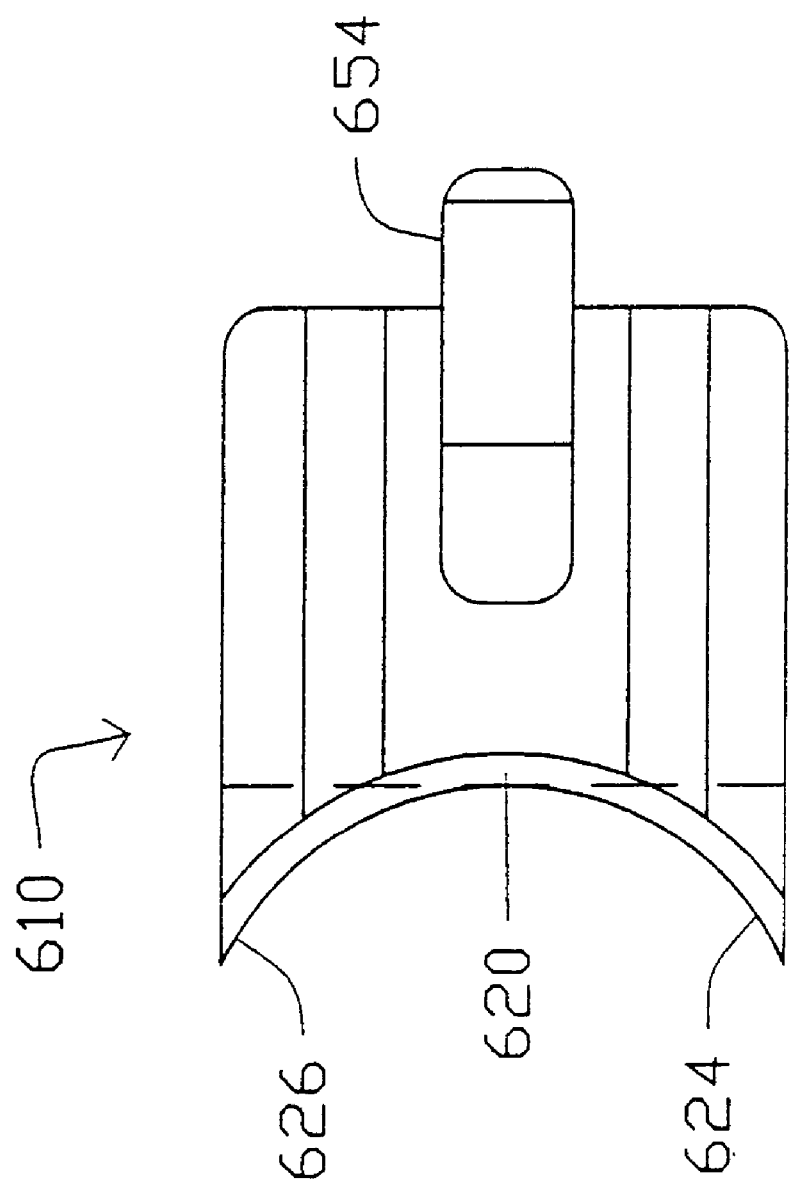
FIG. 48 is a top view of the pivoting ball support used in the device of FIG. 42.
Figure 49:
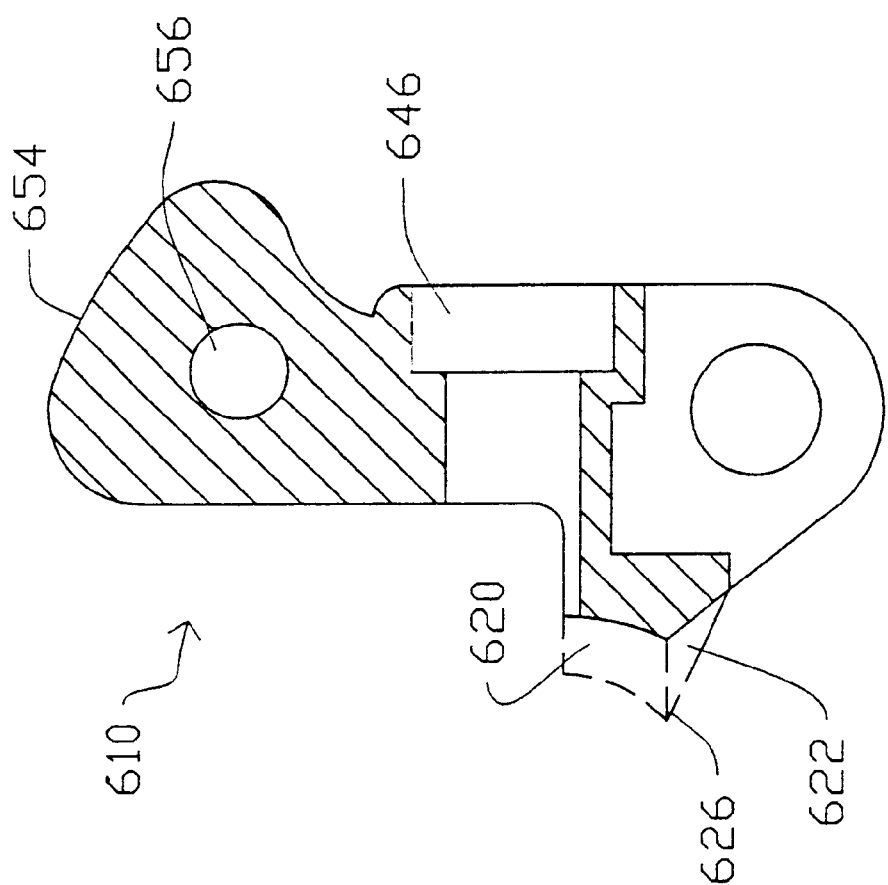
FIG. 49 is a sectional view of the pivoting ball support used in the device of FIG. 42, cut along the longitudinal axis.

As shown particularly in FIG. 46, this pivoting ball support 610 has a first and second face 620,622, both being recessed. The two faces 620,622 are sized and shaped to provide extensions 624,626 that partially surround the ball 628. FIG. 45 depicts the forward extent of such extensions 624,626 while the pivoting ball support 610 is in the first position.

The pivoting ball support first face 620 recess and the extensions 624,626 are generally shaped to the contours of the ball 628, while the second face 622 is recessed to the extent necessary to allow the ball 628 to completely enter the frame opening 630 while the pivoting ball support 610 is in the second position. The second face 622 recess enables the extensions 624,626 to extend farther forward, allowing a more complete and secure encounter with the ball 628.

A spring 640 is provided to bias the pivoting ball support 610 into the first position. As shown in FIGS. 43–44, the spring first and second ends 642,644 are received and secured by hollows 646,648. The first hollow 646 is formed in the pivoting ball support 610, while the second hollow 648 is provided in the form of an insert 650 in a frame rear interior wall portion 652. The hollows 646,648 are right-angled, circular intrusions, although other hollows and shapes with sufficient depth and cross-sectional area would also secure the spring 640.

Figure 51:
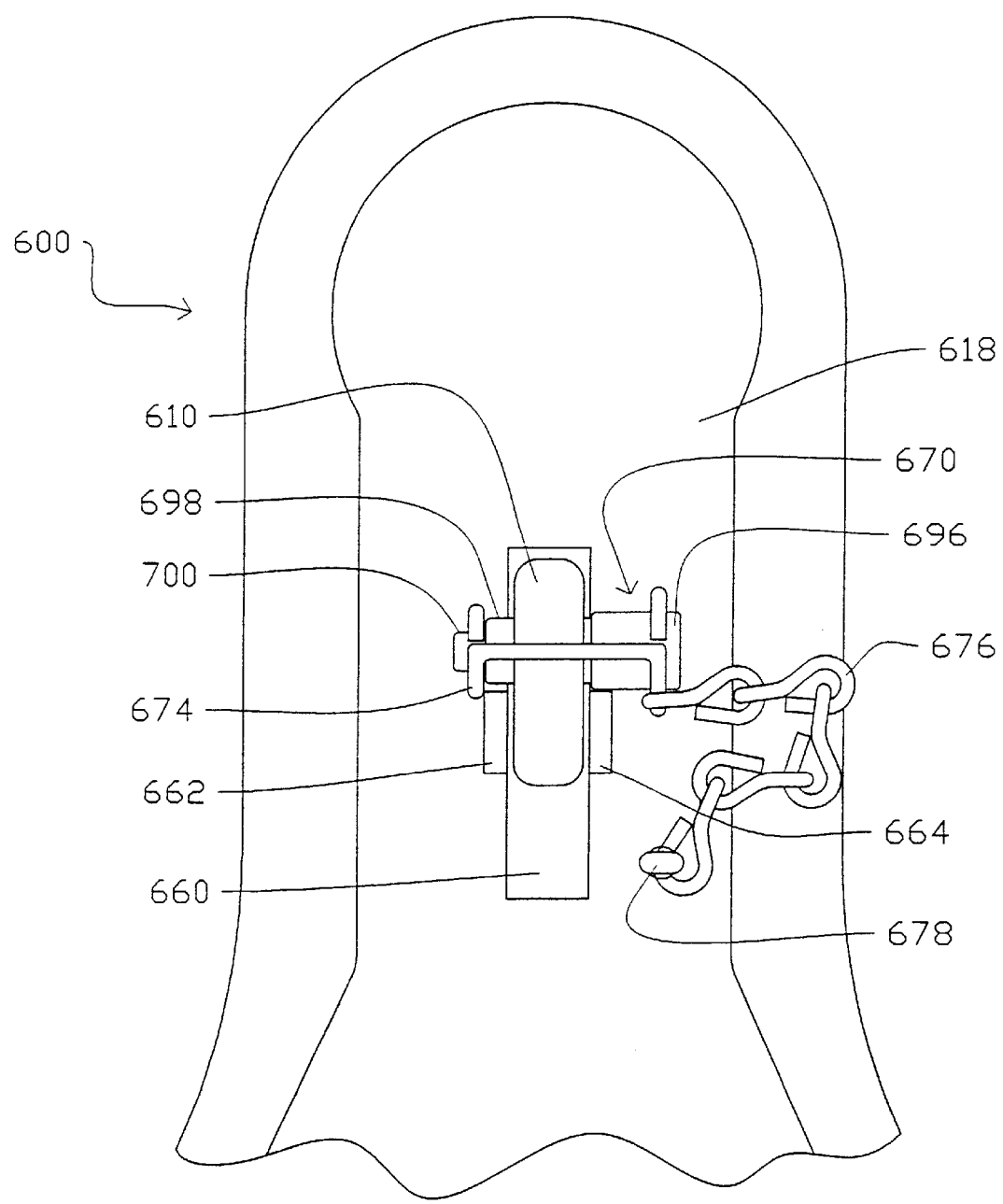
FIG. 51 is a top view of the device of FIG. 42.

In this embodiment 600, the pivoting ball support 610 has an extension 654 that, in turn, has a hole 656, the extension 654 protruding through a slot 660 in the frame 618. The frame 618 also has top extensions 662,664. As shown in FIG. 42, the protruding portion of the pivoting ball support extension 654 includes the hole 656, the hole 656 being positioned with respect to the frame top extensions 662,664 such that a pin 670 is insertable within the hole 656 and will bear upon at least one of the frame top extensions 662,664 when the pivoting ball support 612 is in the first position. As shown in FIG. 51 the pin 670 has an enlarged first portion 696 that bears upon frame top extension 664 providing one means for preventing motion of the pivoting ball support 610 from the first position. The pin 670 also has a second portion 698 that is closely received by the hole 656, and a third portion 700.

The pin 670 is held in place by a retaining member 672 that is attached to one end of the pin 670 and movable into a position to clasp the pin 670 with a three-sided loop portion 674, having lower side 675. As shown in FIG. 42, the width of the loop portion lower side 675 and the diameter of the pin third portion 700 are chosen such that the space between the frame 618 and the pin third portion 700 is substantially filled by the loop portion lower side 675. This provides an additional means of preventing pivoting ball support 610 motion.

The retaining member is attached to a chain 676 with an attached cotter pin 678 that is squeezable for insertion and close reception by a cotter pin hole 680 in the frame 618. A typical lock can be used in lieu of the pin 470.

When the pin 670 is not in place, the pivoting ball support 610 can be rotated from the first position to the second position by pushing on the pivoting ball support extension 654.

As shown in FIGS. 42–45, a frame exterior lip 688 extends from the frame 618 and provides structural rigidity and assists in guiding the ball 628 into the frame opening 630 during the hookup process. This feature is present in the embodiments shown in FIGS. 24–27, as well.

As further shown in FIGS. 43–45, a frame interior lip 690 extends into the frame opening 630 and is positioned to extend beneath a portion of the ball 630 that is fully positioned in the frame 618. FIG. 45 provides additional detail for this feature, the feature also being present in the embodiments shown in FIGS. 24–27.

Figure 50:
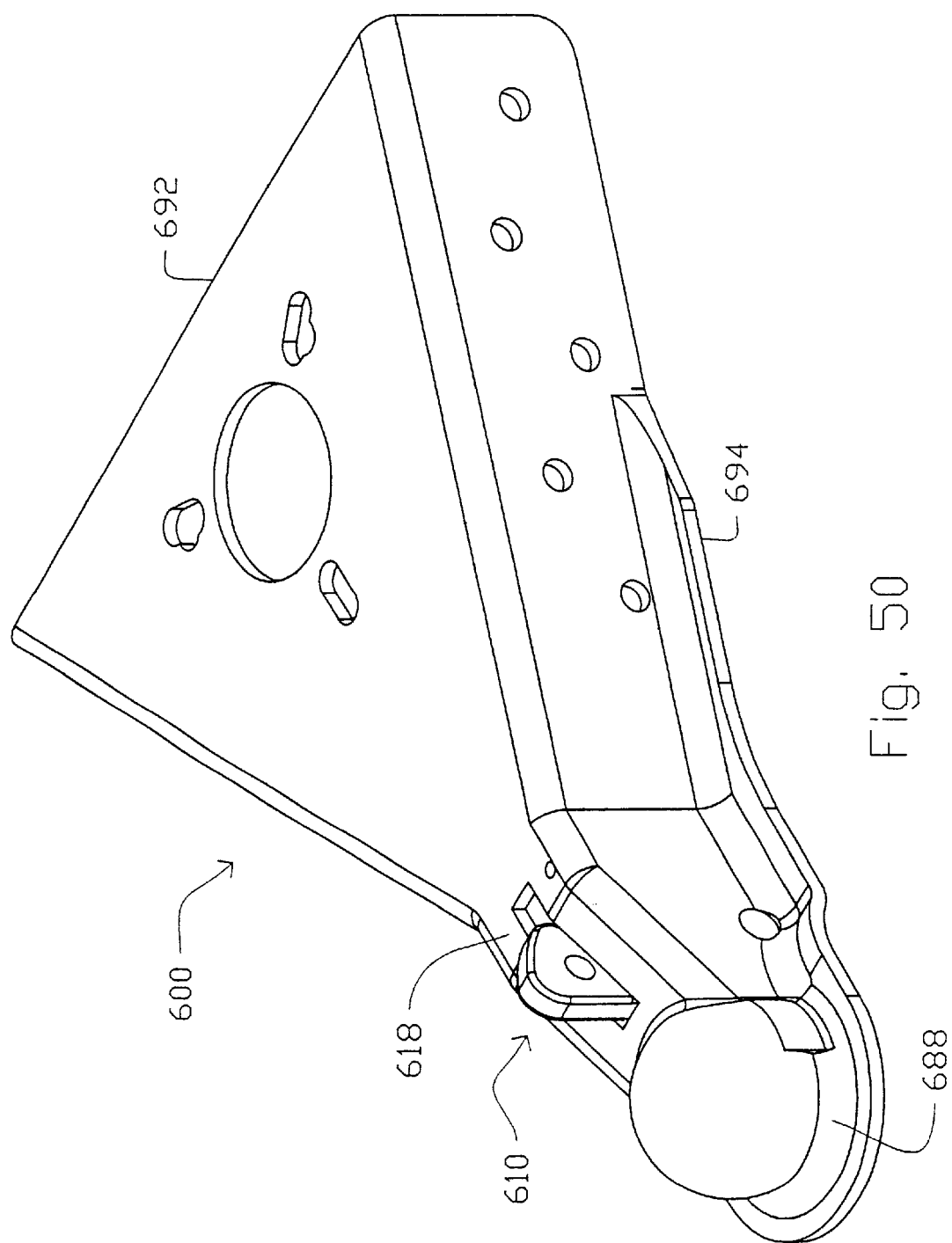
FIG. 50 is an oblique front and side view of the device of FIG. 42.

FIG. 50 depicts the remaining A-frame structure 692 and structural lip 694 of this embodiment 600 that is similar to the rear structure 254 of the embodiment 250 shown in FIGS. 24–27.

The compact configuration of the components in this embodiment 600 have enabled particularly favorable dimensional relationships between such components, in an analogous manner to those enabled by the above-described embodiment 400. As was the case with that embodiment, the reduced spring 640 length, the reduced degree of rearward pivot required to release the ball 628, and the superior ratios with regard to and among the pivoting ball support width, ball diameter, and frame width at the pivot point, are all provided by this embodiment 600.

The features of this embodiment 600 can also be provided using a pivoting ball support attached to a pivoting shaft.

This embodiment 600 appears to have the optimum configuration for a pressed hitch, based on our current experience, although other adjustments to such configurations may occur to those of skill in the art after review of this disclosure.

Adding frame width to create chamfered recesses to the shaft (as was done on the wider embodiment 500) is an adaptation readily available for the other embodiments 400, 600.

These embodiments 400,500,600 are all readily adaptable to all tongue applications, including, but not limited to, 2 inch channel, 2.5 inch channel, 3 inch channel, 4 inch channel, adjustable coupler assemblies with a clevis, and the above-described A-frames. All rear adaptations to accommodate tongue presentations, as well as, all variations in the materials used for the above-described components, are in accordance with the present invention, and will be determined by the intended end use for the overall device 400,500,600, as will occur to those of skill in the art upon review of the present disclosure.

The simple, compact and effective coupling and coupling release features of our invention will be used for many applications other than trailer hitches. For example, embodiments of varying sizes are included for providing gate and door latch functions. Other embodiments are included wherein our invention can be sized and configured as necessary for the most efficient coupling performance, including, recessed and/or integrated positioning of the invention within the structure to be coupled, as well as, vertical, upside down, angled and sideways installations. Embodiments are included wherein the structure to which the ball is attached is not aligned with the structure to which our invention is attached. In other embodiments the structure to which the ball is attached does not lie in the same plane as the frame on our invention. Also included are applications in which our invention will include the ball and/or the attachment structure to secure the ball to the portion of structure to be coupled. A wide variety of materials may be used for the components in any embodiment of our invention, particularly those embodiments used to couple lighter weight structures. Plastics, other metals, wood and other materials may be utilized. Other coupling applications will occur to those of skill in the art after review of this disclosure.

The features of many of the embodiments discussed above are interchangeable with other embodiments, and it is contemplated that additional embodiments will be practiced using various combinations of such features.

Although the present invention has been described in considerable detail with reference to certain embodiments thereof, other embodiments are possible. The illustrated or described embodiments are given by way of example only and other embodiments will occur to those of skill in the art without departing from the spirit of the invention. Accordingly, the spirit and scope of the claims should not be limited to the description of the embodiments contained herein.

We claim:

1. An apparatus for receiving and securing a ball, comprising:
   a frame, the frame having an interior, the frame interior having a forward section, the frame forward interior section being shaped and sized for closely receiving portions of a generally round ball, the frame further having an opening, the frame opening being shaped and positioned to allow ball passage into the frame forward interior section;
   a pivoting ball support, the pivoting ball support having a pivot point, the pivoting ball support being attached to the frame at the pivoting ball support pivot point, the pivoting ball support being movable from a first position to a second position, the pivoting ball support further having:
   a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position;
   a second face, the pivoting ball support second face having a recess, the second face recess being positioned for encounter with the ball as the ball is inserted into the frame opening;
   a spring, the spring having a first and second end, the spring's first end being positioned against the pivoting ball support, the spring's second end being positioned against the frame, such that movement of the pivoting ball support from the first position to the second position is resisted; and
   a rotation member, the rotation member being attached to the pivoting ball support such that movement of the rotation member causes rotation of the pivoting ball support.

2. The apparatus of claim 1, wherein the pivoting ball support further has a hollow, the hollow being sized to receive the spring first end, and further wherein the frame further has a hollow, the hollow being sized to receive the spring second end.

3. The apparatus of claim 2, wherein the frame further has a rear interior portion, the rear interior portion defining a rear cavity, the frame hollow being positioned in the frame rear interior portion.

4. The apparatus of claim 2, wherein the frame further has a rear interior wall portion, the frame hollow being positioned in the rear interior wall portion.

5. The apparatus of claim 1, wherein the spring length is less than the ball diameter when the pivoting ball support is in the first position.

6. The apparatus of claim 1, wherein the degree of pivot between the pivoting ball support first position and second position is not more than 21 degrees.

7. The apparatus of claim 1, wherein the ratio of the pivoting ball support width to the frame width at the pivot point is not less than 0.70.

8. The apparatus of claim 1 wherein the ratio of the pivoting ball support width at the pivot point to the ball diameter is not less than 0.70.

9. The apparatus of claim 1, wherein the frame further has a slot and the rotation member comprises an extension member extending from the pivoting ball support through the frame slot.

10. The apparatus of claim 9, wherein the pivoting ball support extension member has an end portion, the end portion being shaped to form an acute angle with respect to the frame.

11. The apparatus of claim 1, wherein the ratio of the ball diameter to the maximum frame width at the pivot point is not less than 0.95.

12. The apparatus of claim 1, wherein the frame further has a slot and a top extension, and further wherein the pivoting ball support further has a top extension, the pivoting ball support top extension having a hole, the pivoting ball support top extension being configured such that the pivoting ball support top extension extends through the frame slot, the frame top extension being positioned on the frame such that a pin within the pivoting ball support top extension is adjacent the frame top extension when the pivoting ball support is in the first position, the frame top extension preventing the movement of the pivoting ball support from the first position.

13. The apparatus of claim 1, wherein the frame has a slot, and further wherein the pivoting ball support further has a top extension, the pivoting ball support top extension having a hole, the pivoting ball support top extension being configured such that the pivoting ball support top extension extends through the frame slot, and wherein the apparatus further comprises a pin, the pin having at least two portions having different diameters, and a pin retaining member having a first end attached to the pin first portion, and a second end having a loop, the loop having a substantially straight lower side, the second end being biased to encompass another of the pin portions when the pin is inserted into the pivoting ball support hole, the second end encompassing the other pin portion such that the loop lower side is closely received between the other pin portion and the frame, the loop lower side preventing the movement of the pivoting ball support from the first position.

14. The apparatus of claim 13, wherein the frame further has a top extension, the frame top extension being positioned on the frame such that the inserted pin's first portion is adjacent the frame top extension when the pivoting ball support is in the first position, the frame top extension preventing the movement of the pivoting ball support from the first position.

15. The apparatus of claim 13, wherein the number of pin portions is three, the middle portion being closely received by the pivoting ball support extension hole.

16. The apparatus of claim 1, wherein the frame further has a rear interior portion, the rear interior portion defining a rear cavity, the spring second end being positioned against the frame rear interior portion.

17. The apparatus of claim 1, wherein the frame further has a rear interior wall portion, the spring second end being positioned against the rear interior wall portion.

18. The apparatus of claim 1, wherein the frame further has an exterior lip, the frame exterior lip being attached to the frame proximate the frame opening, the frame exterior lip further extending radially from the frame opening, the frame exterior lip being tapered downwardly as it extends.

19. The apparatus of claim 1, wherein the frame further has an interior lip, the frame interior lip being shaped and positioned to extend beneath a portion of the ball positioned in the frame forward interior section.

20. The apparatus of claim 1, further comprising means for preventing pivoting ball support movement, such that movement of the pivoting ball support from the first position to the second position is prevented.

21. The apparatus of claim 1, wherein the pivoting ball support rotates with respect to the pivoting ball support pivot point, the pivoting ball support pivot point being fixed with respect to the frame.

22. The apparatus of claim 1, wherein the pivoting ball support rotates with the pivoting ball support pivot point, the pivoting ball support pivot point rotating with respect to the frame.

23. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the pivoting ball support being movable from a first position to a second position, the pivoting ball support further having:

a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening, the pivoting ball support first face recess being positioned for encounter with the ball when the pivoting ball support is in the first position;

a second face, the pivoting ball support second face having a recess, the second face recess being positioned for encounter with the ball as the ball is inserted into the frame opening;

means for resisting pivoting ball support movement, such that movement of the pivoting ball support first face from the first position to the second position is resisted.

24. The apparatus of claim 23, wherein the frame has a slot, and further wherein the pivoting ball support further has a top extension, the pivoting ball support top extension having a hole, the pivoting ball support top extension being configured such that the pivoting ball support top extension extends through the frame slot, and wherein the apparatus further comprises a pin, the pin having at least two portions having different diameters, and a pin retaining member having a first end attached to the pin first portion, and a second end having a loop, the loop having a substantially straight lower side, the second end being biased to encompass another of the pin portions when the pin is inserted into the pivoting ball support hole, the second end encompassing the other pin portion such that the loop lower side is closely received between the other pin portion and the frame, the loop lower side preventing the movement of the pivoting ball support from the first position.

25. The apparatus of claim 24, wherein the frame further has a top extension, the frame top extension being positioned on the frame such that the inserted pin's first portion is adjacent the frame top extension when the pivoting ball support is in the first position, the frame top extension preventing the movement of the pivoting ball support from the first position.

26. The apparatus of claim 24, wherein the number of pin portions is three, the middle portion being closely received by the pivoting ball support extension hole.

27. An apparatus for receiving and securing a ball, comprising:
 a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;
 a pivoting ball support, the pivoting ball support having a pivot point, the pivoting ball support being attached to the frame at the pivoting ball support pivot point, the pivoting ball support being movable from a first position to a second position, the pivoting ball support further having:
  a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position;
  a second face, the pivoting ball support second face having a recess, the second face recess being positioned for encounter with the ball as the ball is inserted into the frame opening;
 a spring, the spring having a first and second end, the pivoting ball support further having a hollow, the hollow being sized to receive the spring first end, and the frame further having a hollow, the hollow being sized to receive the spring second end, such that movement of the pivoting ball support from the first position to the second position is resisted; and
 a rotation member, the rotation member being attached to the pivoting ball support such that movement of the rotation member causes rotation of the pivoting ball support.

28. The apparatus of claim 27, wherein the frame further has a rear interior portion, the rear interior portion defining a rear cavity, the frame hollow being positioned in the frame rear interior portion.

29. The apparatus of claim 27, wherein the frame further has a rear interior wall portion, the frame hollow being positioned in the rear interior wall portion.

30. An apparatus for receiving and securing a ball, comprising:
 a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;
 a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame forward interior section being sized and shaped such that the pivoting ball support face prevents the ball from passing through the frame opening;
 a spring, the spring having a first and second end, the spring's first end being positioned against the pivoting ball support, the spring's second end being positioned against the frame, such that movement of the pivoting ball support from the first position to the second position is resisted, the spring length being less than the ball width when the pivoting ball support is in the first position; and
 a rotation member, the rotation member being attached to the pivoting ball support such that movement of the rotation member causes rotation of the pivoting ball support.

31. An apparatus for receiving and securing a ball, comprising:
 a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;
 a pivoting ball support, the pivoting ball support having a pivot point, the pivoting ball support being attached to the frame at the pivoting ball support pivot point, the pivoting ball support being movable from a first position to a second position, the degree of pivot between the pivoting ball support first position and second position being not more than twenty-one degrees, the pivoting ball support further having:
  a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position;
  a second face, the pivoting ball support second face having a recess, the second face recess being positioned for encounter with the ball as the ball is inserted into the frame opening;
 a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

32. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the ratio of the pivoting ball support width to the frame width at the pivot point being not less than 0.70, and further, the pivoting ball support being movable from a first position to a second position, the pivoting ball support further having:

a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position;

a second face, the pivoting ball support second face having a recess, the second face recess being positioned for encounter with the ball as the ball is inserted into the frame opening;

a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

33. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the ratio of the pivoting ball support width, at the pivot point, to the ball diameter being not less than 0.70, and further, the pivoting ball support being movable from a first position to a second position, the pivoting ball support further having:

a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position;

a second face, the pivoting ball support second face having a recess, the second face recess being positioned for encounter with the ball as the ball is inserted into the frame opening;

a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

34. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame forward interior section being sized and shaped such that the pivoting ball support face prevents the ball from passing through the frame opening when the pivoting ball support is in the first position;

a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support, the frame further having a slot and the rotation member further having an extension member extending from the pivoting ball support through the frame slot, the pivoting ball support extension member having an end portion, the end portion being shaped to form an acute angle with respect to the frame.

35. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame forward interior section being sized and shaped such that the pivoting ball support face prevents the ball from passing through the frame opening when the pivoting ball support is in the first position, the ratio of the ball diameter to the maximum frame width at the pivot point being not less than 0.95;

a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

36. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame forward interior section being sized and shaped such that the pivoting ball support face prevents the ball from passing through the frame opening when the pivoting ball support is in the first position, the frame further having a slot and a top extension, and the pivoting ball support further having a top extension, the pivoting ball support top extension having a hole, the pivoting ball support top extension being configured such that the pivoting ball support top extension extends through the frame slot, the frame top extension being positioned on the frame such that a pin within the pivoting ball support top extension is adjacent the frame top extension when the pivoting ball support is in the first position, the frame top extension preventing the movement of the pivoting ball support from the first position;

a spring, the spring having a first and second end, the spring's first end being positioned against the pivoting ball support, the spring's second end being positioned against the frame, such that movement of the pivoting ball support from the first position to the second position is resisted; and a rotation member, the rotation member being attached to the pivoting ball support such that movement of the rotation member causes rotation of the pivoting ball support.

37. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the pivoting ball support being movable from a first position to a second position, the pivoting ball support further having:

a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position;

a second face, the pivoting ball support second face having a recess, the second face recess being positioned for encounter with the ball as the ball is inserted into the frame opening;

a spring, the spring having a first and second end, the spring's first end being positioned against the pivoting ball support, the spring's second end being positioned against the frame, such that movement of the pivoting ball support from the first position to the second position is resisted;

a rotation member, the rotation member being attached to the pivoting ball support such that movement of the rotation member causes rotation of the pivoting ball support; and means for preventing pivoting ball support movement, such that movement of the pivoting ball support first face from the first position to the second position is prevented.

38. An apparatus for receiving and securing a ball, comprising:

a frame, the frame having an interior, the frame interior having a forward section and a rear section, the frame forward interior section being shaped and sized for closely receiving portions of a generally round ball, the frame further having an opening, the frame opening being shaped and positioned to allow ball passage into the frame forward interior section;

a pivoting ball support, the pivoting ball support having a pivot point, the pivoting ball support being attached to the frame at the pivoting ball support pivot point, the pivoting ball support being movable from a first position to a second position, the pivoting ball support further having a face, the pivoting ball support face being at least partially beneath a portion of the ball when the pivoting ball support is in the first position, the frame forward interior section being sized and shaped such that the pivoting ball support face prevents the ball from passing through the frame opening when the pivoting ball support is in the first position;

means for resisting pivoting ball support movement, such that movement of the pivoting ball support from the first position to the second position is resisted, the means for resisting pivoting ball support movement further comprising a spring, the spring length being less than the ball diameter; and a rotation member, the rotation member being attached to the pivoting ball support such that movement of the rotation member causes rotation of the pivoting ball support.

39. The apparatus of claim 38, wherein the means for resisting pivoting ball support movement comprises a spring, the spring having a first and second end, the pivoting ball support further having a hollow, the hollow being sized to receive the spring first end, and the frame further having a hollow, the hollow being sized to receive the spring second end.

40. The apparatus of claim 39, wherein the frame further has a rear interior portion, the rear interior portion defining a rear cavity, the frame hollow being positioned in the frame rear interior portion.

41. The apparatus of claim 39, wherein the frame further has a rear interior wall portion, the frame hollow being positioned in the rear interior wall portion.

42. The apparatus of claim 38, wherein the degree of pivot between the pivoting ball support first position and second position is not more than twenty-one degrees.

43. The apparatus of claim 38, wherein the ratio of the pivoting ball support width to the frame width at the pivot point is not less than 0.70.

44. The apparatus of claim 38, wherein the ratio of the pivoting ball support width, at the pivot point, to the ball diameter is not less than 0.70.

45. The apparatus of claim 38, the frame further having a slot and the rotation member further has an extension member extending from the pivoting ball support through the frame slot, the pivoting ball support extension member having an end portion, the end portion being shaped to form an acute angle with respect to the frame.

46. The apparatus of claim 38, wherein the ratio of the ball diameter to the maximum frame width at the pivot point is not less than 0.95.

47. The apparatus of claim 38, wherein the frame further has a slot and a top extension, and further wherein the pivoting ball support further has a top extension, the pivoting ball support top extension having a hole, the pivoting ball support top extension being configured such that the pivoting bail support top extension extends through the frame slot, the frame top extension being positioned on the frame such that a pin within the pivoting ball support top extension is adjacent the frame top extension when the pivoting ball support is in the first position, the frame top extension preventing the movement of the pivoting ball support from the first position.

48. The apparatus of claim 38, wherein the frame has a slot, and further wherein the pivoting ball support further has a top extension, the pivoting ball support top extension having a hole, the pivoting bail support top extension being configured such that the pivoting ball support top extension extends through the frame slot, and wherein the apparatus further comprises a pin, the pin having at least two portions having different diameters, and a pin retaining member having a first end attached to the pin first portion, and a second end having a loop, the loop having a substantially straight lower side, the second end being biased to encompass another of the pin portions when the pin is inserted into the pivoting ball support hole, the second end encompassing the other pin portion such that the loop lower side is closely received between the other pin portion and the frame, the loop lower side preventing the movement of the pivoting ball support from the first position.

49. The apparatus of claim 48, wherein the frame further has a top extension, the frame top extension being positioned on the frame such that the inserted pin's first portion is adjacent the frame top extension when the pivoting ball support is in the first position, the frame top extension preventing the movement of the pivoting ball support from the first position.

50. The apparatus of claim 48, wherein the number of pin portions is three, the middle portion being closely received by the pivoting ball support extension hole.

51. The apparatus of claim 38, further comprising means for preventing pivoting ball support movement, such that movement of the pivoting ball support first face from the first position to the second position is prevented.

52. The apparatus of claim 38, wherein the frame further has an interior lip, the frame interior lip being shaped and positioned to extend beneath a portion of the ball positioned in the frame forward interior section.

53. An apparatus for receiving and securing a hitch ball, comprising:

a frame, the frame having an interior, the frame interior having a forward section and a rear section, the frame forward interior section being shaped and sized for closely receiving portions of a generally round hitch ball, the frame further having an opening, the frame opening being shaped and positioned to allow hitch ball passage into the frame forward interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame forward interior section, the pivoting ball support further having:

a first face, the pivoting ball support first face having a recess, the pivoting ball support first face being at least partially beneath a portion of the ball when the pivoting ball support is in the first position, the frame forward interior section being sized and shaped such that the pivoting ball support first face prevents the ball from passing through the frame opening when the pivoting ball support is in the first position, the pivoting ball support first face recess being positioned for encounter with the ball when the pivoting ball support is in the first position;

a second face, the pivoting ball support second face having a recess, the second face recess being positioned for encounter with the ball as the ball is inserted into the frame opening;

means for resisting pivoting ball support movement, such that movement of the pivoting ball support first face from the first position to the second position is resisted;

means for preventing pivoting ball support movement, such that movement of the pivoting ball support first face from the first position to the second position is resisted; and pivoting ball support forced rotation means, such that the pivoting ball support first face can be manually moved from the first to the second position.

* * * * *